(12) United States Patent
Kwon et al.

(10) Patent No.: US 12,137,048 B2
(45) Date of Patent: *Nov. 5, 2024

(54) SYSTEM AND METHOD FOR SPATIAL AWARENESS NETWORK ROUTING

(71) Applicant: Rockwell Collins, Inc., Cedar Rapids, IA (US)

(72) Inventors: Tj T. Kwon, Marion, IA (US); Eric J. Loren, North Liberty, IA (US); William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/541,703

(22) Filed: Dec. 3, 2021

(65) Prior Publication Data

US 2022/0094634 A1 Mar. 24, 2022

Related U.S. Application Data

(63) Continuation-in-part of application No. 17/408,156, filed on Aug. 20, 2021, now Pat. No. 11,737,121, and
(Continued)

(51) Int. Cl.
*H04L 45/42* (2022.01)
*G01S 5/00* (2006.01)
(Continued)

(52) U.S. Cl.
CPC ............ *H04L 45/42* (2013.01); *G01S 5/0027* (2013.01); *G01S 13/583* (2013.01); *G01S 13/62* (2013.01);
(Continued)

(58) Field of Classification Search
CPC ......... H04L 45/42; H04L 45/32; H04L 45/02; H04L 45/123; G01S 5/0027;
(Continued)

(56) References Cited

U.S. PATENT DOCUMENTS

| 4,134,113 A | 1/1979 | Powell |
| 4,399,531 A | 8/1983 | Grande et al. |

(Continued)

FOREIGN PATENT DOCUMENTS

| CN | 101330448 A | 12/2008 |
| CN | 101465793 A | 6/2009 |

(Continued)

OTHER PUBLICATIONS

Peng Wang, et al., "Convergence of Satellite and Terrestrial Networks: A Comprehensive Survey networks" IEEEAcess; vol. 4, Dec. 31, 2019.

(Continued)

*Primary Examiner* — Keith Ferguson
(74) *Attorney, Agent, or Firm* — Suiter Swantz IP

(57) ABSTRACT

A system may include a mobile ad-hoc network (MANET) including nodes. The nodes may include beacon-based clusterhead (BB-CH) nodes and members. Each of the nodes may be configured to transmit communication data packets and transmit beacons. Each of the nodes may have passive spatial awareness. For each of at least some of the BB-CH nodes having members, a BB-CH node may be configured to compile spatial awareness information of all members of the BB-CH node. The compiled spatial awareness information may include a BB-CH node identification for the BB-CH node, position-location information (PLI) of the BB-CH node, a quantity of the members of the BB-CH node, and a member list including member identifications. For each of the at least some of the BB-CH nodes, the BB-CH node may be configured to broadcast, via efficient flooding, some or all of the compiled spatial awareness information to every connected node.

15 Claims, 38 Drawing Sheets

Related U.S. Application Data a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778.

(51) Int. Cl.
*G01S 13/58* (2006.01)
*G01S 13/62* (2006.01)
*H04L 45/00* (2022.01)
*H04L 45/02* (2022.01)
*H04L 45/12* (2022.01)
*H04W 56/00* (2009.01)

(52) U.S. Cl.
CPC ............ *H04L 45/02* (2013.01); *H04L 45/123* (2013.01); *H04L 45/32* (2013.01); *H04W 56/0015* (2013.01); *H04W 56/0035* (2013.01); *H04W 56/005* (2013.01)

(58) Field of Classification Search
CPC .. G01S 13/583; G01S 13/62; H04W 56/0015; H04W 56/0035; H04W 56/005
See application file for complete search history.

(56) References Cited

U.S. PATENT DOCUMENTS

| | | |
|---|---|---|
| 4,806,934 A | 2/1989 | Magoon |
| 5,835,482 A | 11/1998 | Allen |
| 5,898,902 A | 4/1999 | Tuzov |
| 6,072,425 A | 6/2000 | Vopat |
| 6,115,394 A | 9/2000 | Balachandran et al. |
| 6,195,403 B1 | 2/2001 | Anderson et al. |
| 6,496,940 B1 | 12/2002 | Horst et al. |
| 6,662,229 B2 | 12/2003 | Passman et al. |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,299,013 B2 | 11/2007 | Rotta et al. |
| 7,417,948 B2 | 8/2008 | Sjöblom |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,036,224 B2 | 10/2011 | Axelsson et al. |
| 8,159,954 B2 | 4/2012 | Larsson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,490,175 B2 | 7/2013 | Barton et al. |
| 8,553,560 B2 | 10/2013 | Axelsson et al. |
| 8,630,291 B2 | 1/2014 | Shaffer et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,867,427 B2 | 10/2014 | Taori et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,179,475 B2 | 11/2015 | Koleszar et al. |
| 9,246,795 B2 | 1/2016 | Madaiah et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,435,884 B2 | 9/2016 | Inoue |
| 9,516,513 B2 | 12/2016 | Saegrov et al. |
| 9,544,162 B2 | 1/2017 | Vasseur et al. |
| 9,628,285 B2 | 4/2017 | Császár |
| 9,713,061 B2 | 7/2017 | Ruiz et al. |
| 9,858,822 B1 | 1/2018 | Gentry |
| 9,979,635 B2 | 5/2018 | Hellhake et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,257,655 B2 | 4/2019 | Cody |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,785,672 B2 | 9/2020 | Kwan et al. |
| 10,798,053 B2 | 10/2020 | Nolan et al. |
| 10,873,429 B1 | 12/2020 | Kwon et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,082,324 B2 | 8/2021 | Ramanathan et al. |
| 11,129,078 B2 | 9/2021 | Yates et al. |
| 11,284,295 B1 | 3/2022 | Kwon et al. |
| 11,290,942 B2 | 3/2022 | Kwon et al. |
| 11,500,111 B2 | 11/2022 | Frederiksen et al. |
| 11,528,675 B2 | 12/2022 | Nagaraja et al. |
| 2002/0018448 A1 | 2/2002 | Amis et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0123228 A1 | 6/2004 | Kikuchi et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2006/0010170 A1 | 1/2006 | Lashley et al. |
| 2006/0056421 A1 | 3/2006 | Zaki |
| 2007/0086541 A1 | 4/2007 | Moon et al. |
| 2007/0097880 A1 | 5/2007 | Rajsic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0290572 A1 | 11/2009 | Gonia et al. |
| 2010/0074101 A1 | 3/2010 | Skalecki et al. |
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |

(56) References Cited

U.S. PATENT DOCUMENTS

| | | |
|---|---|---|
| 2012/0098699 A1 | 4/2012 | Calmettes et al. |
| 2013/0006834 A1 | 1/2013 | Waelbroeck et al. |
| 2013/0069834 A1 | 3/2013 | Duerksen |
| 2013/0094366 A1* | 4/2013 | Lee .................. H04L 41/14 370/255 |
| 2013/0100942 A1 | 4/2013 | Rudnick et al. |
| 2013/0195017 A1 | 8/2013 | Jamadagni et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2015/0010153 A1 | 1/2015 | Robertson |
| 2015/0025818 A1 | 1/2015 | Das et al. |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0360320 A1 | 11/2022 | Miao et al. |
| 2022/0368410 A1 | 11/2022 | Ma et al. |
| 2023/0057666 A1 | 2/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |

FOREIGN PATENT DOCUMENTS

| | | |
|---|---|---|
| CN | 101330448 B | 12/2010 |
| CN | 101465793 B | 2/2011 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2542491 A | 3/2017 |
| GB | 2568122 B | 11/2019 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 1020160071964 A | 6/2016 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

Pulak K. Chowdhury, et al. "Handover Schemes in Satellite Networks: State-of-the-Art and Future Research Directions" 4th Quarter 2006, vol. 8, No. 4, Oct. 1, 2006.
Extended Search Report for European Application No. 21188737.7 dated Dec. 10, 2021, 8 pages.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
U.S. Appl. No. 17/233,107, filed Apr. 16, 2021, Eric J. Loren.
Extended Search Report in European Application No. 21190368.7 dated Jan. 5, 2022, 10 pages.
Martorella, M. et al., Ground Moving Target Imaging via SDAP-ISAR Processing: Review and New Trends. Sensors 2021, 21, 2391. https://doi.org/10.3390/s21072391.

(56) References Cited

OTHER PUBLICATIONS

Yi et al., "Passive Clustering in Ad Hoc Networks (PC)", URL: https://tools.ietf.org/html/draft-yi-manet-pc-00, Nov. 14, 2001, 31 pages.
U.S. Appl. No. 16/987,671, filed Aug. 7, 2021, Kwon et al.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Yi et al., "Passive Clustering in Ad Hoc Networks (PC)", URL: https://tools.ietf,org/html/drafts-yi-manet-pc-00, Nov. 14, 2001, 31 pages.
Seddigh M et al: "Dominating sets and neighbor elimination-based broadcasting algorithms in wireless networks", vol. 13, No. 1, Jan. 1, 2002, pp. 14-25.
Turgut D. et al: "Optimizing clustering algorithm in mobile ad hoc networks using simulated annealing", vol. 3, Mar. 16, 20023, pp. 1492-1497.
Extended European Search Report dated Apr. 4, 2024; European Application No. 21190368.7.

* cited by examiner

```
                              5100

┌─────────────────────────────────────────────┐
        │  PROVIDING A MOBILE AD-HOC NETWORK (MANET)   │
        │  INCLUDING A PLURALITY OF NODES, WHEREIN EACH OF │
        │  THE PLURALITY OF NODES COMPRISES A          │
        │  COMMUNICATION INTERFACE AND A CONTROLLER,   │
        │  WHEREIN THE PLURALITY OF NODES COMPRISES    │
        │  BEACON-BASED CLUSTERHEAD (BB-CH) NODES AND  │
  5102──│  MEMBERS, WHEREIN EACH OF THE PLURALITY OF NODES │
        │  IS ONE OF A BB-CH NODE OR A MEMBER OF AT LEAST ONE │
        │  BB-CH NODE, WHEREIN EACH OF THE PLURALITY OF │
        │  NODES IS CONFIGURED TO TRANSMIT COMMUNICATION │
        │  DATA PACKETS AND TRANSMIT BEACONS, WHEREIN A │
        │  RANGE OF EACH BEACON IS GREATER THAN A RANGE OF │
        │  EACH COMMUNICATION DATA PACKET, WHEREIN EACH │
        │  OF THE PLURALITY OF NODES HAS PASSIVE       │
        │  SPATIAL AWARENESS                           │
        └─────────────────────────────────────────────┘

┌─────────────────────────────────────────────┐
        │  FOR EACH OF THE BB-CH NODES HAVING MEMBERS, │
        │  COMPILING, BY A BB-CH NODE, SPATIAL AWARENESS │
        │  INFORMATION VIA PASSIVE SPATIAL AWARENESS (PSA) │
        │  BASED AT LEAST ON A BEACON FROM EACH MEMBER OF │
        │  THE MEMBERS OF THE BB-CH NODE, WHEREIN THE  │
        │  SPATIAL AWARENESS INFORMATION FROM A GIVEN  │
        │  MEMBER OF THE MEMBERS INCLUDES INFORMATION OF A │
  5104──│  MEMBER IDENTIFICATION OF THE GIVEN MEMBER,  │
        │  WHEREIN THE COMPILED SPATIAL AWARENESS      │
        │  INFORMATION INCLUDES A BB-CH NODE IDENTIFICATION │
        │  FOR THE BB-CH NODE, POSITION-LOCATION       │
        │  INFORMATION (PLI) OF THE BB-CH NODE, A QUANTITY OF │
        │  THE MEMBERS OF THE BB-CH NODE, AND A MEMBER LIST │
        │  INCLUDING MEMBER IDENTIFICATIONS OF THE MEMBERS │
        └─────────────────────────────────────────────┘

┌─────────────────────────────────────────────┐
        │  FOR EACH OF THE BB-CH NODES, BROADCASTING VIA │
        │  EFFICIENT FLOODING, BY THE BB-CH NODE, AT LEAST │
  5106──│  SOME OF THE COMPILED SPATIAL AWARENESS      │
        │  INFORMATION TO EVERY CONNECTED NODE OF      │
        │  THE PLURALITY OF NODES                      │
        └─────────────────────────────────────────────┘
```

FIG.23

SYSTEM AND METHOD FOR SPATIAL AWARENESS NETWORK ROUTING

CROSS-REFERENCE TO RELATED APPLICATIONS

The instant application is related to and claims the benefit of the earliest available effective filing dates under 35 USC § 120 as a continuation in part of the following U.S. Patent Applications:
  (a) U.S. patent application Ser. No. 17/408,156, filed Aug. 20, 2021, which is incorporated by reference in its entirety;
  (b) U.S. patent application Ser. No. 17/233,107, filed Apr. 16, 2021, which is incorporated by reference in its entirety;
  (c) U.S. patent application Ser. No. 17/020,231, filed Sep. 14, 2020, which is incorporated by reference in its entirety; which claims the benefit of:
    (i) U.S. patent application Ser. No. 16/987,671, filed Aug. 7, 2020, which is incorporated by reference in its entirety; and
    (ii) U.S. patent application Ser. No. 16/698,230, filed Nov. 27, 2019, which is incorporated by reference in its entirety; and
  (d) U.S. patent application Ser. No. 17/079,175, filed Oct. 23, 2020, which is incorporated by reference in its entirety.

The present application is related to U.S. patent application Ser. No. 16/369,398, filed April Mar. 29, 2019, issued as U.S. Pat. No. 10,979,348 on Apr. 13, 2021, which is incorporated by reference in its entirety. The present application is related to U.S. patent application Ser. No. 16/537,824, filed Aug. 12, 2019, issued as U.S. Pat. No. 10,931,570 on Feb. 23, 2021, which is incorporated by reference in its entirety.

BACKGROUND

Mobile ad-hoc networks (MANETs) are known in the art as quickly deployable, self-configuring wireless networks with no pre-defined network topology. Each communication node within a MANET is presumed to be able to move freely. In the context of MANETs and other multi-node communication networks, topology learning is the key task of routing mechanisms especially for proactive routing. Topology learning is non-trivial and requires significant over-the-air control packet exchanges due to the frequent topology changes caused by node mobility and channel condition changes. It is very hard to construct accurate topology of a large MANET. Existing routing protocols utilize small hello packet exchanges to identify neighbor nodes. Hello messaging with neighbor list is a commonly used mechanism to learn the $1^{st}$ and the $2^{nd}$ hop neighbors. Local topology learned by hello messaging is delivered via packet flooding or hop-by-hop propagation throughout the connected network. By combining local topology information, each and every communication node may identify route to all connected communication nodes.

It is often desirable to know the position of each communication node within the network. As such, position-location information (PLI) may be regarded as a fundamental concept of operation (CONOP) requirement. In traditional multi-node communication networks, PLI data is transmitted at regular intervals from each communication node to every other communication node within the network. However, this traditional PLI distribution system exhibits several shortfalls. First, if a PLI data packet of a communication node fails (e.g., is not successfully delivered), the remaining communication nodes of the network must wait until the next time interval that the PLI data packet will be re-sent in order to update the PLI of that communication node. Additionally, the requirement for each communication node to distribute PLI to every other communication node within the network results in excessive network congestion and overhead. The excessive overhead is compounded by the mobility of communication nodes and soft-state nature of PLI. Furthermore, since each communication node participates in the distribution of PLI data at regular intervals, traffic within the network may be directly proportional to the square of the size of the network (e.g., number of communication nodes within the multi-node network).

SUMMARY

In one aspect, embodiments of the inventive concepts disclosed herein are directed to a system. The system may include a mobile ad-hoc network (MANET) including a plurality of nodes. Each of the plurality of nodes comprises a communication interface and a controller. The plurality of nodes comprises beacon-based clusterhead (BB-CH) nodes and members. Each of the plurality of nodes is one of a BB-CH node or a member of at least one BB-CH node. Each of the plurality of nodes is configured to transmit communication data packets and transmit beacons. A range of each beacon is greater than a range of each communication data packet. Each of the plurality of nodes has passive spatial awareness. For each of the BB-CH nodes having members, a BB-CH node is configured to compile spatial awareness information via passive spatial awareness (PSA) based at least on a beacon from each member of the members of the BB-CH node. The spatial awareness information from a given member of the members includes information of a member identification of the given member. The compiled spatial awareness information includes a BB-CH node identification for the BB-CH node, position-location information (PLI) of the BB-CH node, a quantity of the members of the BB-CH node, and a member list including member identifications of the members. For each of the BB-CH nodes, the BB-CH node is configured to broadcast, via efficient flooding, at least some of the compiled spatial awareness information to every connected node of the plurality of nodes.

In some embodiments, a node of the plurality of nodes is configured to: route a communication data packet toward a destination node of the plurality of nodes. The node may be further configured to: determine whether the destination node is within a beacon range of the node. The node may be further configured to one of: upon a determination that the destination node is within the beacon range of the node, utilize intra-cluster routing to route the communication data packet toward the destination node, wherein intra-cluster routing is routing within a beacon-based cluster; or upon a determination that the destination node is not within the beacon range of the node, utilize inter-cluster routing to route the communication data packet toward the destination node, wherein inter-cluster routing is routing between beacon-based clusters.

In a further aspect, embodiments of the inventive concepts disclosed herein are directed to method. The method may include: providing a mobile ad-hoc network (MANET) including a plurality of nodes, wherein each of the plurality of nodes comprises a communication interface and a controller, wherein the plurality of nodes comprises beacon-based clusterhead (BB-CH) nodes and members, wherein each of the plurality of nodes is one of a BB-CH node or a member of at least one BB-CH node, wherein each of the plurality of nodes is configured to transmit communication data packets and transmit beacons, wherein a range of each beacon is greater than a range of each communication data packet, wherein each of the plurality of nodes has passive spatial awareness; for each of the BB-CH nodes having members, compiling, by a BB-CH node, spatial awareness information via passive spatial awareness (PSA) based at least on a beacon from each member of the members of the BB-CH node, wherein the spatial awareness information from a given member of the members includes information of a member identification of the given member, wherein the compiled spatial awareness information includes a BB-CH node identification for the BB-CH node, position-location information (PLI) of the BB-CH node, a quantity of the members of the BB-CH node, and a member list including member identifications of the members; and for each of the BB-CH nodes, broadcasting via efficient flooding, by the BB-CH node, at least some of the compiled spatial awareness information to every connected node of the plurality of nodes.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 23 illustrates a flowchart of a method, in accordance with one or more embodiments of the present disclosure.

DETAILED DESCRIPTION

Figure 1:
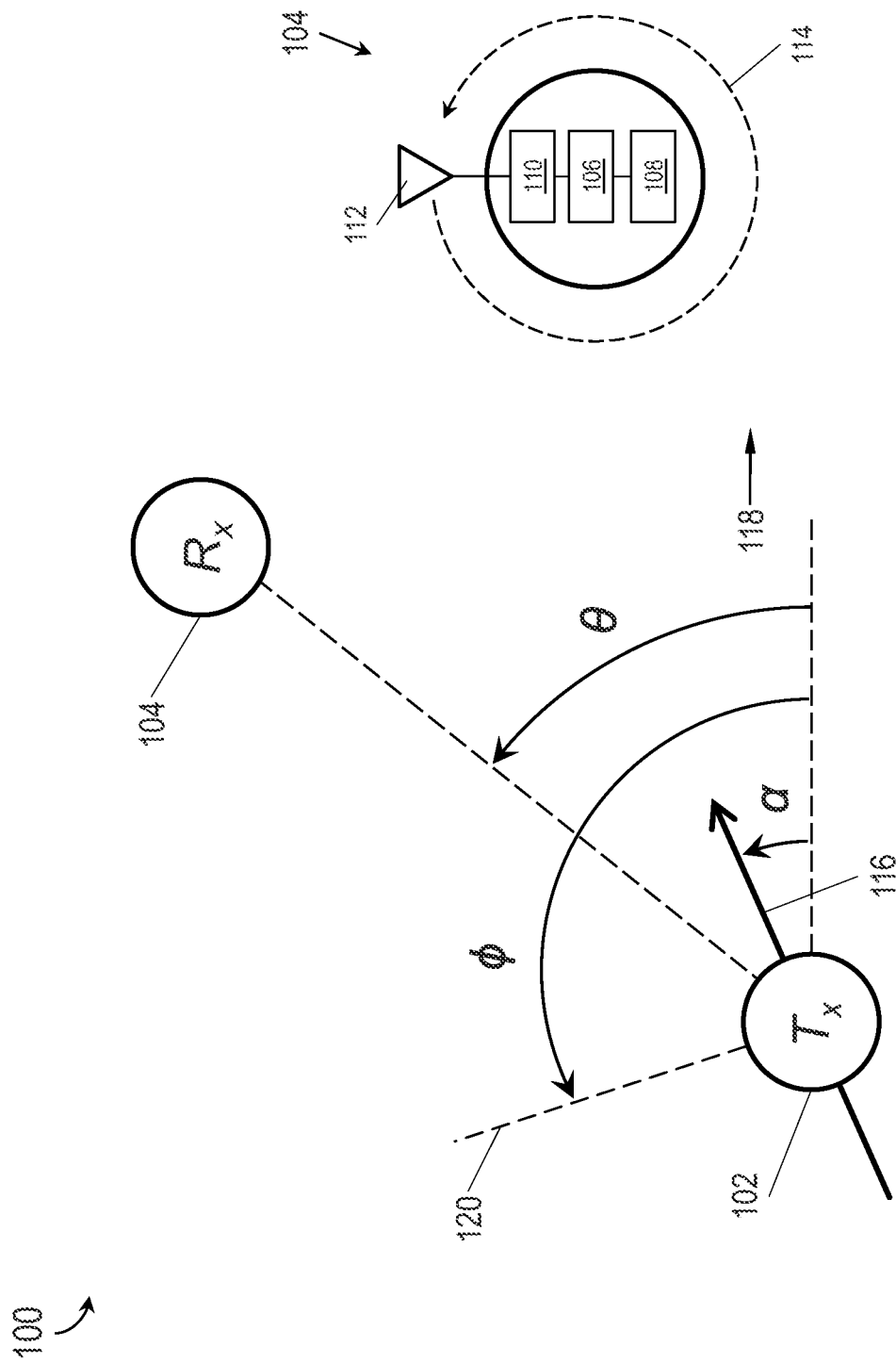
FIG. 1 is a diagrammatic illustration of a mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a network having beacon-based clusterhead nodes configured to compile spatial awareness information and distribute the compiled spatial awareness information via efficient flooding across the network. For example, the discussion and figures of FIGS. 13-18 are directed to a method and a system including a network having beacon-based clusterhead nodes configured to compile spatial awareness information and distribute the compiled spatial awareness information via efficient flooding across the network.

Referring generally to FIGS. 1-4C, some embodiments may utilize aspects of passive spatial awareness (PSA).

Some embodiments may include a system and method for determining relative velocity vectors, directions, and clock frequency offsets between mutually dynamic communication nodes of a mobile ad hoc network (MANET) or similar multi-node communications network. For example, via the use of omnidirectional antennas for Doppler null scanning (or, in some embodiments, directional antennas that require directional tracking via spatial scanning), directional topologies of neighbor nodes in highly dynamic network environments may be determined. Further, if Doppler null scanning knowledge is common to all nodes, receiving nodes may tune to the appropriate Doppler frequency shift to maintain full coherent sensitivity.

Referring to FIG. 1, a multi-node communications network 100 is disclosed. The multi-node communications network 100 may include multiple communications nodes, e.g., a transmitting (Tx) node 102 and a receiving (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios, mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104.

In embodiments, the Tx node 102 and Rx node 104 may both be moving in an arbitrary direction at an arbitrary speed, and may similarly be moving relative to each other. For example, the Tx node 102 may be moving relative to the Rx node 104 according to a velocity vector 116, at a relative velocity $V_{Tx}$ and a relative angular direction (an angle α relative to an arbitrary direction 118 (e.g., due east); θ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle φ relative to the arbitrary direction 118). The transmitting waveform (e.g., the communications interface 110 of the Tx node 102) may be informed by the platform (e.g., the controller 106) of its velocity vector and orientation (e.g., α, $V_T$) and may adjust its transmitting frequency to remove the Doppler frequency shift at each Doppler nulling direction 120 and angle φ.

In embodiments, even if the Doppler nulling protocol is not known to the Rx node 104, the Rx node may observe (e.g., monitor, measure) the net frequency offset as the Tx node 102 covers (e.g., steers to, orients to, directs antenna elements 112 to) a range of Doppler nulling directions 120 (e.g., relative to the arbitrary direction 118, each Doppler nulling direction 120 having a corresponding Doppler nulling angle φ). Accordingly, the Rx node 104 may determine the magnitude of the parameter A of the velocity vector $\vec{V'}_T$ of the Tx node 102, to the degree that the Tx node covers both extremes (e.g., achieves both a minimum and a maximum velocity relative to the Rx node) such that $$A = \frac{f}{c} \left| \vec{V'_T} \right|$$

where f is the transmitting frequency of the Tx node and c is the speed of light. For example, each frequency shift point (FSP) detected by the Rx node 104 at a given Doppler nulling direction 120 may correspond to a velocity vector of the Tx node 102 relative to the Rx node. As noted above, and as described in greater detail below, the magnitude parameter A may incorporate a maximum and minimum relative velocity. If, however, the range of Doppler nulling angles φ is insufficiently broad, the magnitude parameter A may only include relative maxima and minima for that limited range of Doppler nulling angles (e.g., as opposed to the full 360 degrees of possible Doppler nulling angles; see, for example, FIGS. 2A-3B below).

In some embodiments, the Doppler nulling protocol and set of Doppler nulling directions 120 (and corresponding angles φ) may be known to the Rx node 104 and common to all other nodes of the multi-node communications network 100. For example, the Tx node 102 may perform the Doppler nulling protocol by pointing a Doppler null in each Doppler nulling direction 120 and angle φ of the set or range of directions as described above. The Rx node 104 may monitor the Tx node 102 as the Doppler nulling protocol is performed and may therefore determine, and resolve, the net Doppler frequency shift for each Doppler nulling direction 120 and angle φ.

In embodiments, although both the Tx and Rx nodes 102, 104 may be moving relative to the arbitrary direction 118, monitoring of the Doppler nulling protocol by the Rx node 104 may be performed and presented in the inertial reference frame of the Rx node 104 (e.g., in terms of the movement of the Tx node 102 relative to the Rx node 104) to eliminate the need for additional vector variables corresponding to the Rx node. For example, the velocity vector of the Tx node 102 in a global reference frame may be shifted according to the velocity vector of the Rx node 104, e.g.:

$$\vec{V'}_T = \vec{V}_T - \vec{V}_R$$

where $\vec{V'}_T$ is the velocity vector of the Tx node in the inertial reference frame of the Rx node and $\vec{V}_T$, $\vec{V}_R$ are respectively the velocity vectors of the Tx node and the Rx node in the Earth reference frame. In embodiments, either or both of the Tx node 102 and Rx node 104 may accordingly compensate for their own velocity vectors relative to the Earth and convert any relevant velocity vectors and relative velocity distributions into a global reference frame, e.g., for distribution throughout the multi-node communications network 100. In addition, while the representation of the relative motion between the Tx and Rx nodes 102, 104 is here presented in two dimensions, the relative motion (and, e.g., any associated velocity vectors, angular directions, Doppler nulling directions, and other parameters) may be presented in three dimensions with the addition of vertical/z-axis components.

Figure 2A:
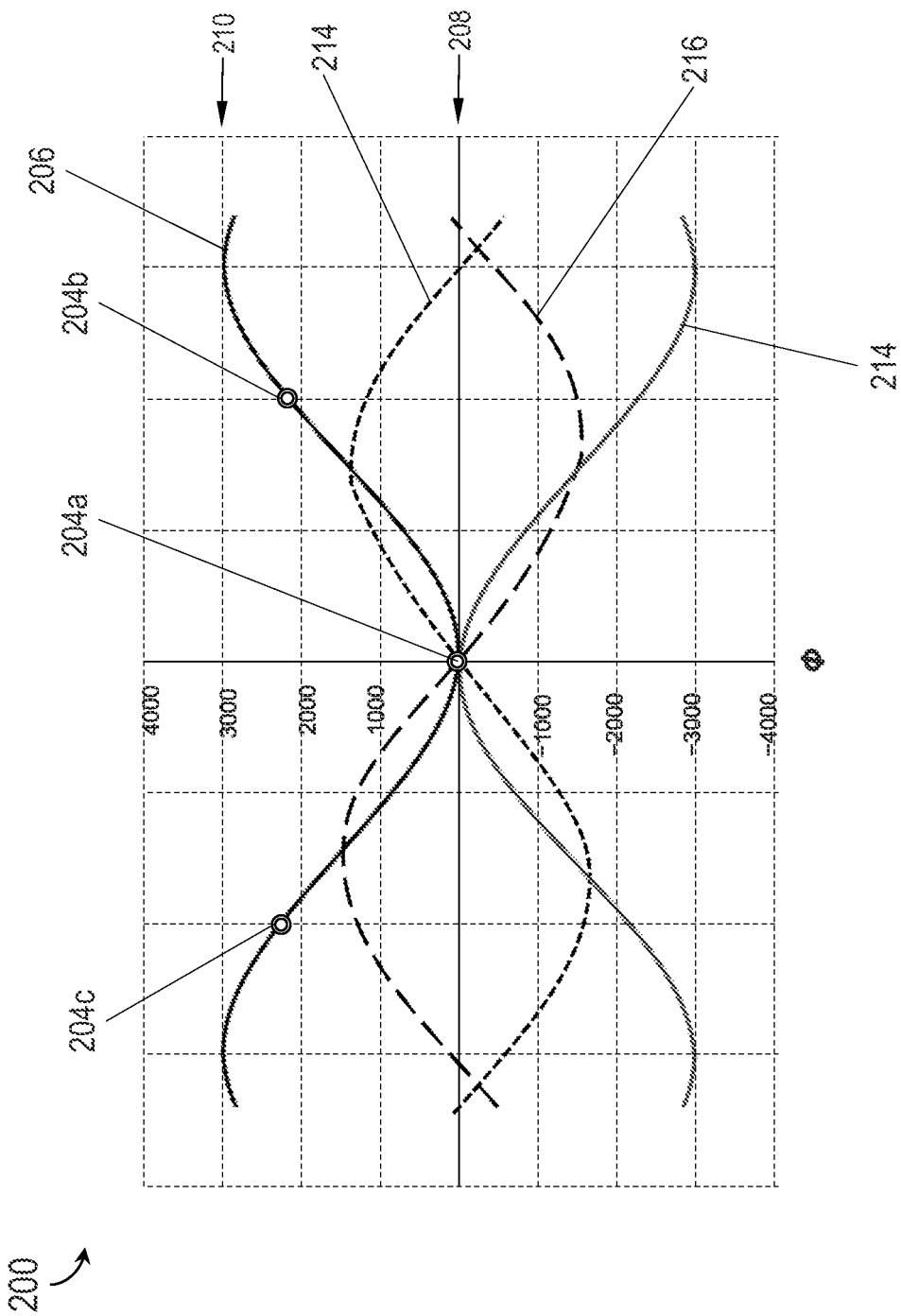
FIG. 2A is a graphical representation of frequency shift profiles within the MANET of FIG. 1.
Figure 2B:
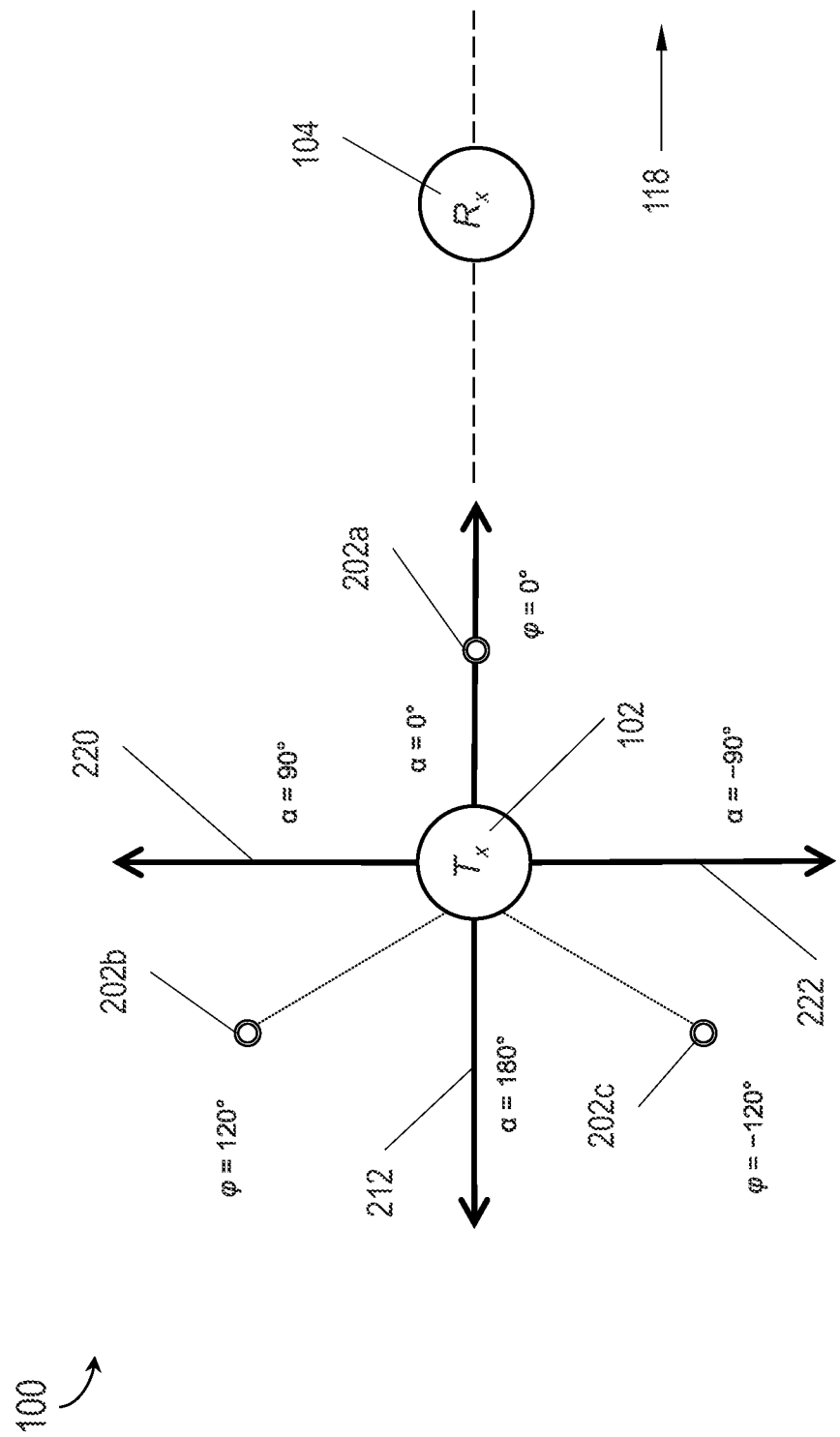
FIG. 2B is a diagrammatic illustration of varying directional components α of the velocity vector of a transmitting node $T_X$ with respect to the graphical representation of FIG. 2A.

Referring now to FIGS. 2A and 2B, the graph 200 and multi-node communication network 100 are respectively shown. The graph 200 may plot frequency shift profiles for varying directional components ($\alpha$, FIG. 2B) of the velocity vector of the Tx node (102, FIG. 2B) relative to the Rx node (104, FIG. 2B) for multiple Doppler nulling directions (120, FIG. 1) and angles $\phi$ (e.g., relative to the arbitrary direction (118, FIG. 2B)) and velocity $V_{Tx}$ of the Tx node. In the interest of clarity, the graph 200 and other plots of frequency shift profiles provided below may be scaled by c/f to eliminate the ratio f/c (where, as noted above, f is the transmitting frequency of the Tx node 102 and c is the speed of light).

In embodiments, the Rx node 104 may repeat the net Doppler frequency shift determination and resolution process for multiple Doppler nulling directions 120 and angles $\phi$ of the Tx node 102 (e.g., chosen at random or according to predetermined or preprogrammed protocol). For example, the Tx node 102 may scan through at least three Doppler nulling directions (202a-c, FIG. 2B)/angles $\phi$ and map, via the corresponding frequency shift points, the distribution of the dependent Doppler frequency shift for each Doppler nulling direction and angle $\phi$. The graph 200 may plot frequency shift profiles for varying directional components $\alpha$ relative to the arbitrary direction 118 assuming the angular direction $\theta=0$ (e.g., consistent with an Rx node 104 moving due east) and velocity $V_{Tx}$ of the Tx node 102=1500 m/s. As it is well known that the Doppler frequency shift is a sinusoidal distribution relative to the angle $\phi$ of the Doppler nulling directions 202a-c, measurements at multiple Doppler nulling directions of the Tx node 102 by the Rx node 104 may generate frequency shift points (204a-c, FIG. 2A) to which a frequency shift profile 206 may be mapped as a sinusoidal curve showing the distribution of relative velocity between the Tx and Rx nodes 102, 104 through the full range of Doppler nulling angles $\phi$ (e.g., assuming the maximum and minimum relative velocities are included).

In embodiments, the amplitude of the frequency shift profile 206 may correspond to the velocity of the Tx node 102 relative to the Rx node 104. For example, even if the Doppler nulling protocol is not known to the Rx node 104, a magnitude parameter A of the velocity vector $\vec{V'}_T$ of the Tx node 102 (e.g., in the reference frame of the Rx node) may still be determined, e.g., between a minimum relative velocity 208 (e.g., 0 m/s) and a maximum relative velocity 210 (e.g., 3000 m/s, or consistent with Tx and Rx nodes traveling in opposing directions ($\alpha=180°$, consistent with a Tx node traveling due west (212) and the phase-offset frequency shift profile 214).

In embodiments, as $\alpha$ varies the frequency shift profiles 214, 216, 218 may present as phase-offset versions of the frequency shift profile 206 (e.g., with similarly offset maximum and minimum relative velocities). For example (in addition to the frequency shift profile 214 noted above), the frequency shift profile 216 may correspond to $\alpha=90°$, consistent with a Tx node traveling due north (220) and the frequency shift profile 218 may correspond to $\alpha=-90°$, consistent with a Tx node traveling due south (222).

In embodiments, the frequency shift profiles 206, 214, 216, 218 may allow the Rx node 104 to derive parameters in addition to the magnitude parameter A of the velocity vector $\vec{V'}_T$ of the Tx node 102. For example, the true Doppler frequency shift due to the relative radial velocity between the Tx and Rx nodes 102, 104 may be, as seen by the Rx node:

$$\Delta f'_{Doppler} = \frac{f}{c} \left| \vec{V'}_T \right| \cos(\theta - \alpha)$$

and the Tx node 102 may, per the Doppler nulling protocol, adjust the transmitting frequency f due to its velocity projection at the Doppler nulling angle $\phi$ such that:

$$\Delta f_{Pr} = -\frac{f}{c} \left| \vec{V'}_T \right| \cos(\varphi - \alpha)$$

and the net Doppler frequency shift, also accounting for clock frequency offset $\Delta f_{clock}$, may therefore be:

$$\Delta f_{net} = \frac{f}{c} \left| \vec{V'}_T \right| [\cos(\theta - \alpha) - \cos(\varphi - \alpha)] + \Delta f_{clock}$$

assuming, for example, that the velocity vector and direction change slowly relative to periodic measurements of $\Delta f_{net}$. It should be noted that $\Delta f_{net}$ as presented above represents a net frequency offset from nominal incorporating f/c (compare, e.g., FIGS. 2A-B and accompanying text above). Under these conditions, from the perspective of the Rx node 104 the parameters $\alpha$, Tx, and $\theta$ may be taken as constants, and the net frequency offset $\Delta f_{net}$ may also be expressed as:

$$\Delta f_{net} = A \cos(\varphi + B) + C$$

where the constant parameters A, B, and C may be determined via at least three measurements of a Doppler nulling angle $\phi$. As noted above, $$A = \frac{f}{c} \left| \vec{V'}_T \right|$$

while also $$B = \pi - \alpha$$

and $$C = \frac{f}{c} \left| \vec{V'}_T \right| \cos(\theta - \alpha) + \Delta f_{clock}$$

where, as noted above, A may correspond to the magnitude of the velocity vector of the Tx node 102 relative to the Rx node 104. Similarly, B may correspond to the directional component $\alpha$ of the velocity vector and C to the angular direction $\theta$ of the Rx node 104.

In embodiments, once the parameters A, B, and C are determined, the parameters $\alpha$, $V'_T$, $\theta$, may be derived therefrom as can be seen above. For example, when the clock frequency offset $\Delta f_{clock}$ is zero it is straightforward to derive θ from C above. However, when the clock frequency offset $\Delta f_{clock}$ is nonzero, the Rx node 104 may determine $\Delta f_{clock}$ by exchanging information with the Tx node 102. For example, the Rx and Tx nodes 104, 102 may switch roles: the Rx node 104 may perform the Doppler nulling protocol for various Doppler nulling directions 120 and angles ϕ while the Tx node 102 monitors the Doppler nulling protocol to resolve the net Doppler frequency shift for θ'=θ+π (and $\Delta f'_{clock}=-\Delta f_{clock}$). The Tx node 102 may share this information with the Rx node 104, which may merge information from both directions to determine θ and $\Delta f_{clock}$.

Figure 3A:
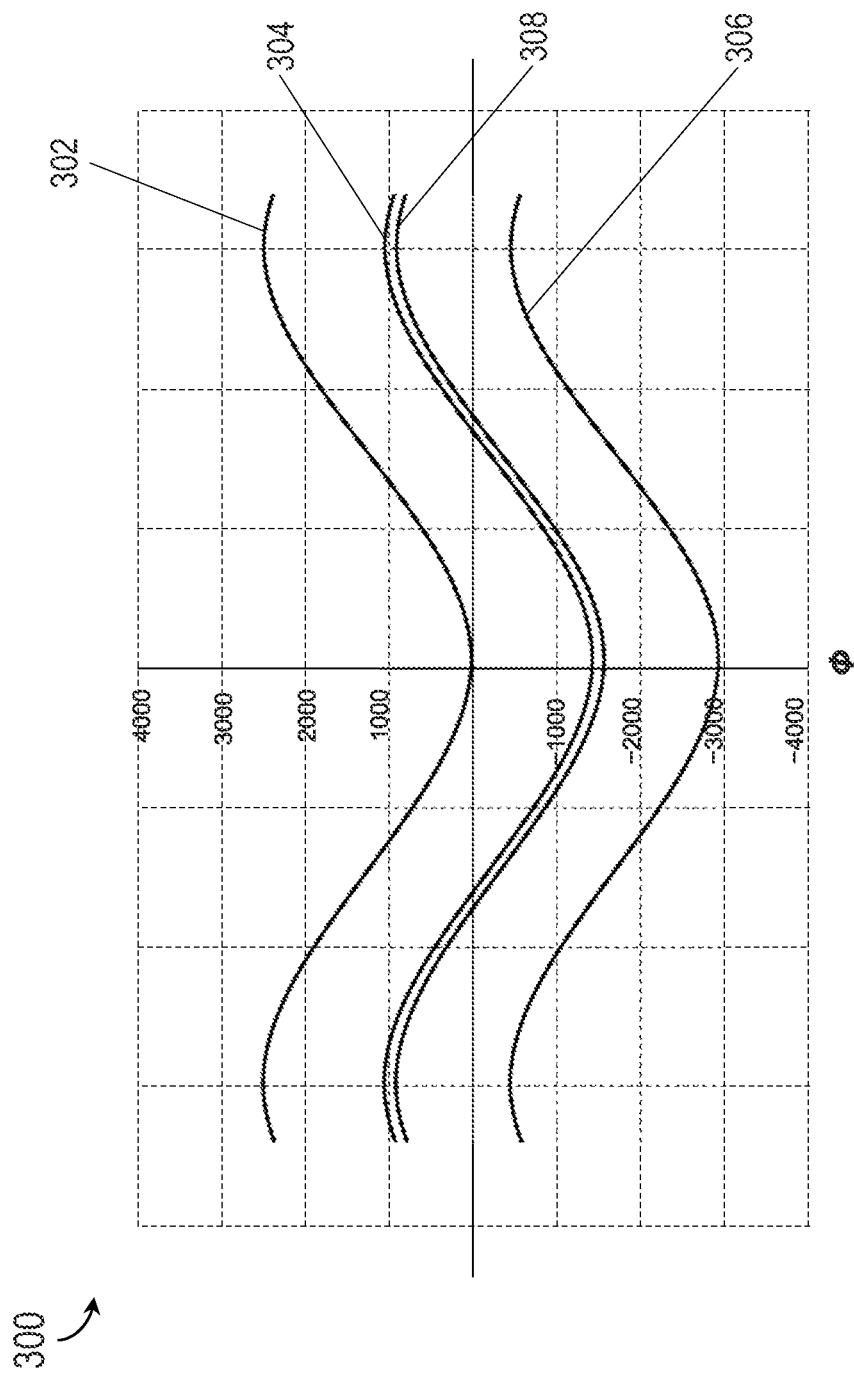
FIG. 3A is a graphical representation of frequency shift profiles within the MANET of FIG. 1.
Figure 3B:
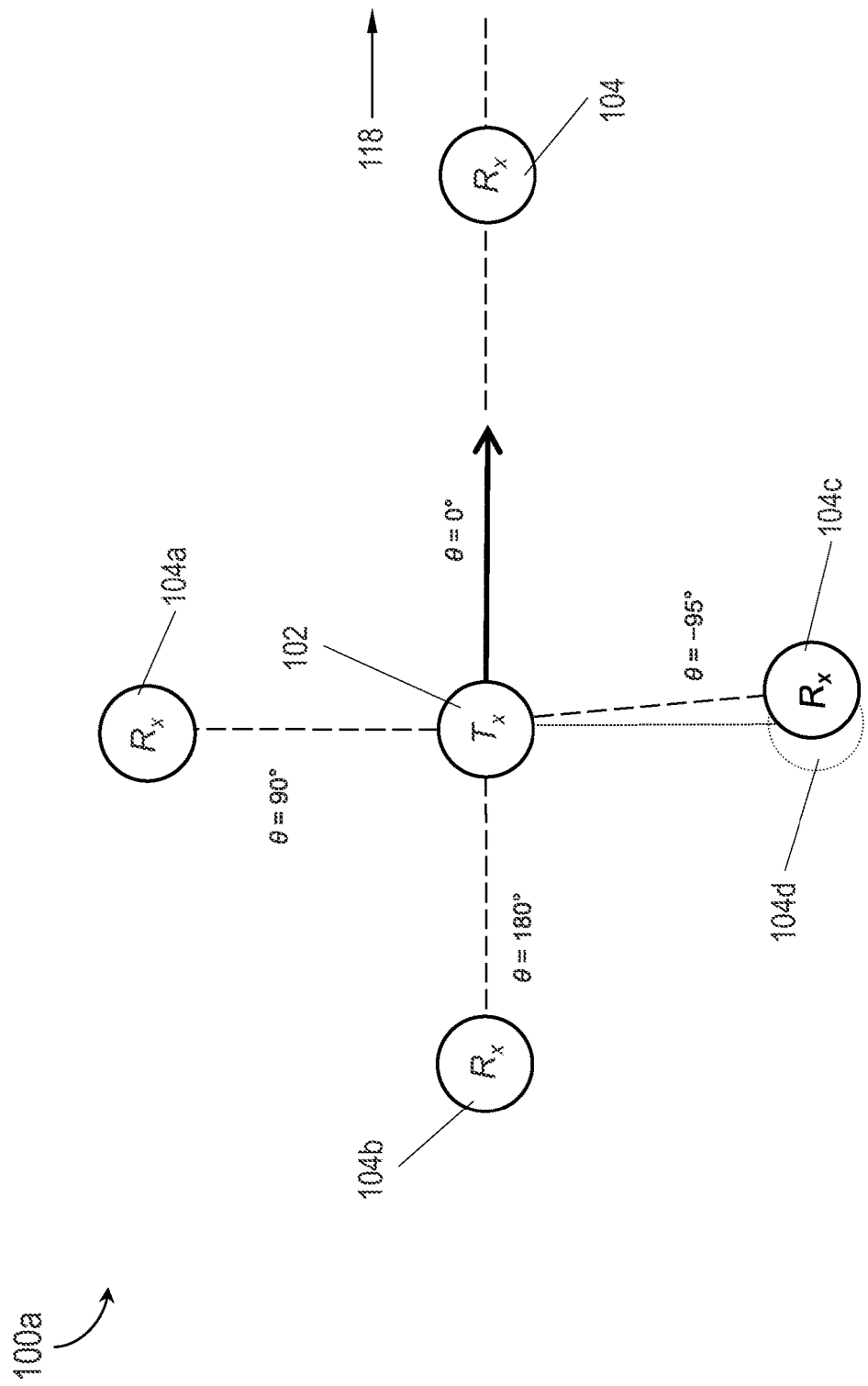
FIG. 3B is a diagrammatic illustration of varying angular directions θ of a receiving node $R_X$ with respect to the graphical representation of FIG. 3A.

Referring now to FIGS. 3A and 3B, the graph 300 and multi-node communication network 100a may be implemented and may function similarly to the graph 200 and multi-node communication network 100 of FIGS. 2A and 2B, except that the graph 300 and multi-node communication network 100a may reflect a consistent zero directional component α (e.g., a Tx node (102, FIG. 3B) moving in or parallel to the arbitrary direction (118, FIG. 3B, e.g., due east)) and variable angular directions θ of the Rx node (104, 104a-c, FIG. 3B) relative to the Tx node.

In embodiments, the frequency profiles (302, 304, 306, 308; FIG. 3A) may respectively be associated with θ=0° (e.g., consistent with the Rx node 104 lying directly in the path of the Tx node 102); θ=90° (Rx node 104a); θ=180° (Rx node 104b, consistent with the Tx node moving in the opposing direction from the Rx node (e.g., an Rx node moving due west)); and θ=−95° (Rx node 104c). Referring in particular to FIG. 3A, the frequency profiles 302-308 may be shifted in amplitude (rather than in phase, as shown by the graph 200 of FIG. 2A) such that the Doppler frequency shift varies only in magnitude (e.g., relative maximum and minimum velocities). It may be noted that the frequency shift profile 304 (θ=90°) appears identical to the frequency shift profile associated with θ=−90° (Rx node 104d), where both angular directions θ are perpendicular to the velocity vector of the Tx node 102 (directional component α) but mutually opposed. If, for example, an Rx node 104a, 104d communication node enters the multi-node communication network 100a at such a position and velocity, a one-time determination may have to be made by other means (e.g., or by waiting for a change in Rx node velocity or in θ) to precisely determine θ (e.g., +90°/−90°), after which determination the precise θ can be tracked without ambiguity.

In some embodiments, the Rx node 104, 104a-c may assess and determine Doppler effects due to the relative motion of the Tx node 102 by measuring time differential points (TDP) rather than FSPs. For example, a signal transmitted at 1 kHz by the Tx node 102 may be subject to 10 Hz of Doppler frequency shift. This one-percent (1%) change in frequency may be alternatively expressed as a differential of one percent in the time required to measure a cycle of the transmitted signal (or, e.g., any arbitrary number of cycles). The Doppler effect may be precisely and equivalently characterized in either the frequency domain or the time domain. For example, the graphs 200, 300 of FIGS. 2A and 3A, which plot the velocity vector of the Tx node 102 relative to the Rx node 104, 104a-c (y-axis) against the Doppler nulling angle ϕ, may remain consistent between the frequency domain and the time domain, with the exception that each FSP (204a-c, FIG. 2A) corresponds to a measured time differential at a given Doppler nulling angle ϕ (e.g., to a TDP) rather than to a measured frequency shift at that nulling angle.

In some embodiments, due to the nature of the transmitted signal (or, e.g., other conditions) it may be easier or more advantageous for the Rx node 104 to determine the Doppler shift in the time domain rather than in the frequency domain. For example, when the signal transmitted by the Tx node 102 at a given Doppler nulling direction (202a-c, FIG. 2B) consists of a series of short pulses and a long pulse repetition interval (e.g., as opposed to, e.g., a continuous short-duration pulse), the Rx node 104 may instead determine the Doppler shift to be resolved by measuring the time differential between received cycles of the transmitted signal and generating time differential profiles based on each determined set of TDPs. As the resulting time differential profiles plot the relative velocity vector of the Tx node 102 over a set of Doppler nulling angles ϕ similarly to the frequency shift profile graphs 200, 300, of FIGS. 2A and 3A, the same information can be determined by the Rx node 104.

Figure 4A:
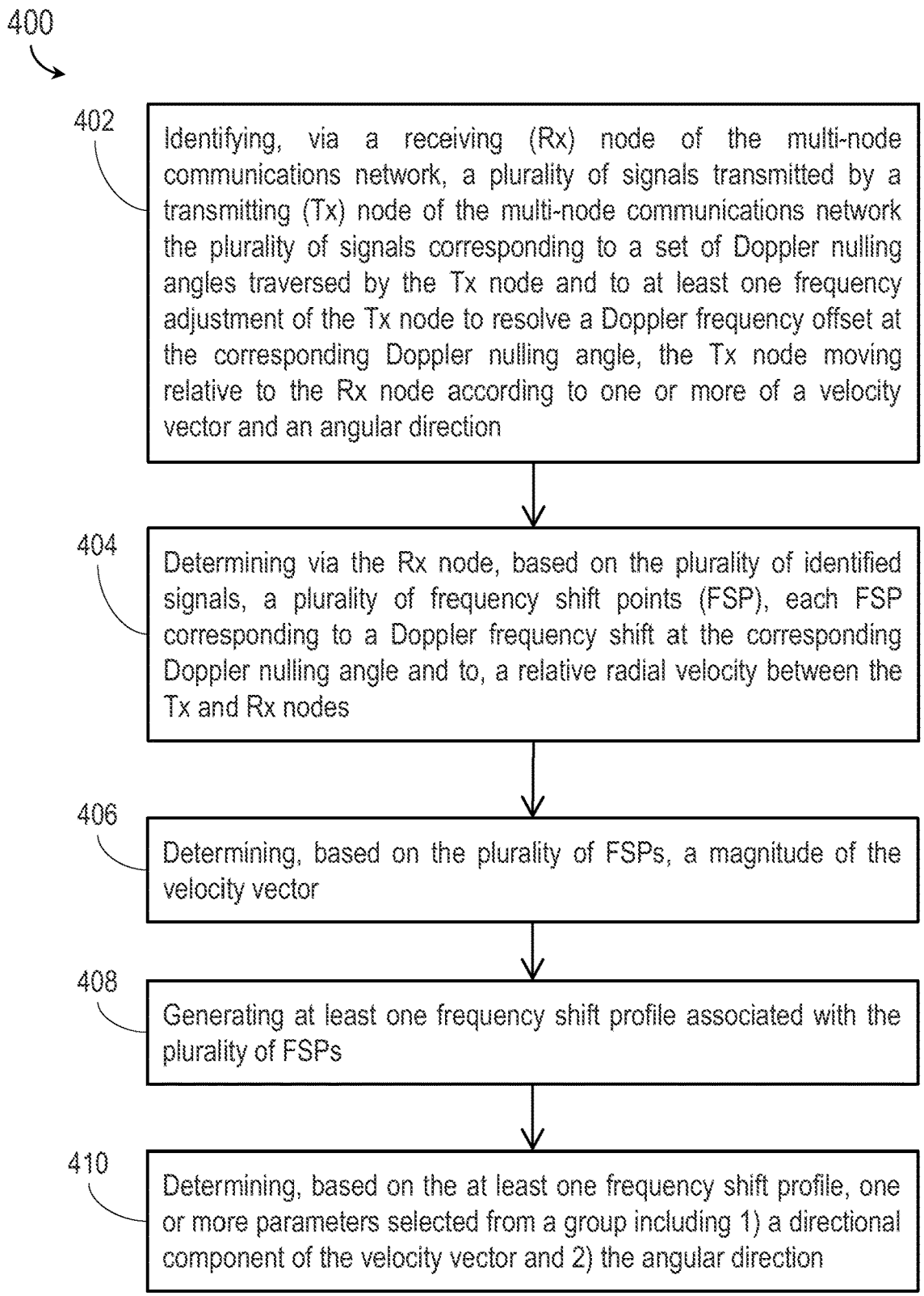
FIGS. 4A, 4B, and 4C are flow diagrams illustrating a method for Doppler frequency offset determination according to example embodiments of this disclosure.
Figure 4B:
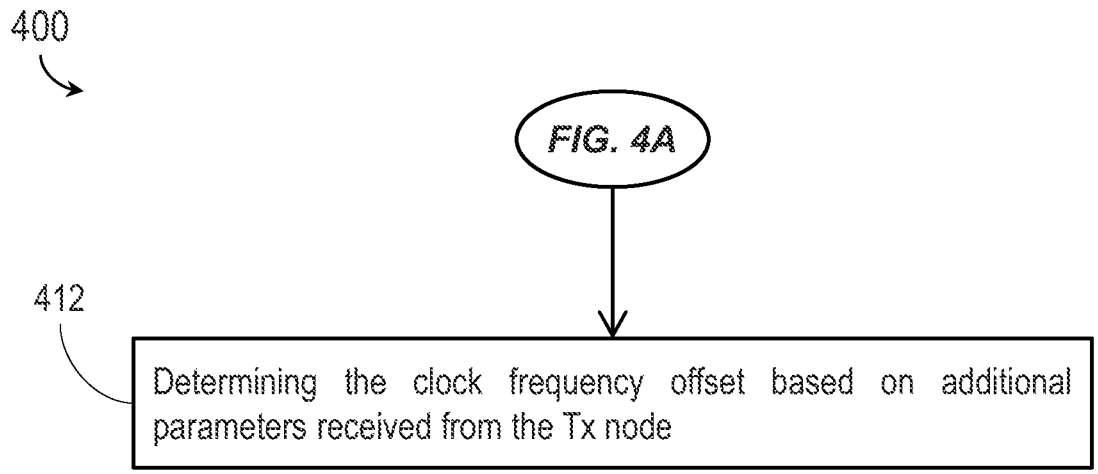
Figure 4C:
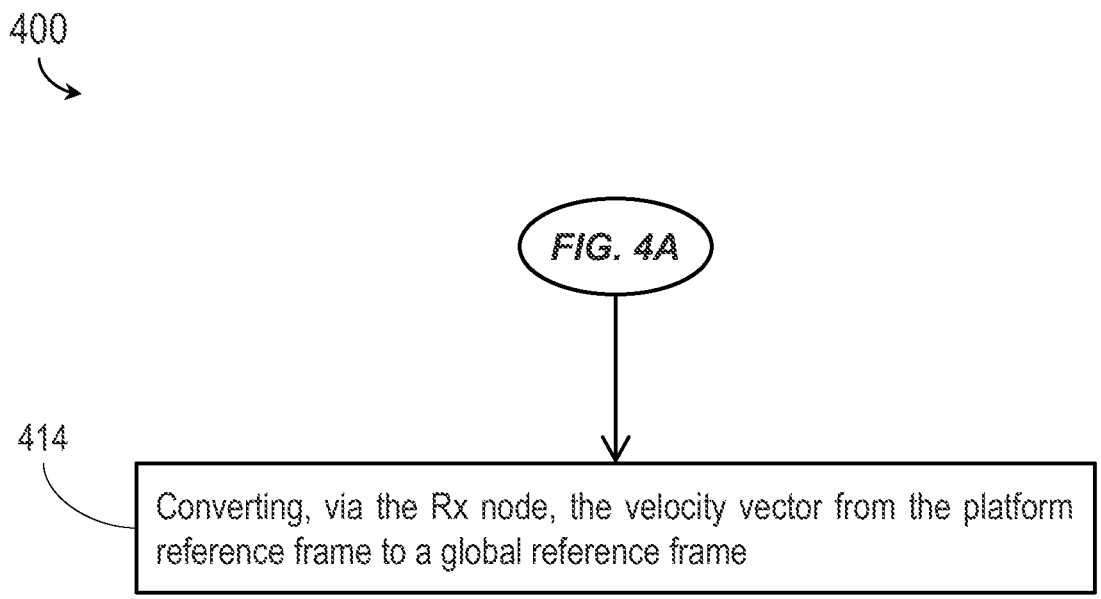

FIGS. 4A-C—Method

Referring now to FIG. 4A, the method 400 may be implemented by the multi-node communications networks 100, 100a and may include the following steps.

At a step 402, a receiving (Rx) node of the multi-node communications network monitors a transmitting (Tx) node of the network to identify signals transmitted by the Tx node through a range of Doppler nulling angles (e.g., or a set of discrete Doppler nulling angles), the signals including adjustments to the transmitting frequency to counter Doppler frequency offset at each Doppler nulling angle. For example, the Tx node may be moving relative to the Rx node according to a velocity vector and an angular direction. Each identified signal may correspond to a particular Tx frequency adjustment (e.g., a net frequency shift detected by the Rx node) at a particular Doppler nulling angle to resolve a Doppler frequency offset at that angle.

At a step 404, a controller of the Rx node determines, based on the monitoring and identified signals, a set (e.g., three or more) of frequency shift points (FSP), where each FSP corresponds to a net frequency shift of the signal. For example, each FSP may correspond to the Tx node (e.g., aware of its velocity vector and platform orientation) scanning in a Doppler nulling direction and adjusting its transmit frequency to resolve the Doppler offset at the corresponding Doppler nulling angle ϕ according to a nulling protocol, resulting in the net frequency shift detected by the Rx node. In some embodiments, the Rx node measures the net frequency shift in the time domain rather than in the frequency domain. For example, the Rx node may measure a time differential associated with a received cycle or cycles of the identified signal, the time differential corresponding to the net frequency shift at the corresponding Doppler nulling angle.

At a step 406, the controller determines, based on the plurality of frequency shift points, a magnitude of the relative velocity vector between the Tx and Rx nodes (e.g., in the reference frame of the Rx node). For example, from the magnitude of the velocity can be derived a maximum and minimum relative velocity with respect to the range of Doppler nulling angles ϕ.

In some embodiments, the range or set of Doppler nulling angles ϕ may be known to all nodes of the multi-node communications network (e.g., including the Rx node) and the method 400 may include the additional steps 408 and 410.

At the step 408, the Rx node maps the determined FSPs to a frequency shift profile corresponding to a distribution (e.g., a sinusoidal curve) of the ϕ-dependent net frequency shift over all possible Doppler nulling angles ϕ. In some embodiments, the controller further determines a phase offset of the frequency shift profile.

At the step 410, the controller determines, based on the frequency shift profile, a velocity $V'_T$ and a directional component α of the velocity vector (e.g., of the Tx node 102 relative to an arbitrary direction) and the angular direction θ (e.g., of the Rx node relative to the arbitrary direction).

Referring also to FIG. 4B, the method 400 may include an additional step 412. At the step 412, the angular direction θ incorporates a clock frequency offset between the Tx and Rx nodes, which the Rx node determines based on additional information received from the Tx node.

Referring now to FIG. 4C, the method 400 may include an additional step 414. At the step 414, the velocity vector may be in an inertial reference frame specific to the Rx node. For example, the Rx node may convert the velocity vector from its own platform reference frame to a global reference frame.

Referring generally to FIGS. 5-8B, some embodiments may utilize aspects of efficient information and collection distribution (EICD).

Some embodiments of the inventive concepts disclosed herein are directed to systems and methods for efficiently collecting and distributing mission-critical information (MCI) throughout a mobile ad hoc network (MANET) or other like multi-node communications network. For example, U.S. patent application Ser. No. 16/698,230, which is herein incorporated by reference in its entirety, discloses the collection and distribution of position location information (PLI) via selected critical nodes of the MANET. U.S. patent application Ser. No. 16/987,671, which is also herein incorporated by reference in its entirety, discloses the use of dominating sets of critical nodes to reduce overall packet flooding with respect to link status advertisements and passive clustering of MANET nodes. Embodiments of the inventive concepts disclosed herein may reduce overhead (and similarly reduce bandwidth and potential channel interference) by eliminating the need for every node to flood or broadcast other types of MCI (including, but not limited to, dynamic spectrum allocations (DSA) or channel quality measurements). Similarly, the efficient distribution of MCI may be used for clustering or reconstruction of very large MANETs.

Figure 5:
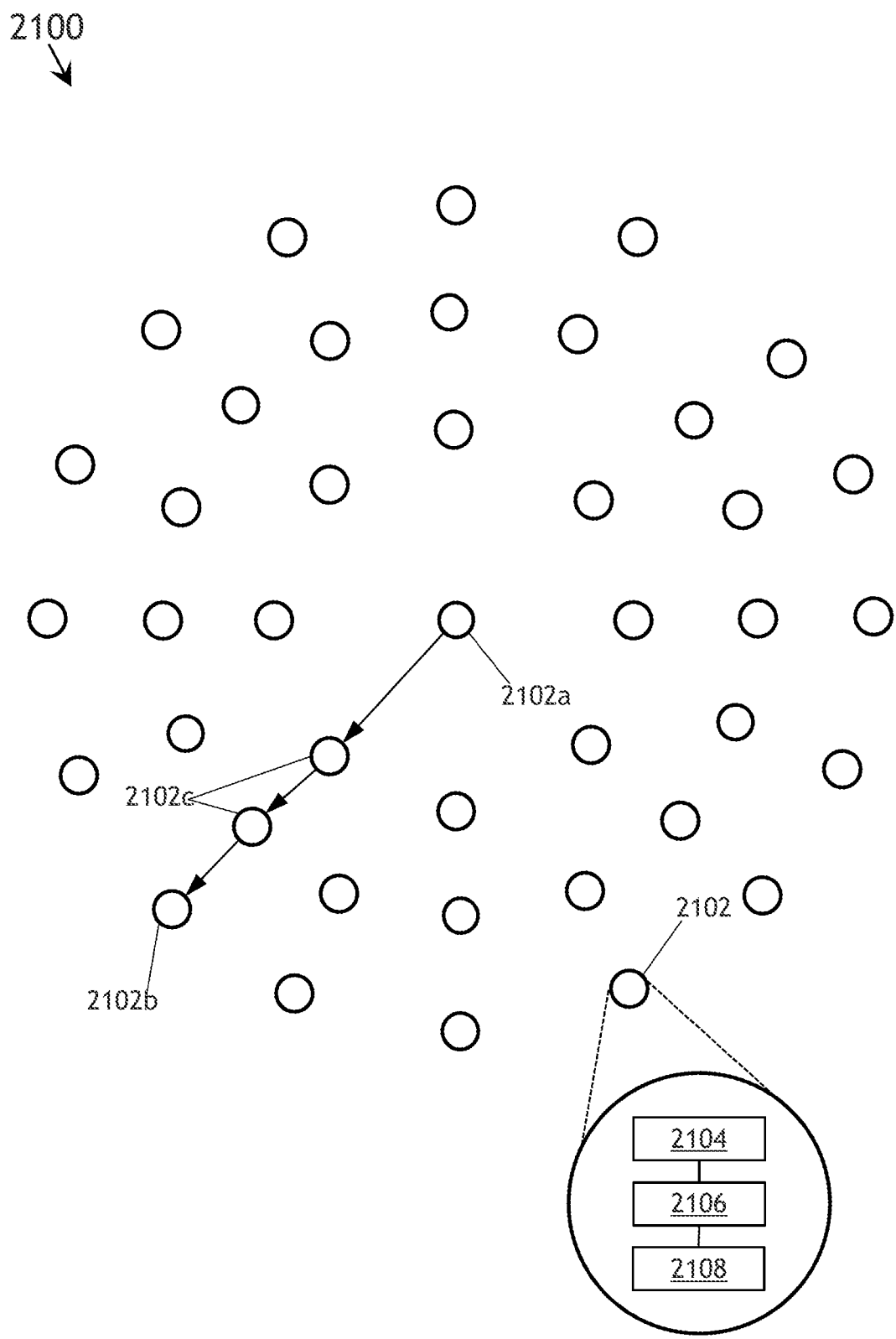
FIG. 5 is a diagrammatic illustration of a multi-node communications network according to example embodiments of this disclosure.

Referring to FIG. 5, a multi-node communications network 2100 is disclosed. The multi-node communications network 2100 may include communications nodes 2102.

In embodiments, the multi-node communications network 2100 may include any multi-node communications network known in the art. For example, the multi-node communications network 2100 may include a mobile ad-hoc network (MANET) in which each communications node 2102 within the multi-node communications network is able to move freely and independently. Similarly, the one or more communications nodes 2102 may include any communications node known in the art which may be communicatively coupled. In this regard, the one or more communications nodes 2102 may include any communications node known in the art for transmitting/transceiving data packets. For example, the one or more communications nodes 2102 may include, but are not limited to, radios, mobile phones, smart phones, tablets, smart watches, laptops, and the like. In embodiments, each communications node 2102 of the multi-node communications network 2100 may include, but is not limited to, a respective controller 2104 (e.g., control processor), memory 2106, and communication interface 2108.

The controller 2104 provides processing functionality for at least the communications node 2102 and can include any number of processors, micro-controllers, circuitry, field programmable gate array (FPGA) or other processing systems, and resident or external memory for storing data, executable code, and other information accessed or generated by the communications node 2102. The controller 2104 can execute one or more software programs embodied in a non-transitory computer readable medium (e.g., memory 2106) that implement techniques described herein. The controller 2104 is not limited by the materials from which it is formed or the processing mechanisms employed therein and, as such, can be implemented via semiconductor(s) and/or transistors (e.g., using electronic integrated circuit (IC) components), and so forth.

The memory 2106 can be an example of tangible, computer-readable storage medium that provides storage functionality to store various data and/or program code associated with operation of the communications node 2102/controller 2104, such as software programs and/or code segments, or other data to instruct the controller 2104, and possibly other components of the communications node 2102, to perform the functionality described herein. Thus, the memory 2106 can store data, such as a program of instructions for operating the communications node 2102, including its components (e.g., controller 2104, communication interface 2108, etc.), and so forth. It should be noted that while a single memory 2106 is described, a wide variety of types and combinations of memory (e.g., tangible, non-transitory memory) can be employed. The memory 2106 can be integral with the controller 2104, can comprise stand-alone memory, or can be a combination of both. Some examples of the memory 2106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 2108 can be operatively configured to communicate with components of the communications node 2102. For example, the communication interface 2108 can be configured to retrieve data from the controller 2104 or other devices (e.g., other nodes 2102), transmit data for storage in the memory 2106, retrieve data from storage in the memory 2106, and so forth. The communication interface 2108 can also be communicatively coupled with the controller 2104 to facilitate data transfer between components of the communications node 2102 and the controller 2104. It should be noted that while the communication interface 2108 is described as a component of the communications node 2102, one or more components of the communication interface 2108 can be implemented as external components communicatively coupled to the communications node 2102 via a wired and/or wireless connection. The communications node 2102 can also include and/or connect to one or more input/output (I/O) devices. In embodiments, the communication interface 2108 includes or is coupled to a transmitter, receiver, transceiver, physical connection interface, or any combination thereof.

It is contemplated herein that the communication interface 2108 of a communications node 2102 may be configured to communicatively couple to additional communication interfaces 2108 of additional communications nodes 2102 of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the multi-node communications network 2100 may determine the shortest route for transmission of a data packet between a source node 2102a and a destination node 2102b. For example, the source node 2102a may not transmit data packets directly to the destination node 2102b, but via one or more relay nodes 2102c which forward the data packets to the destination node 2102b.

In embodiments, the multi-node communications network 2100 may, via global collaboration between its participating communications nodes 2102, construct the network topology by generating an independent dominating set (IDS), or a subset of all communications nodes within the multi-node communications network. For example, under OLSR every communications node 2102, 2102a-c may be selected as an MPR node in the worst case (e.g., on a per-node basis without global collaboration), resulting in excessive routing overhead (e.g., due to every MPR node transmitting link status advertisements (LSA)) and/or bandwidth requirements (e.g., due to excessive hello messaging incorporating two-hop neighbor lists).

Figure 6:
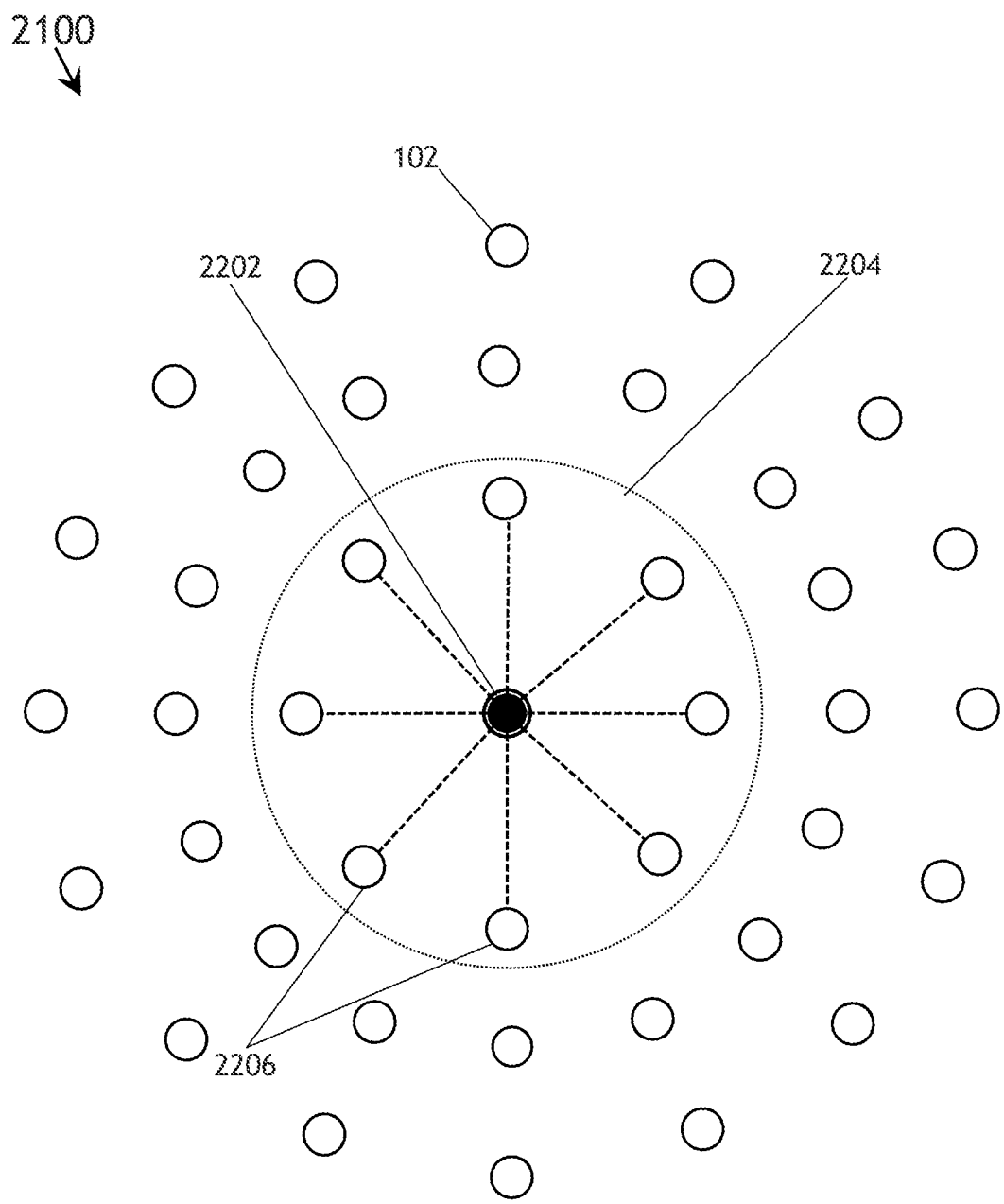
FIG. 6 is a diagrammatic illustration of clustering operations of the multi-node communications network of FIG. 5.

Referring also to FIG. 6, in embodiments the multi-node communications network 100 may organize (e.g., or reorganize) by constructing a dominating set (DS) of communications nodes 2102. For example, the DS may include a subset of communications nodes 2102 such that 1) the communications nodes comprising the DS are not neighbors to each other, i.e., are not communicatively coupled to each other and 2) the associated link statuses of the communications nodes comprising the DS can reach every communications node of the multi-node communications network 2100.

In embodiments, the DS may comprise a set of clusterhead nodes 2202 within the multi-node communications network 2100, each clusterhead node 2202 associated with a cluster 2204 of neighbor nodes 2206 to which the clusterhead node is directly communicatively connected. For example, based on traffic received from within the multi-node communications network 2100, the clusterhead node 2202 (e.g., via its controller (2104, FIG. 5)) may transition to clusterhead node status, e.g., from gateway node status or ordinary node status. The state transitions of communications nodes 2102 may be determined according to one or more passive clustering procedures and their associated state transition algorithms, e.g., efficient flooding with passive clustering (EFPC), zero overhead efficient flooding (ZOEF), or any other like passive clustering procedures.

In embodiments, the DS consisting of the minimally necessary number of nodes 2202 for reaching every communications node of the multi-node communications network 2100 may be known as an independent dominating set (IDS).

In embodiments, the cluster 2204 may include any neighbor nodes 2206 in direct communication with the clusterhead node 2202 or that are two-hop neighbors to each other (e.g., two neighbor nodes 2206 in communication with each other via the clusterhead node 2202). In some embodiments, the size of the cluster 2204 may be determined by the transmission range of the clusterhead node 2202. It should be noted that the instant disclosure may use the term "neighbor node 2206" interchangeably with "gateway node" or "ordinary node", as each neighbor node to a clusterhead node 2202, e.g., the nodes in communication with the clusterhead node, may be either a gateway node or an ordinary node (or some other type of critical or noncritical node respectively), depending on the clustering structure and/or associated clustering statuses of the multi-node communications network 2100).

In embodiments, the designation of the clusterhead node 2202 (e.g., in addition to any other clusterhead nodes within the multi-node communications network 2100) may be based on received traffic from its neighbor nodes 2206. For example, hello messages or other network traffic received from a neighbor node 2206 may indicate a status transition in the transmitting neighbor node (which may in turn be driven by, e.g., the addition to or the deletion from the multi-node communications network 2100 of a communications node 2102). This received status transition, or several received status transitions from multiple neighbor nodes 2206, may cause the clusterhead node 2202 to change its own node status. In some embodiments, the clusterhead node 2202 may initiate a network restructuring and defining of the IDS via an initial flooding to all communications nodes 2102 within the multi-node communications network 2100 (e.g., according to one or more efficient flooding (EF) procedures for data packet flooding).

Embodiments of the inventive concepts disclosed herein are not limited to the clustering structure described above, but may be applicable to any other multi-node communications network 2100 incorporating clusterhead nodes 2202, as opposed to other communications nodes within the multi-node communications network. It is noted herein that the clustering structure (e.g., clustering hierarchy) of the present disclosure is not to be regarded as a limitation of the present disclosure, unless noted otherwise herein. In this regard, it is contemplated herein that any clustering hierarchy including two or more types/statuses of communication nodes 2102 may be utilized to implement embodiments of the present disclosure.

Figure 7A:
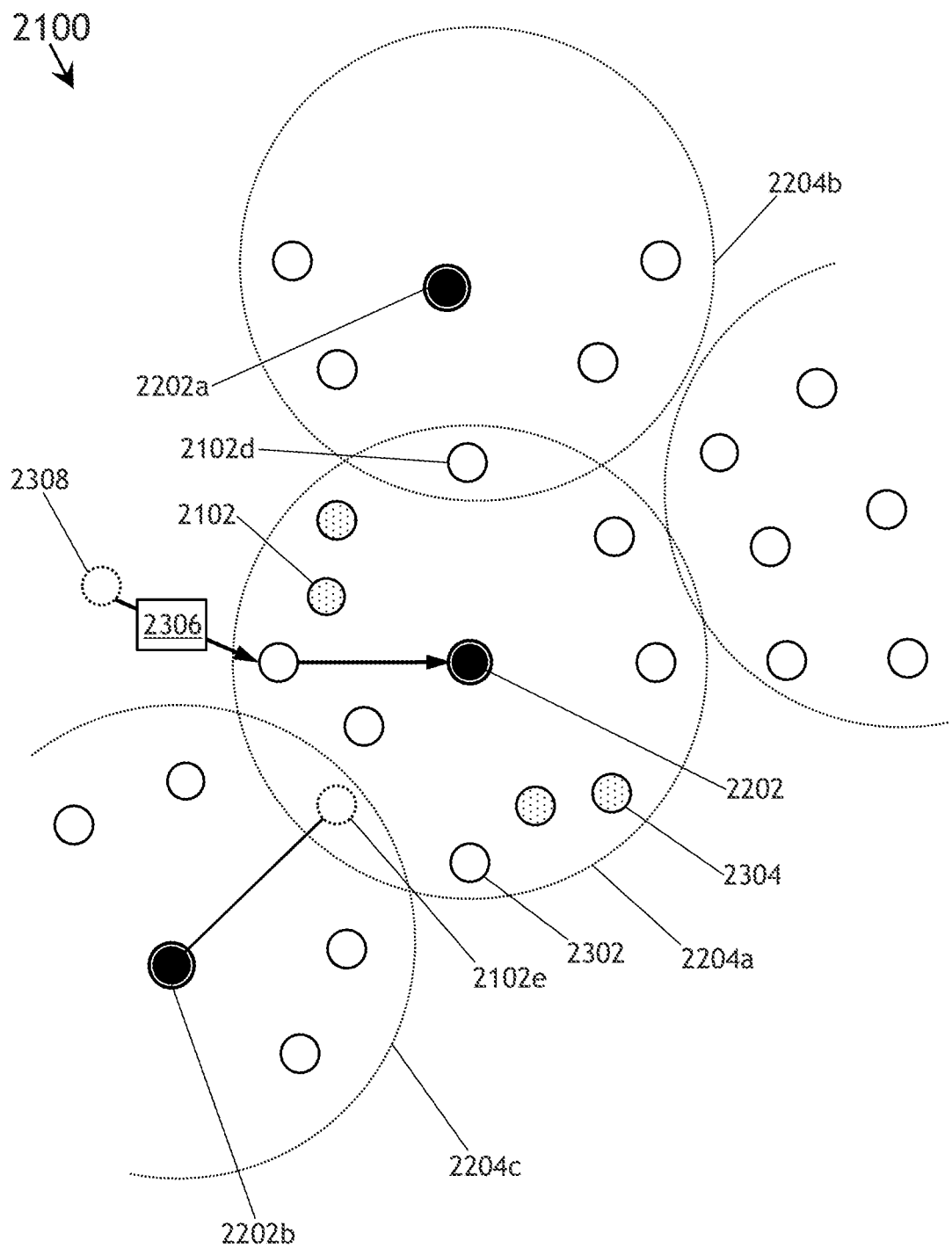
FIG. 7A is a diagrammatic illustration of a cluster of nodes within the multi-node communications network of FIG. 5.
Figure 7B:
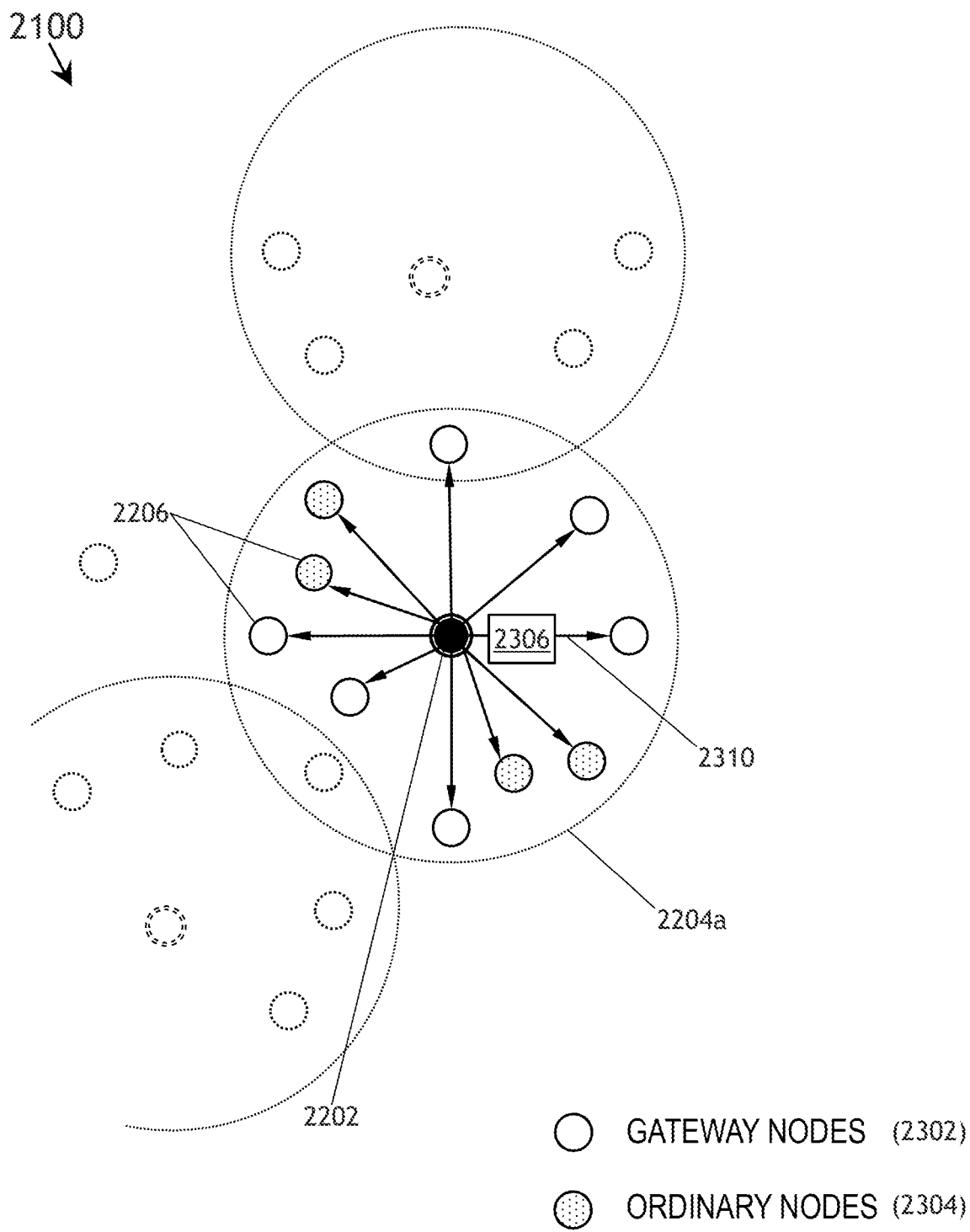
FIG. 7B is a diagrammatic illustration of mission-critical information (MCI) request packet distribution operations of the cluster of FIG. 7A.

Referring to FIG. 7A, the cluster 2204a may be implemented and may function similarly to the cluster 2204 of FIG. 6, except that the cluster 2204a may acquire additional communications nodes 2102 within the transmission range of the clusterhead node 2202. For example, the cluster 2204a may include, in addition to its clusterhead node 2202, gateway nodes 2302 and ordinary (e.g., noncritical) nodes 2304. In embodiments, gateway nodes 2302 may automatically relay any received data packets or messages unless otherwise precluded from doing to (e.g., via time-to-live (TTL) information contained within a data packet indicating that the packet is either not to be relayed or has already been relayed).

In embodiments, the communications nodes 2102d-e may be located within the transmission range of more than one clusterhead node and may therefore choose a primary clusterhead and cluster. For example, the communications node 2102d may be within range of clusterhead nodes 2202, 2202a (e.g., within clusters 2204a, 2204b) and may elect to join cluster 2204a, with clusterhead node 2202 as its primary clusterhead. Similarly, the communications node 2102e may be within range of clusterhead nodes 2202, 2202b (e.g., within clusters 2204a, 2204c) but may elect to join cluster 2204c, with clusterhead node 2202b as its primary clusterhead.

In embodiments, the clusterhead node 2202 may receive an MCI request packet 2306, or a request for communications nodes 2102 to forward their MCI data. For example, the MCI request packet 2306 may originate at a source node 2308 (e.g., command post; a communications node 2102 external to the cluster 2204a, but still within the multi-node communications network 2100). In some embodiments, the MCI request packet 306 may be received by a gateway node 2302 of the cluster 2204a, and relayed by the gateway node to the clusterhead node 2202.

Figure 8A:
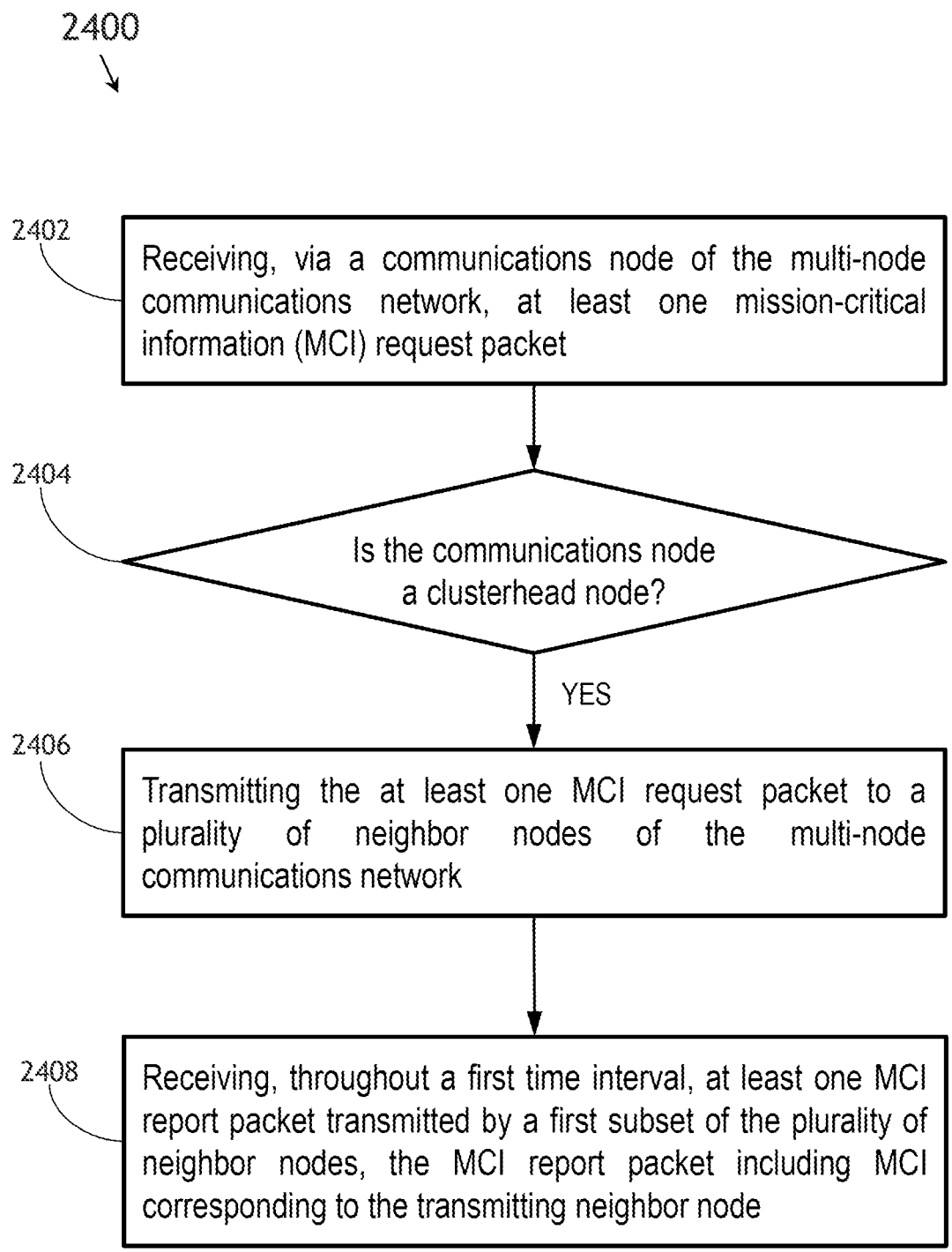
FIGS. 8A and 8B are process flow diagrams illustrating a method for efficient collection and distribution of MCI according to example embodiments of this disclosure.
Figure 8B:
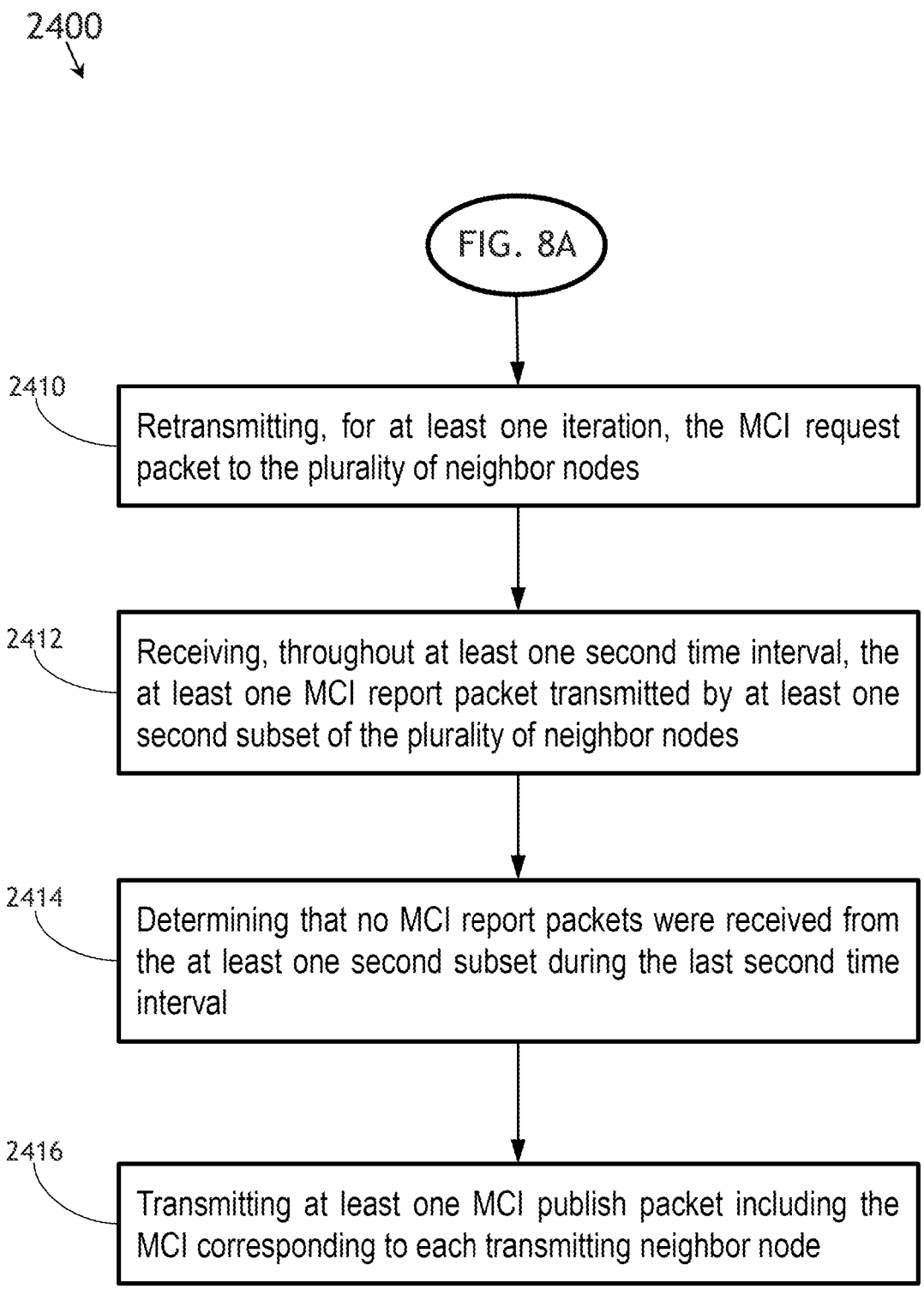

Referring now to FIG. 8B, the cluster 2204a is disclosed.

In embodiments, the clusterhead node 2202 may receive the MCI request packet 2306 and collect information from the neighbor nodes 2206 of its cluster 2204a, e.g., all communications nodes (2102, FIG. 5) communicatively linked to, and hearing from, the clusterhead node 2202. For example, the clusterhead node 2202 may broadcast (2310) the received MCI request packet 2306 to one-hop neighbors on its local neighbor list, e.g., including gateway nodes 2302 and ordinary nodes 2304.

In some embodiments, the clusterhead node 2202 may distribute the MCI request packet 2306 throughout its cluster 2204a via zero overhead efficient flooding (ZOEF), efficient packet flooding with passive clustering (EFPC), or any other appropriate packet flooding or packet broadcasting procedures or schemes.

In some embodiments, the MCI request packets 2306 distributed by the clusterhead node 2202 may include one or more requesting characteristics for identifying particular neighbor nodes 2206 of the clusterhead node (e.g., gateway nodes 2302 and ordinary nodes 2304 of the cluster 2204a) will be required to forward MCI data; any neighbor nodes not meeting these requesting characteristics may refrain from reporting in response to the MCI request packets 2306.

Requesting characteristics may include, but are not limited to, clustering statuses (e.g., clusterhead nodes 2202 vs. gateway nodes 2302 vs. ordinary nodes 2304), location (e.g., all communication nodes 2102 within a specified geofenced area), altitude (e.g., all communication nodes 2102 above/below a specified altitude), speed, heading, mobile or immobile (e.g., only mobile communication nodes 2102), above/below a specified rank, or distance above/below a specified threshold distance from the source node 2308. By way of another example, a requesting characteristic may be targeted towards communication nodes 2102 which have changed their location more than a threshold amount since the last time they reported MCI data, such that only communication nodes 2102 which have changed position more than a threshold distance may be required to report new MCI data.

It is noted herein that including requesting characteristics within the MCI request packets 2306 may reduce the frequency of MCI reporting, and may therefore reduce overall traffic within the multi-node communication network 2100. Additionally, due to the fact that not every single communication node 2102 may be required to respond to each MCI request packet (dependent upon requesting characteristics), the overall traffic of the multi-node communication network 2100 may not be directly proportional to the size of the network, thereby preventing threat receivers from determining and/or estimating the size of the network by monitoring network traffic.

In some embodiments, the distribution of MCI request packets 2306 by the clusterhead node 2202 may form or reconfigure a clustering structure within the cluster 2204a, or more broadly within the multi-node communications network 2100.

Figure 7C:
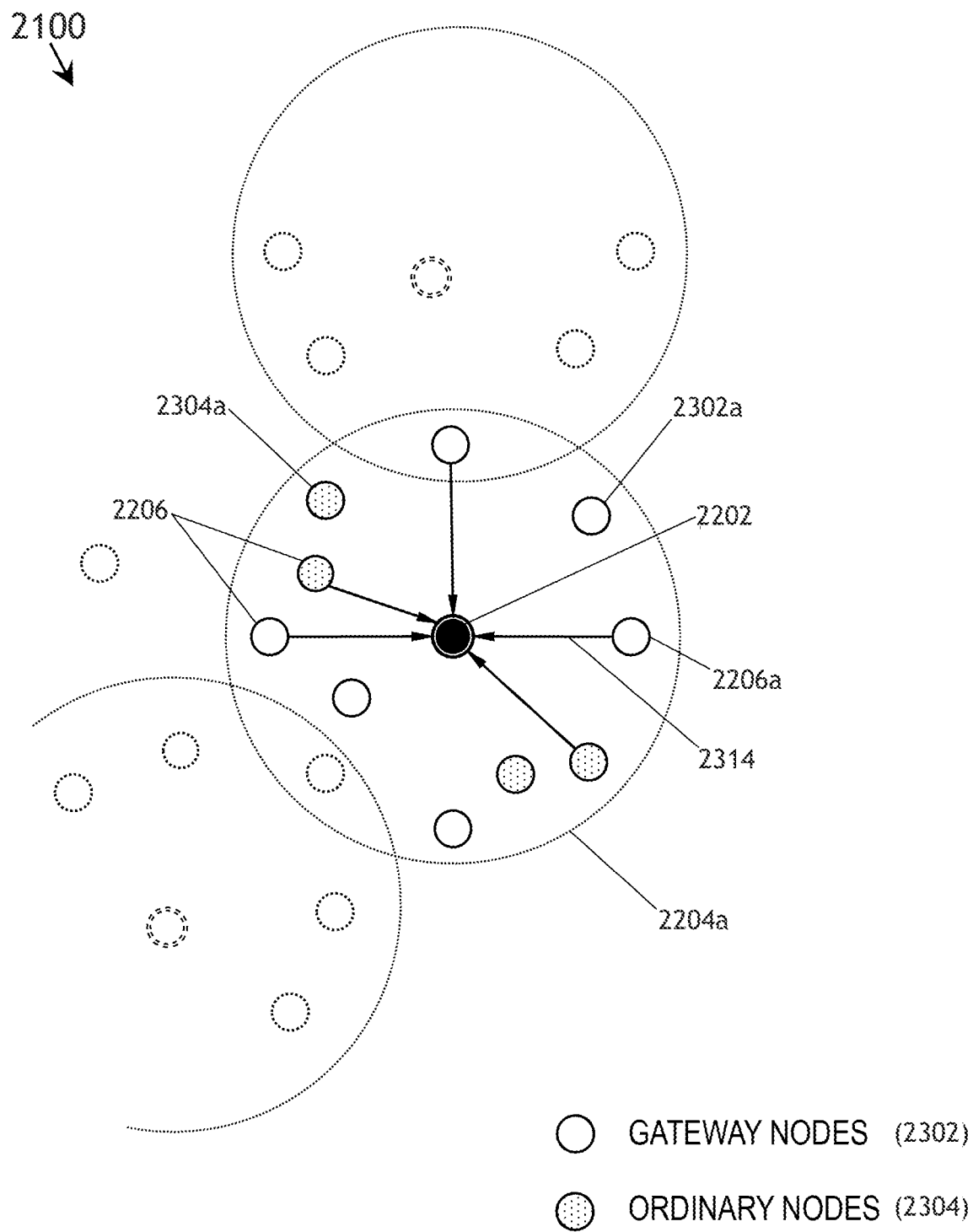
FIG. 7C is a diagrammatic illustration of mission-critical information (MCI) report packet collection operations of the cluster of FIG. 7A.

Referring now to FIG. 7C, the cluster 2204a is disclosed.

In embodiments, after distribution of the MCI request packets (2306/2310, FIG. 6B) throughout the cluster 2204a, the clusterhead node 2202 may wait for responses throughout a first time interval $T_1$. For example, during the first time interval $T_1$, the clusterhead node 2202 may collect MCI report packets (2314) from its neighbor nodes 2206, e.g., gateway nodes 2302 and/or ordinary nodes 2304, each MCI report packet including MCI information particular to the transmitting neighbor node. MCI report packets 2314 may further include unique identifiers particular to the transmitting neighbor node 2206. As noted previously herein, unique identifiers may include, but are not limited to, physical addresses (e.g., MAC addresses), network addresses (e.g., IP addresses), and the like.

Dependent upon characteristics of the multi-node communication network 2100 (e.g., topology, traffic, noise, jamming) and/or characteristics of the surrounding environment (e.g., weather conditions, terrestrial interference), one or more MCI request packets 2306 transmitted by the clusterhead node 2202 and/or one or more MCI report packets transmitted by the group of neighbor nodes 2206 may not be successfully delivered. In this regard, throughout the first time interval $T_1$, the clusterhead node 2202 may only receive MCI report packets 2314 from a subset of the larger group of neighbor nodes. For example, as shown in FIG. 7C, the clusterhead node 2202 may receive MCI report packets 2314 from some neighbor nodes 2206, but not from other gateway nodes (2302a) or ordinary nodes (2304a).

In embodiments, the controller (2104, FIG. 5) of the clusterhead node 2202 may be configured to keep track of each neighbor node 2206 from which it has received an MCI report packet 2314. In this regard, the clusterhead node 2202 may generate a member list including each neighbor node 2206 (e.g., gateway node 2302, ordinary node 2304) which previously transmitted an MCI report packet 2314 to the clusterhead node 2202. Such gateway nodes 2302 and ordinary nodes 2304 may be referred to as acknowledged neighbor nodes (2206a). In embodiments, the member list may include a list of unique identifiers particular to each acknowledged neighbor node 2206a.

Upon expiration of the first time interval $T_1$ (e.g., after collecting MCI report packets (2314, FIG. 7C) throughout the first time interval $T_1$), the clusterhead node 2202 may rebroadcast (e.g., retransmit) the MCI request packet 2306a with a collected member list.

Figure 7D:
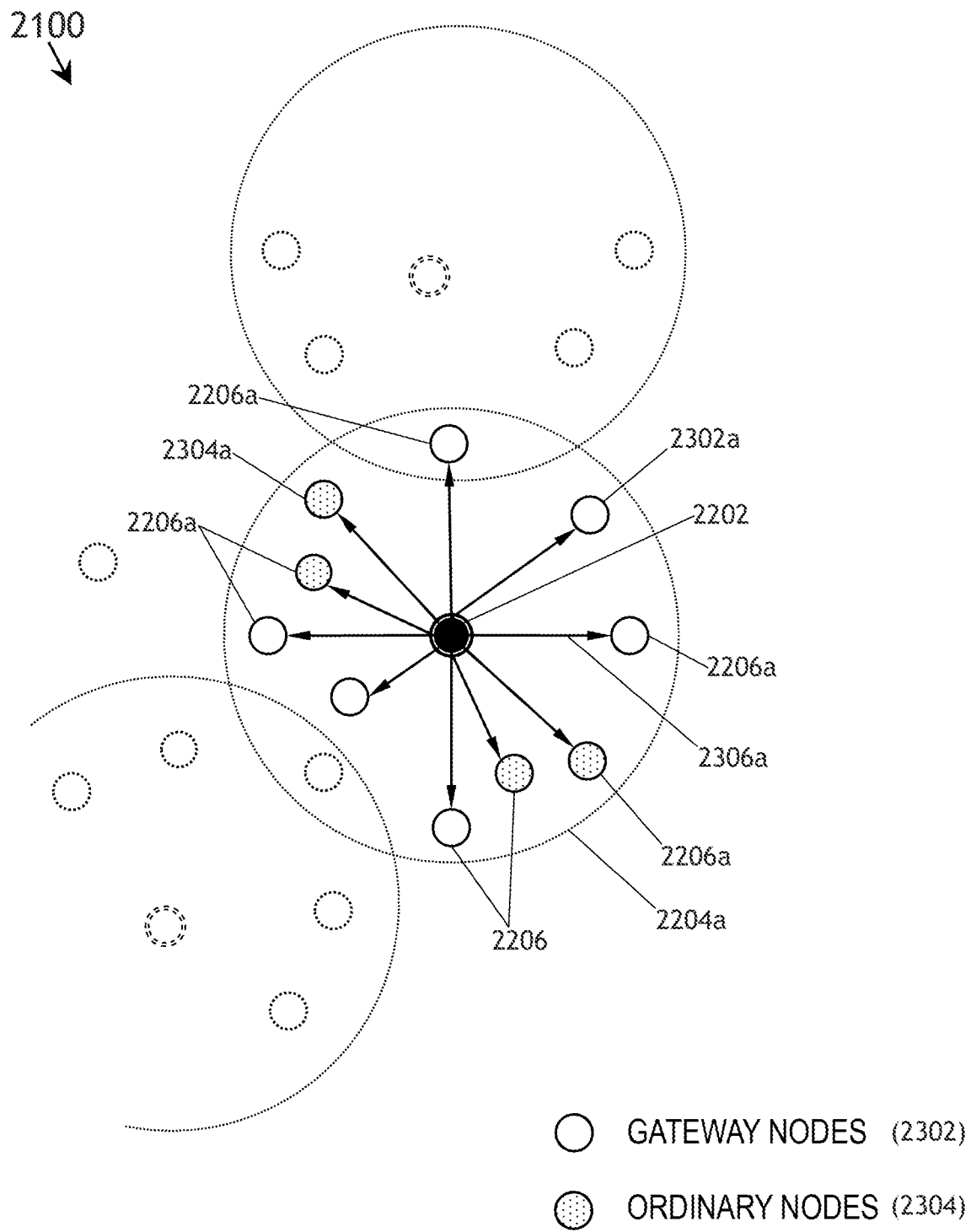
FIG. 7D is a diagrammatic illustration of mission-critical information (MCI) report packet rebroadcast and recollection operations of the cluster of FIG. 7A.

Referring now to FIG. 7D, the cluster 2204a is disclosed.

In embodiments, the clusterhead node 2202 may rebroadcast the MCI request packet 2306a (e.g., including a member list) to the neighbor nodes 2206 of the cluster 2204. For example, any neighbor nodes 2206 (e.g., gateway nodes 2302, ordinary nodes 2304) receiving the MCI request packet 306a may review the neighbor list and, if the neighbor node is on the member list (e.g., if the neighbor node is an acknowledged neighbor node 2206a), may take no further action (e.g., as no further action may be required, the neighbor node having already forwarded its current MCI data to the clusterhead node 2202). In some embodiments, the clusterhead node 2202 may configure the rebroadcast MCI request packet 2306a so that it is not forwarded or relayed more than once (e.g., based on a unique source identifier and/or sequence number).

In embodiments, the clusterhead node 2202 may wait for a second time interval $T_2$ for responses to the rebroadcast MCI request packet 2306a, the second time interval first-time $T_2$ shorter than the first time interval $T_1$. If, during the second time interval $T_2$, the clusterhead node 2202 receives additional MCI report packets 2314 from additional unacknowledged neighbor nodes 2206 (e.g., gateway nodes 2302a and ordinary nodes 2304a) of the cluster 2204a, the clusterhead node 2202 may rebroadcast the MCI request packet 2306a once more (e.g., with an updated member list to indicate MCI report packets 2314 received during the second time interval), waiting for a third time interval $T_3$ shorter than the second time interval $T_2$. The clusterhead node 2202 may continue rebroadcasting the MCI request packet 306a as long as MCI report packets 2314 continue to be transmitted in response, for increasingly shorter time intervals $T_N$.

Figure 7E:
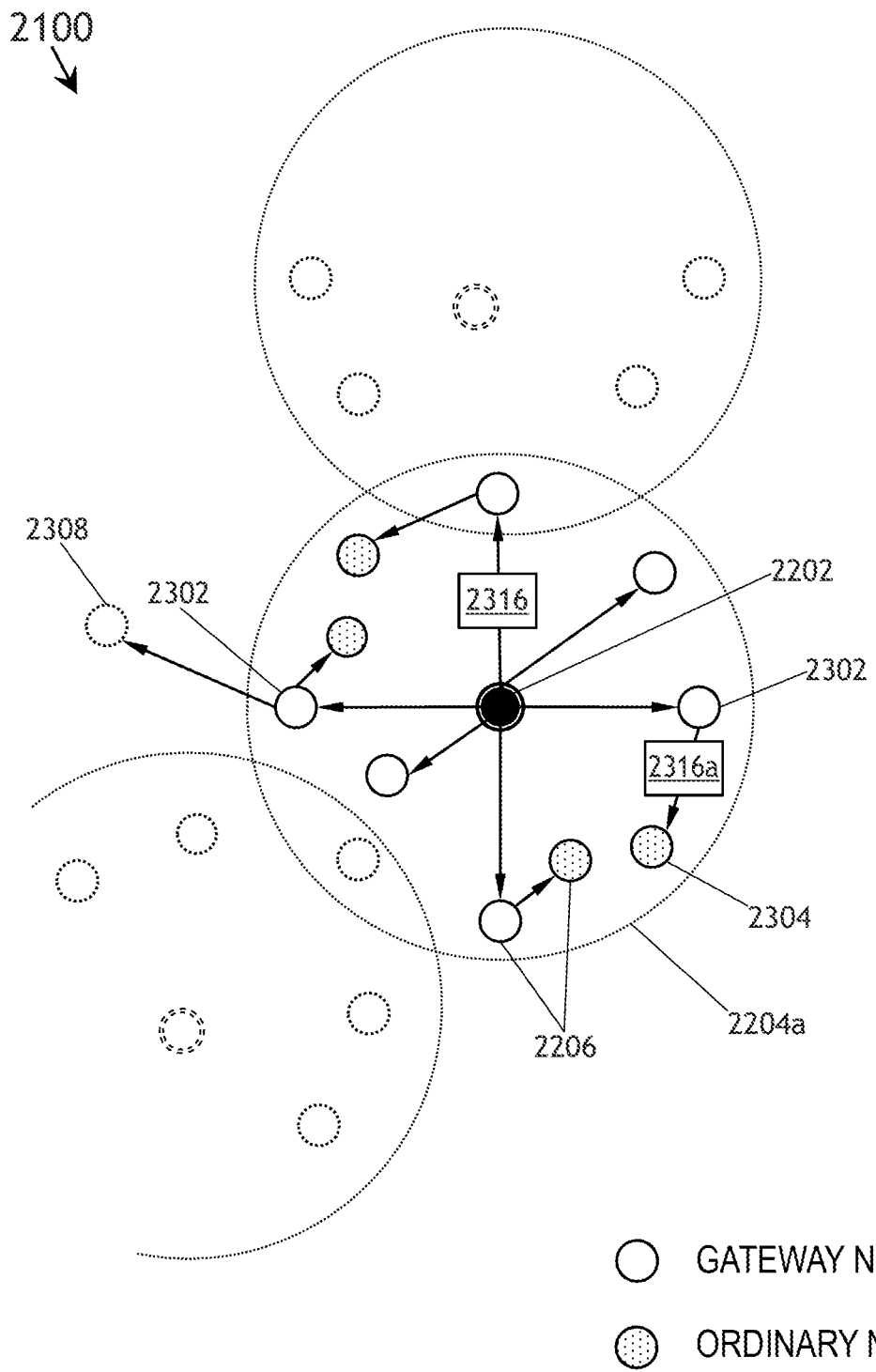
FIG. 7E is a diagrammatic illustration of mission-critical information (MCI) publish packet transmission operations of the cluster of FIG. 7A.

Referring now to FIG. 7E, the cluster 2204a is shown.

In embodiments, if, during the most recently concluded time interval $T_N$, no MCI report packets (2314, FIG. 7C) are received by the clusterhead node 2202, the clusterhead node may cease rebroadcasting and transmit an MCI publish packet 2316 (e.g., to the source node 2308 from which the MCI request packet 2306 originated, via the gateway node 2302). For example, the MCI publish packet 2316 may include any MCI data and unique identifiers associated with each reporting neighbor node 2206 (e.g., with each MCI report packet 2314 sent by a neighbor node 2206). Additionally, or alternatively, the clusterhead node 2202 may broadcast the MCI publish packet 2316 to every communication node (2102, FIG. 5) of the multi-node communications network (2100, FIG. 5), e.g., via any appropriate packet broadcasting or packet flooding procedure or scheme (e.g., EFPC, ZOEF, and the like). For example, the clusterhead node 2202 may distribute the MCI publish packet 2316 to its one-hop neighbor nodes (2206); if these one-hop neighbor nodes 2206 include gateway nodes 2302, the gateway nodes may relay the MCI publish packet (2316a) to their own one-hop neighbor nodes (e.g., ordinary nodes 2304).

Referring now to FIG. 8A, the method 2400 may be implemented by the multi-node communications network 2100 of FIGS. 5 through 7F and may include the following steps.

At a step 2402, a communications node of the multi-node communications network receives an MCI request packet. For example, the MCI request packet may be received from a source node within the multi-node communications network (e.g., or forwarded by a gateway node as noted below).

At a step 2404, the communications node determines whether it is a clusterhead node. For example, if the communications node is not a clusterhead node the MCI request packet may be ignored (or, if the communications node is a gateway node, the communications node may relay the MCI request packet, e.g., to its primary clusterhead node).

At a step 2406, if the communications node is a clusterhead node, the communications node transmits the MCI request packet to its neighbor nodes, e.g., the neighbor nodes of its cluster. For example, the communications node may incorporate EFPC, ZOEF, or any other appropriate packet flooding or packet broadcasting scheme in transmitting the MCI request packet.

At a step 2408, the clusterhead node receives (e.g., while waiting through a first time interval $T_1$) MCI report packets from a subset of the neighbor nodes, each MCI report packet including MCI data (e.g., and a unique identifier) of the transmitting neighbor node.

Referring also to FIG. 8B, at a step 2410, the clusterhead node retransmits the MCI request packet to its neighbor nodes and waits for a further time interval $T_2$ ($T_2 < T_1$) for MCI report packets. For example, the clusterhead node may rebroadcast the MCI request packet through N iterations, where for every M from 1 to N, the immediately subsequent time interval $T_{(M+1)}$ is shorter than the current time interval $T_M$. For example, the clusterhead node rebroadcasts the MCI request packet with a current member list updated to include identifying information of the acknowledged neighbor nodes that have already submitted MCI report packets. In some embodiments, the clusterhead node rebroadcasts the MCI request packets including requesting characteristics that indicate which neighbor nodes should or should not transmit MCI report packets.

At a step 2412, the clusterhead node receives MCI report packets throughout the second time interval $T_2$ from a second subset of the neighbor nodes. In some embodiments, the clusterhead node may continue rebroadcasting the MCI request packet to its neighbor nodes and waiting through incrementally shorter time intervals for MCI report packets in response. In some embodiments, the clusterhead node receives MCI report packets from unacknowledged neighbor nodes not already included on the member list, or from neighbor nodes that meet or fulfill the requesting characteristics.

At a step 2414, the clusterhead node detects no new MCI report packets received from its neighbor nodes during the most recent time interval $T_N$.

At a step 2416, the clusterhead node transmits an MCI publish packet including the MCI received from each transmitting neighbor node. For example, the clusterhead node may unicast the MCI publish packet to the source node from which the MCI request packet originated, or broadcast the MCI publish packet throughout the multi-node communications network via the neighbor nodes of its cluster (e.g., according to any appropriate packet broadcasting or packet flooding scheme).

Referring generally to FIGS. 9-12D, some embodiments may utilize aspects of beacon-based passive clustering (BBPC).

Some embodiments of the inventive concepts disclosed herein are directed to mobile communications nodes of a mobile ad hoc network (MANET) or other like a multi-node communications network capable of two-hop passive clustering via partial neighbor lists transmitted via high-energy beacon signals. Beacon-based passive clustering trades short-term network efficiency for longer-term efficiency and a generally more stable network structure without losing connectivity. By allowing proximate clusterhead nodes to retain their status, ripple-effect restructuring associated with other forms of passive clustering (and the corresponding deleterious effect on network efficiency) may be avoided.

Figure 9:
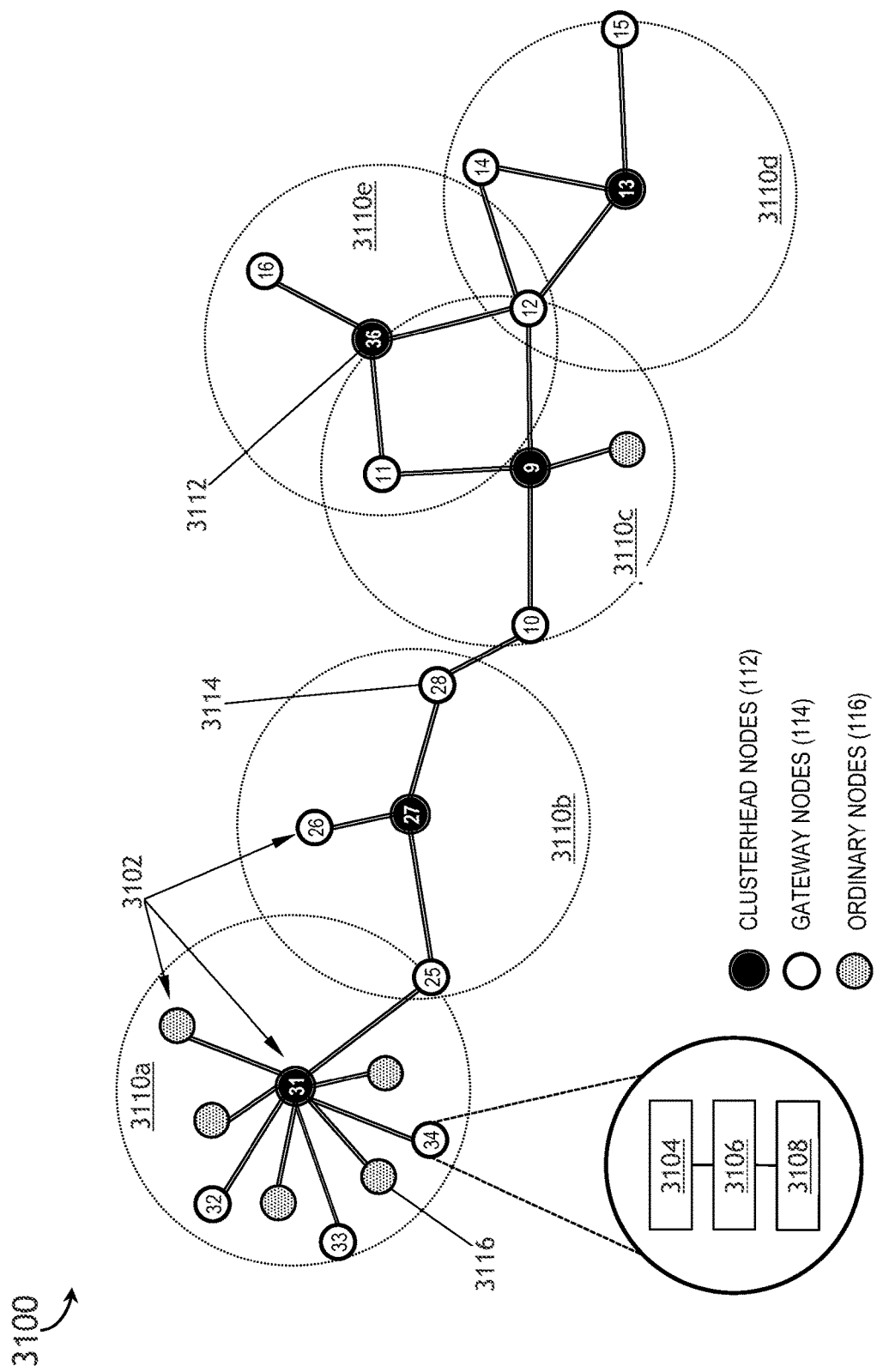
FIG. 9 is a diagrammatic illustration of a multi-node communications network according to example embodiments of this disclosure.

Referring to FIG. 9, a multi-node communications network 3100 is disclosed. The multi-node communications network 3100 may include communications nodes 3102.

In embodiments, the multi-node communications network 3100 may include any multi-node communications network known in the art. For example, the multi-node communications network 3100 may include a mobile ad-hoc network (MANET) in which each communications node 3102 within the multi-node communications network is able to move freely and independently. Similarly, the one or more communications nodes 3102 may include any communications node known in the art which may be communicatively coupled. In this regard, the one or more communications nodes 3102 may include any communications node known in the art for transmitting/transceiving data packets. For example, the one or more communications nodes 3102 may include, but are not limited to, radios, mobile phones, smart phones, tablets, smart watches, laptops, and the like. In embodiments, each communications node 3102 of the multi-node communications network 3100 may include, but is not limited to, a respective controller 3104 (e.g., control processor), memory 3106, and communication interface 3108.

The controller 3104 provides processing functionality for at least the communications node 3102 and can include any number of processors, micro-controllers, circuitry, field programmable gate array (FPGA) or other processing systems, and resident or external memory for storing data, executable code, and other information accessed or generated by the communications node 3102. The controller 3104 can execute one or more software programs embodied in a non-transitory computer readable medium (e.g., memory 3106) that implement techniques described herein. The controller 3104 is not limited by the materials from which it is formed or the processing mechanisms employed therein and, as such, can be implemented via semiconductor(s) and/or transistors (e.g., using electronic integrated circuit (IC) components), and so forth.

The memory 3106 can be an example of tangible, computer-readable storage medium that provides storage functionality to store various data and/or program code associated with operation of the communications node 3102/ controller 3104, such as software programs and/or code segments, or other data to instruct the controller 3104, and possibly other components of the communications node 3102, to perform the functionality described herein. Thus, the memory 3106 can store data, such as a program of instructions for operating the communications node 3102, including its components (e.g., controller 3104, communication interface 3108, etc.), and so forth. It should be noted that while a single memory 3106 is described, a wide variety of types and combinations of memory (e.g., tangible, non-transitory memory) can be employed. The memory 3106 can be integral with the controller 3104, can comprise standalone memory, or can be a combination of both. Some examples of the memory 3106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 3108 can be operatively configured to communicate with components of the communications node 3102. For example, the communication interface 3108 can be configured to retrieve data from the controller 3104 or other devices (e.g., other nodes 3102), transmit data for storage in the memory 3106, retrieve data from storage in the memory 3106, and so forth. The communication interface 3108 can also be communicatively coupled with the controller 3104 to facilitate data transfer between components of the communications node 3102 and the controller 3104. It should be noted that while the communication interface 3108 is described as a component of the communications node 3102, one or more components of the communication interface 3108 can be implemented as external components communicatively coupled to the communications node 3102 via a wired and/or wireless connection. The communications node 3102 can also include and/or connect to one or more input/output (I/O) devices. In embodiments, the communication interface 3108 includes or is coupled to a transmitter, receiver, transceiver, physical connection interface, or any combination thereof.

It is contemplated herein that the communication interface 3108 of a communications node 3102 may be configured to communicatively couple to additional communication interfaces 3108 of additional communications nodes 3102 of the multi-node communications network 3100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the multi-node communications network 3100 may be organized into clusters 3110a-e, and each of its member communications nodes 3102 may be associated with a node clustering status. For example, each cluster 3110a-e may be organized around a clusterhead node 3112 (e.g., clusters 3110a, 3110b, 3110c, 3110d, 3110e and nodes 31, 27, 9, 13, and 36 respectively having a clusterhead node status). In addition to the clusterhead node status 3112, each communications node 3102 of the multi-node communications network 3100 may have one of a set of clustering statuses, e.g., gateway nodes 3114 and ordinary nodes 3116. For example, clusterhead nodes 3112 and gateway nodes 3114 may be otherwise referred to as "critical nodes", and may be configured to relay route request flooding, link status advertisements (LSA), and/or other data packets to gateway nodes or ordinary nodes 3116 to which the clusterhead or gateway nodes are connected or, e.g., which may be within a cluster 3110a-e organized around a clusterhead node.

It should be noted that this usage of "critical node" is not equivalent to "critical path" as described in greater detail below. For example, a communications node 3102 may be a "critical node", e.g., a clusterhead node 3112 or a gateway node 3114, but may not be on a "critical path". In embodiments, each communications node 3102 of the multi-node communications network 3100 may transition from one node clustering status to another clustering status as described below (see, e.g., FIG. 11 and accompanying text).

In embodiments, the communications nodes 3102 of the multi-node communications networks may be referred to as one-hop or two hop neighbors. For example, the gateway nodes 10, 11, 12 (3114) may be one-hop neighbors to the clusterhead node 9 (3112) in that the gateway nodes 10, 11, 12 are in direct communication with the clusterhead node 9. Similarly, each of the gateway nodes 11 and 12 (3114) is a two-hop neighbor to the gateway node 16 of cluster 110e, as each pair of gateway nodes (11-16, 12-16) is connected via two hops, e.g., from the origin gateway node to the clusterhead node 36 (3112), and then to the destination gateway node.

In embodiments, the multi-node communications network 3100 may incorporate beacon-based passive clustering for initial network configuration or for network reconfiguration in response to a status change. For example, the multi-node communications network 3100 may begin as a network of gateway nodes 3114, or communications nodes 3102 having a default gateway node clustering status from which various communications nodes may transition to other node clustering states as the network evolves, e.g., as communications nodes join, leave, or move within the multi-node communications network. For example, each cluster 3110a-e may include additional ordinary nodes 3116; the density of ordinary nodes within each cluster (or, e.g., throughout the multi-node communications network 3100 as a while) may increase or decrease without significantly affecting network efficiency.

Referring generally to FIGS. 10A through 10E, the multi-node communications network 3100 is shown.

Figure 10A:
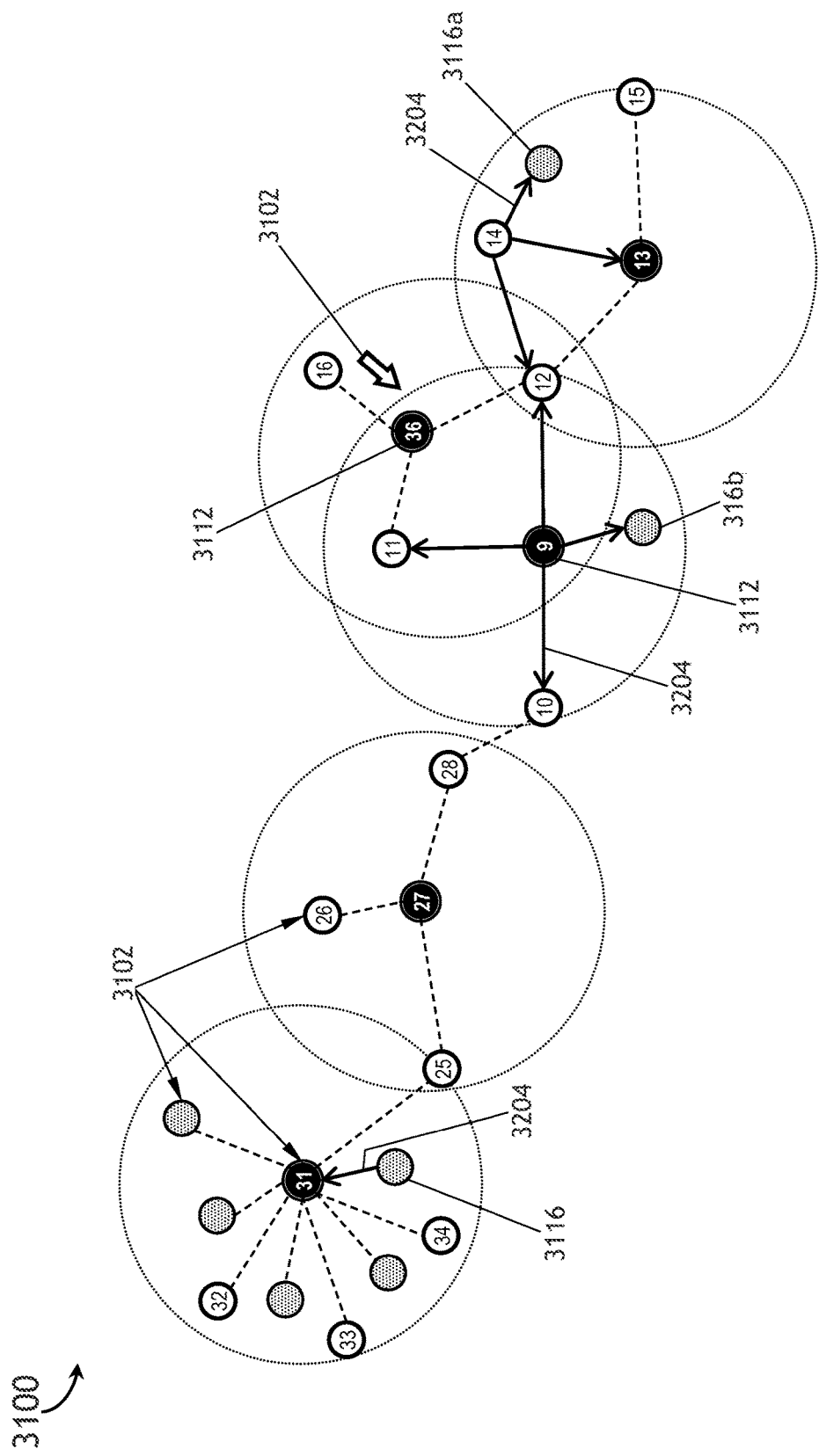
FIG. 10A is a diagrammatic illustration of outbound beaconing operations of the multi-node communications network of FIG. 9.

In embodiments, referring in particular to FIG. 10A, the communications nodes 3102 of the multi-node communications network 3100 may implement beacon-based passive clustering in response to a change in network status. For example, the clusterhead node 36 (3112) may move (3202) toward the clusterhead node 9, such that both clusterhead nodes 36 and 9 coexist within the overlapping clusters 3110c, 3110e. In response, the communications nodes 3102 (e.g., clusterhead nodes 3112, gateway nodes 3114, ordinary nodes 3116) may transmit partial neighbor lists 3204 to their one-hop neighbors via high-energy beacon signals. Alternatively, or additionally, the multi-node communications network 3100 may provide for periodic beaconing cycles at regular and/or predetermined intervals.

In some embodiments, a network configuration or reconfiguration (and critical neighbor learning) may comprise several beaconing cycles, whereas conventional flooding may construct a clustering structure within a single flooding process. For example, beaconing cycles may be generally longer in duration than packet flooding process, and clustering may be more sporadic than with packet flooding or via dominating sets. However, the resulting network clustering structure may improve stability in the long term by allowing limited co-existence of clusterhead nodes (instead of, e.g., immediate resignation of clusterheads or mutual-kill scenarios), provided the clusterhead nodes are on a critical path as described below.

In embodiments, some or all of the communications nodes 3102 of the multi-node communications network 3100 may transmit partial neighbor lists 3204 to their one-hop neighbors via high-energy beacon signals. For example, all critical nodes of the multi-node communications network (e.g., clusterhead node 9 (3112), gateway node 14 (3114)) may transmit outbound partial neighbor lists 3204 (and may accordingly receive inbound partial neighbor lists, as described in greater detail below). In some embodiments, ordinary nodes 3116 may also transmit partial neighbor lists 3204.

In embodiments, the use of high-energy beacon signals for transmission of outbound partial neighbor lists 3204 may reduce the possibility that one or more one-hop neighbors may not receive a transmitted partial neighbor list. In some embodiments, partial neighbor lists 3204 may be transmitted via hello messages. However, partial neighbor lists 3204 may be distinguished from neighbor lists appended to conventional hello messages in that a partial neighbor list 3204 transmitted by any communications node 3102 includes unique identifiers and node clustering statuses for only those one-hop neighbors having either a clusterhead node status or a gateway node status (e.g., in addition to a unique identifier and node clustering status for the transmitting communications node itself). For example, the gateway node 14 (3114) may transmit to its one-hop neighbors (e.g., gateway node 12, clusterhead node 13, and the ordinary node 3116*a*) a partial neighbor list 3204 including itself (node 14, gateway node status) and its neighboring critical nodes (node 12, gateway node status; node 13, clusterhead node status). Similarly, the clusterhead node 9 (3112) may transmit to its one-hop neighbors (gateway nodes 10, 11, 12 and ordinary node 3116*b*) a partial neighbor list 3204 including itself (node 9, clusterhead node status) and its neighboring critical nodes (node 10, gateway node status; node 11, gateway node status; node 12, gateway node status). While both the clusterhead node 9 (3112) and gateway node 14 (3114) may have one or more ordinary nodes 3116*a-b* as one-hop neighbors, none of these ordinary nodes will be included in partial neighbor lists (although these ordinary nodes may receive and transmit partial neighbor lists 3204, and may transition in status to gateway nodes or clusterhead nodes, as shown in more detail below by FIGS. 10F and 11).

Figure 10B:
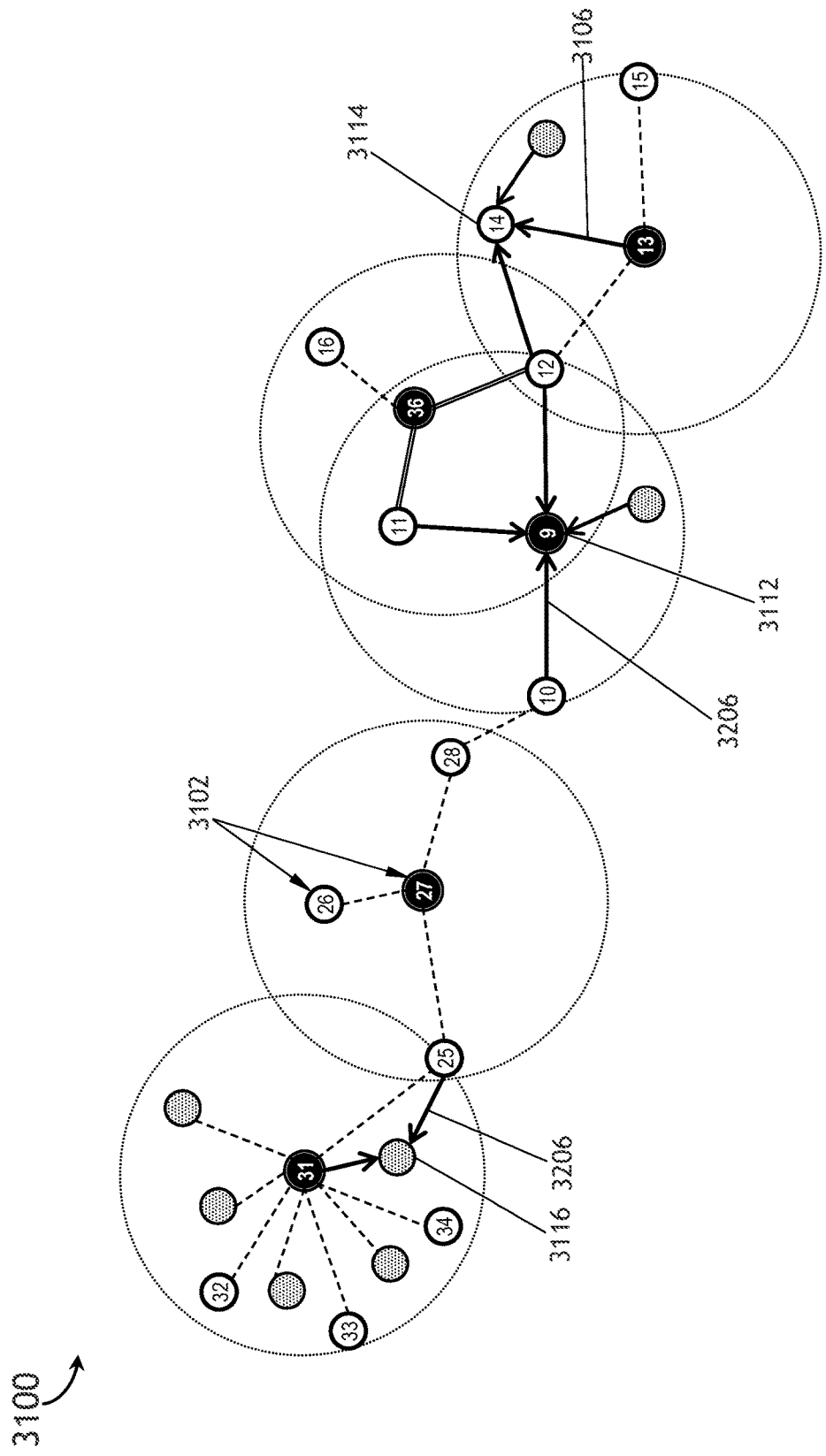
FIG. 10B is a diagrammatic illustration of inbound beaconing operations of the multi-node communications network of FIG. 9.

In embodiments, referring also to FIG. 10B, some or all communications nodes 3102 of the multi-node communications network 3100 may likewise receive inbound partial neighbor lists 3206 via beacon signals transmitted by their one-hop neighbors. For example, the clusterhead node 9 (3112) may receive a partial neighbor list 3206 from each of its one-hop neighbors (e.g., the gateway nodes 10, 11, and 12). Similarly, the gateway node 14 (3114) may receive a partial neighbor list 3206 from each of its one-hop neighbors (gateway node 12, clusterhead node 13), and the ordinary node 3116 may receive a partial neighbor list 3206 from each of its one-hop neighbors (gateway node 31, clusterhead node 25).

Figure 10C:
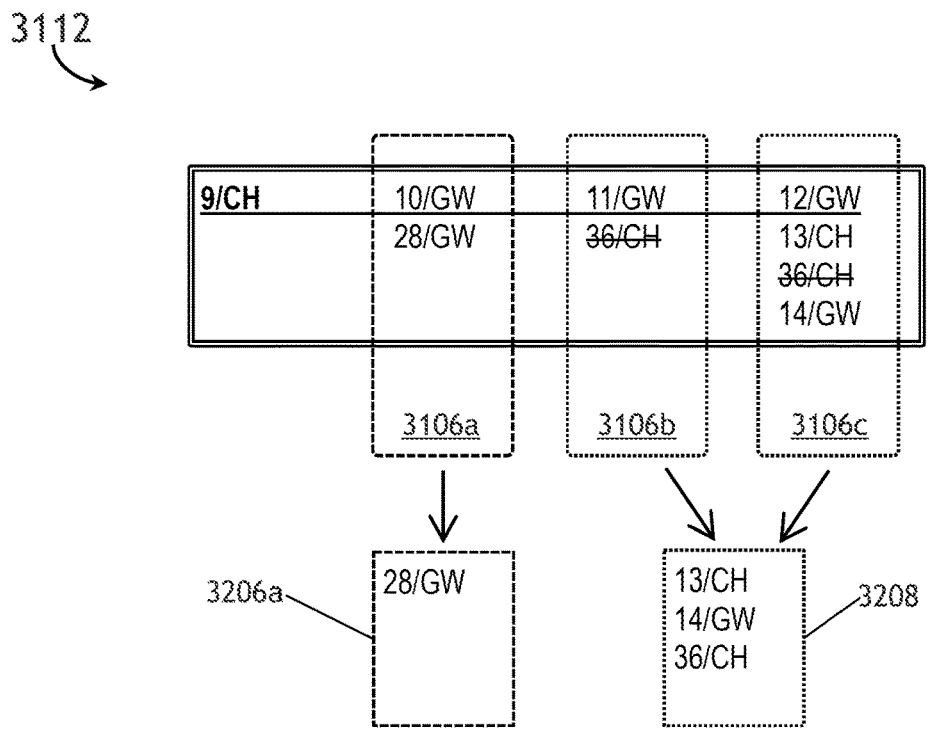
FIGS. 10C and 10D are diagrammatic illustrations of critical path detection operations of member communications nodes of the multi-node communications network of FIG. 9.
Figure 10D:
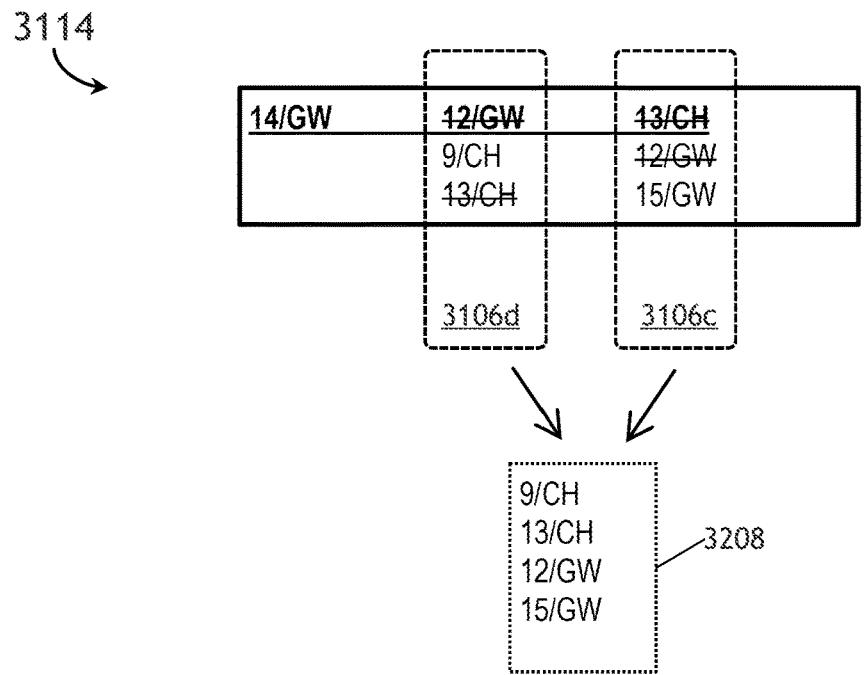
Figure 10E:
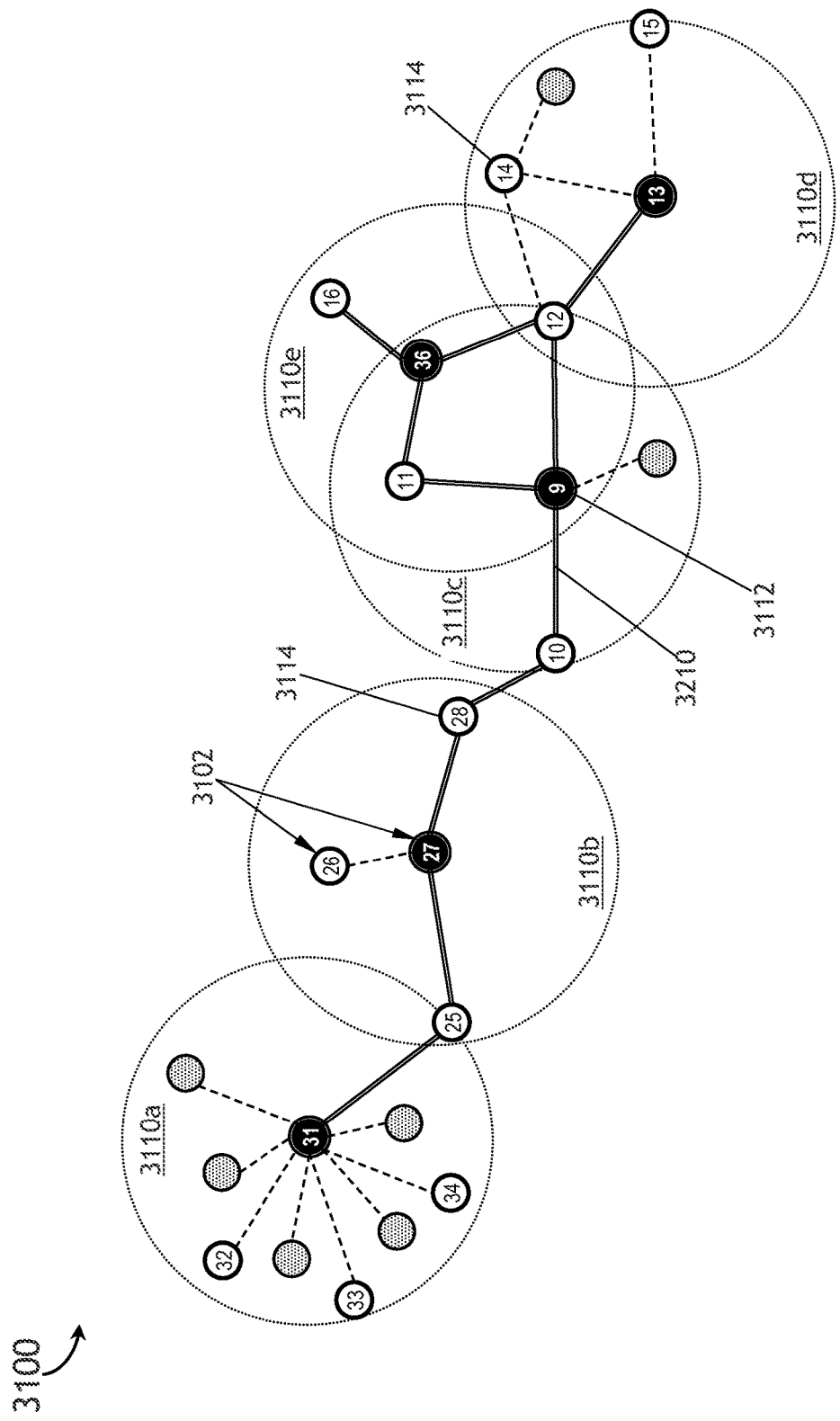
FIG. 10E is a diagrammatic illustration of critical paths of the multi-node communications network of FIG. 9.

In embodiments, referring also to FIGS. 10C through 10E, each communications node 3102 of the multi-node communications network 3100 may review its inbound partial neighbor lists (3206*a-e*) to determine whether or not the communications node is on a critical path (e.g., whether or not the multi-node communications network may partition without the communications node). For example, the clusterhead node 9 (3112) may review the partial neighbor lists 3206*a-c* respectively transmitted by its one-hop neighbors (gateway nodes 10, 11, 12) The partial neighbor list 3206*a* transmitted by the gateway node 10 (3114) (and excluding the receiving node, clusterhead node 9, which is common to all partial neighbor lists 3206*a-c*) may include a unique identifier (node 10) and clustering status (GW, gateway) for the transmitting node 10 itself, as well as a unique identifier (28) and clustering status (GW, gateway) for its one-hop neighbor (gateway node 28). Similarly, the partial neighbor list 3206*b* may identify, and indicate the status of, the transmitting node (node 11, GW/gateway) and its other one-hop neighbor (node 36, CH/clusterhead). Finally, the partial neighbor list 3206*c* may identify, and indicate the status of, the transmitting node (node 12, GW/gateway) and also identifies and indicates the status of three critical one-hop neighbors (node 13, CH/clusterhead; node 36, CH/clusterhead; and node 14, GW/gateway).

In embodiments, referring in particular to FIG. 10C, if the partial neighbor lists 3206*a-c* have any common elements, the clusterhead node 9 may merge any such partial neighbor lists. For example, as the partial neighbor lists 3206*b-c* (transmitted by gateway nodes 11 and 12) share a common one-hop neighbor (clusterhead node 36), the clusterhead node 9 may merge the partial neighbor lists into the merged list 3208. If, however, there is no existing set of neighboring nodes having common elements, the clusterhead node 9 (3112) may instead create a set of neighboring nodes for the clusterhead node 9 (e.g., including its neighboring gateway nodes 10, 11, 12).

In embodiments, if more than one set (e.g., partial neighbor list) remains after any necessary merging, the communications node 3102 is on a critical path, e.g., without the communications node the multi-node communications network 3100 may be partitioned. For example, as multiple sets (e.g., 3206*a*, 3208) remain for the clusterhead node 9, the clusterhead node 9 may conclude that it is on a critical path. (See, e.g., FIG. 10E.)

In embodiments, referring in particular to FIG. 10D, the gateway node 14 (3114) may similarly review the partial neighbor lists 3206*d-c* received respectively from its one-hop neighbors, gateway node 12 and clusterhead node 13. For example, the partial neighbor list 3206*d* identifies, and indicates the clustering status of, the transmitting node (12, GW/gateway) and its one-hop neighbors (9, CH/clusterhead; 13, CH/clusterhead). Similarly, the partial neighbor list 3206*e* identifies, and indicates the clustering status of, the transmitting node (13, CH/clusterhead) and its one-hop neighbors (12, GW/gateway; 15, GW/gateway). As shown by FIG. 10D, the partial neighbor lists 3206*d-e* may differ from the partial neighbor lists 3206*a-c* of FIG. 10C in that the partial neighbor lists 3206*d-e* share common elements, particularly gateway node 12 and clusterhead node 13. Accordingly, the gateway node 14 merges the partial neighbor lists 3206*d-e* into a single set 3208. Because only the single set 3208 remains, the gateway node 14 may conclude that it is not on a critical path.

In embodiments, referring also to FIG. 10E, and as shown by FIGS. 10C and 10D respectively, the clusterhead node 9 (3112) is on a critical path 3210 while the gateway node 14

(3114) is not on a critical path. For example, if the connection between clusterhead node 9 and the neighboring gateway node 10 is severed, the clusters 3110a-b may be partitioned from the clusters 3110c-e. However, if either connection between the gateway node 14 and respectively the gateway node 12 and the clusterhead node 13 is severed (e.g., if either, but not both, of the nodes 12, 13 is lost), the gateway node 14 will not be partitioned from the multi-node communications network 3100 (but will instead remain connected via the remainder of the two nodes 12, 13). Similarly, it can be shown by the above process that the clusterhead node 36 is also on a critical path 3210 (e.g., with respect to the gateway node 16). In embodiments, it may be similarly shown that the clusterhead nodes 13, 27 and the gateway nodes 10, 12, 28 are also on a critical path 3210, as the loss of any one of these nodes would partition a portion of the multi-node communications network 3100.

Figure 10F:
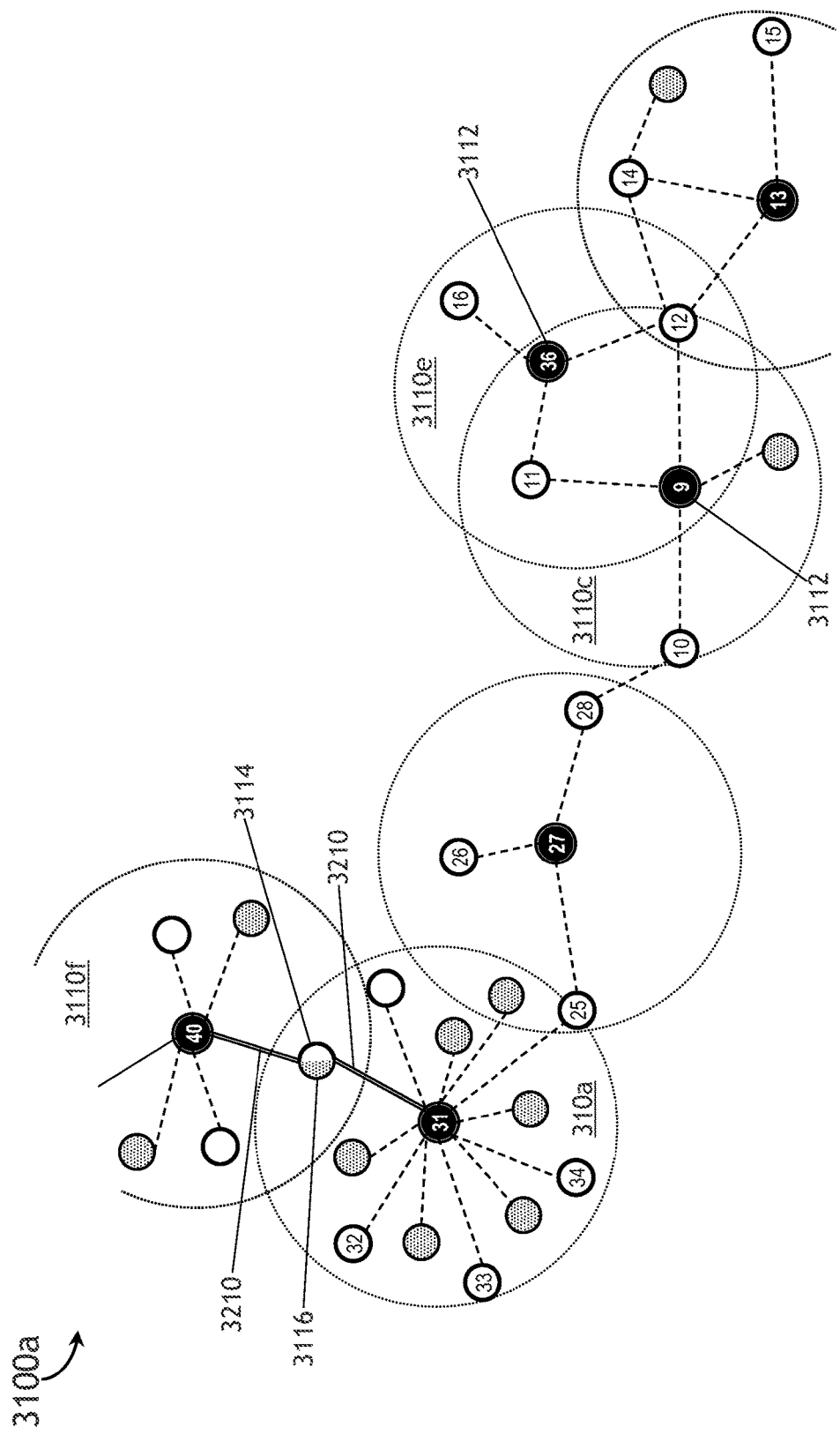
FIG. 10F is a diagrammatic illustration of a promotion/status transition of an ordinary node of the multi-node communications network of FIG. 9.

In some embodiments, referring now to FIG. 10F, the multi-node communications network 3100a may be implemented and may function similarly to the multi-node communications network 100 of FIGS. 9 through 10E, except for the addition of cluster 3110f and its clusterhead node 40 (3112).

In embodiments, ordinary nodes 3116 may transmit and receive partial neighbor lists and may determine, via the above detection process, that the ordinary node is on a critical path 3210. For example, the ordinary node 3116 of cluster 3110a may establish a link to the clusterhead node 40 (e.g., due to the movement of the clusterhead node 40 and/or its cluster 3110f proximate to the cluster 3110a and ordinary node 3116). In embodiments, the ordinary node 3116 may determine via the detection process shown by FIGS. 10A through 10E that the ordinary node is on a critical path 3210 connecting the clusters 3110a-e to the cluster 3110f through the ordinary node. For example, loss of the ordinary node 3116 may partition the cluster 3110f from the remainder of the multi-node communications network 3100a. Accordingly, the ordinary node 3116 may immediately transition to gateway node status (3114).

The clusterhead nodes 9 and 36 (3112) may exist within the same cluster (e.g., overlapping clusters 3110c, 3110e). In some embodiments, rather than either of the clusterhead nodes 9, 36 immediately resigning, both clusterhead nodes 9, 36 may retain their clusterhead status, e.g., if the clusterhead nodes are on a critical path 3210 in accordance with status transition rules of the multi-node communications networks 3100, 3100a as described in greater detail below.

Figure 11:
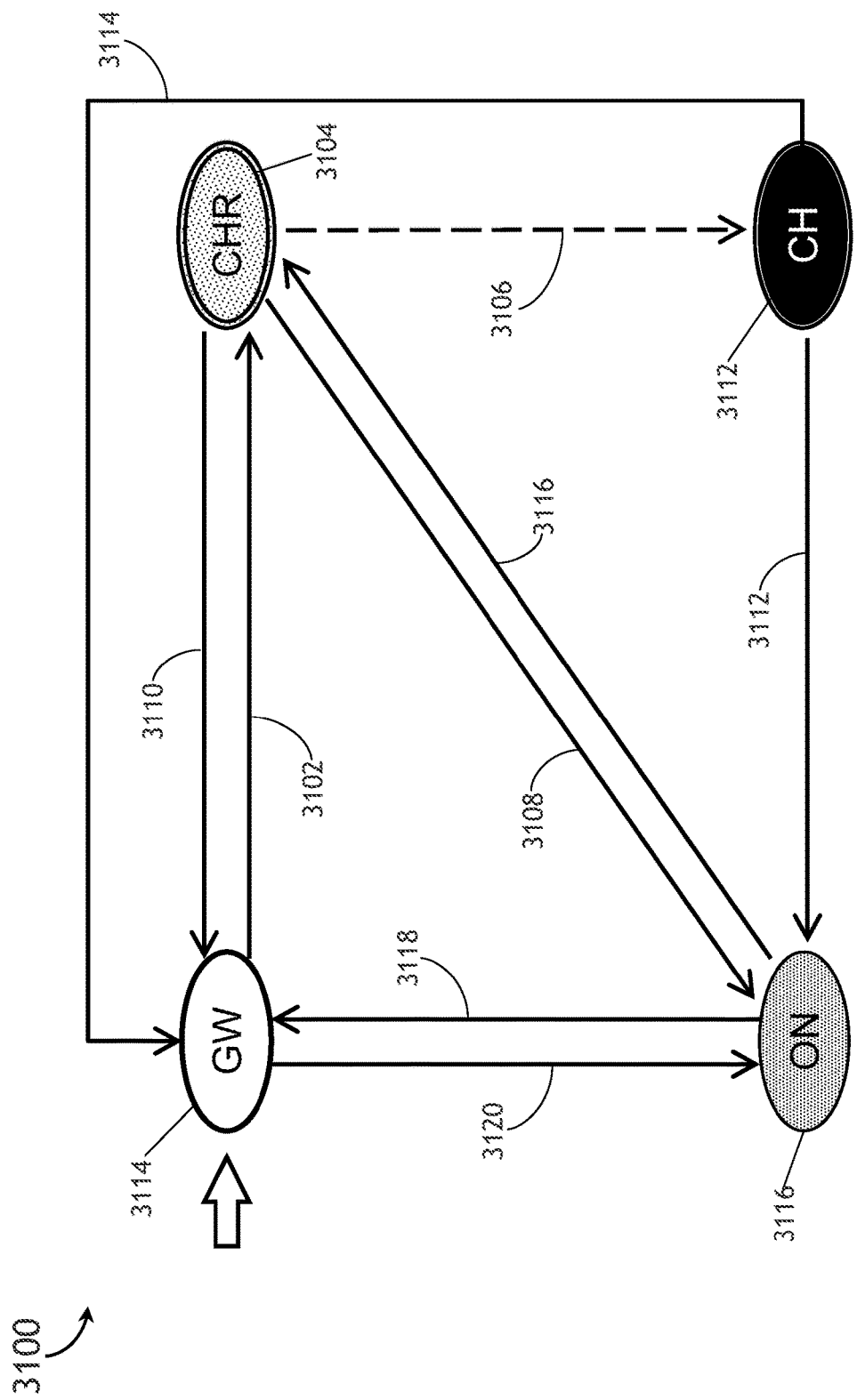
FIG. 11 is a node status transition diagram of the multi-node communications network of FIG. 9.

Referring now to FIG. 11, a status transition diagram 3300 of the multi-node communications networks 3100, 3100a of FIGS. 9 through 10F is shown.

In embodiments, each communications node (3102, FIG. 9) of the multi-node communications network 3100 may have as its initial clustering status (e.g., prior to beaconing cycles and network configuration) a gateway node (3114) status and any relayed partial neighbor lists or other transmissions may identify the node as a gateway node. As new link information is received, e.g., via exchange of partial neighbor lists and critical node detection as shown above, each communications node 3102 may update its own local neighbor lists and/or link status information and, based on changes to this information, may transition to a different node status. For example, if according to updated link or local neighbor information there are no clusterhead nodes 3112 within the multi-node communications network 3100, a gateway node 3114 may transition (3302) to clusterhead-ready status (3304). A clusterhead-ready node 3304 may designate itself (3306) as a clusterhead node 3112 upon successful transmission of, e.g., a partial neighbor list or other applicable data packet. However, a clusterhead-ready node 3304 may alternatively transition (3308) to ordinary node status (3116), e.g., if the clusterhead-ready node receives a data packet from a clusterhead node 3112 AND the following relationship applies:

$$GW \geq \alpha^*(CH)+\beta \quad [1]$$

where GW is the current number of communications nodes throughout the multi-node communications network having a gateway node status (3114), CH is the current number of communications nodes throughout the multi-node communications network having a clusterhead node status (3112), and α, β are gateway redundancy factors manually or automatically adjustable to control the number and density of gateway nodes (and therefore number of ordinary/noncritical nodes) within the multi-node communications network 3100. Although the examples provided herein provide for gateway redundancy factors which are equal (e.g., α=β=1), it is noted herein that the gateway redundancy factors α, β need not be equal. In embodiments, adjusting the gateway redundancy factors α, β may alter the ratio of gateway nodes 3114 to ordinary nodes 3116, which may affect the density of data transmission throughout the multi-node communications network 3100. By adjusting the ratio of gateway nodes 3112 to ordinary nodes 3116 within the multi-node communications network 3100, the network may be tailored according to a number of factors including, but not limited to, importance of data delivery, delay requirements, bandwidth requirements, number of communications nodes 3102, density of communications nodes, and the like.

In embodiments, the clusterhead-ready node 3304 may transition (3310) back to a gateway node 3114, e.g., if the clusterhead-ready node is inactive (e.g., for a predetermined time-out period) OR if the clusterhead-ready node receives a data packet from a clusterhead node 3112 AND the following relationship applies:

$$GW<\alpha^*(CH)+\beta \quad [2]$$

In embodiments, a clusterhead node 3112 may transition (3312) to an ordinary node 3116 if the clusterhead node receives a data packet from another clusterhead node AND all of the following apply:

$$GW \geq \alpha^*(CH)+\beta; \quad [1]$$

the clusterhead node is NOT on a critical path; AND
every gateway node 3114 in the corresponding cluster has more than two clusterhead nodes (e.g., has more than one alternative clusterhead node).

Similarly, the clusterhead node 3112 may transition (3314) to gateway node status (3114) if the clusterhead node receives a data packet from another clusterhead node AND all of the following apply:

$$GW<\alpha^*(CH)+\beta \quad [2]$$

the clusterhead node is NOT on a critical path; AND
every gateway node 3114 in the corresponding cluster has more than two clusterhead nodes (e.g., has more than one alternative clusterhead node).

Referring back to FIG. 10E, it may be observed that the clusterhead nodes 9, 36 (3112), while coexisting within the same cluster (e.g., overlapping clusters 3110c, 3110e) may both retain their clusterhead status due to both clusterhead nodes being on a critical path 3210.

In embodiments, an ordinary node 3116 may transition (3316) to clusterhead-ready status 3304 if there are no other clusterhead nodes 3112 within the multi-node communications network.

In embodiments, an ordinary node 3116 may transition (3318) to gateway node status 3114 if either of the following applies:
- the ordinary node is inactive (e.g., for at least a predetermined time-out period);
- the ordinary node is on a critical path; OR $$GW<\alpha*(CH)+\beta \qquad [2]$$

In embodiments, the gateway node 3114 may transition (3320) to ordinary node status (3116) if relationship [2] applies (GW≥α*(CH)+β).

In some embodiments, the multi-node communications network 3100 may provide for other node statuses and/or other algorithms or rules regulating transitions between these statuses, e.g., as provided for by EFPC, ZOEF, or any other appropriate efficient flooding and/or passive clustering schemes utilized by the multi-node communications network 3100 (for example, as described in greater detail by related U.S. patent application Ser. Nos. 16/369,398 and 16/987,671 incorporated herein by reference in their entirety).

Figure 12A:
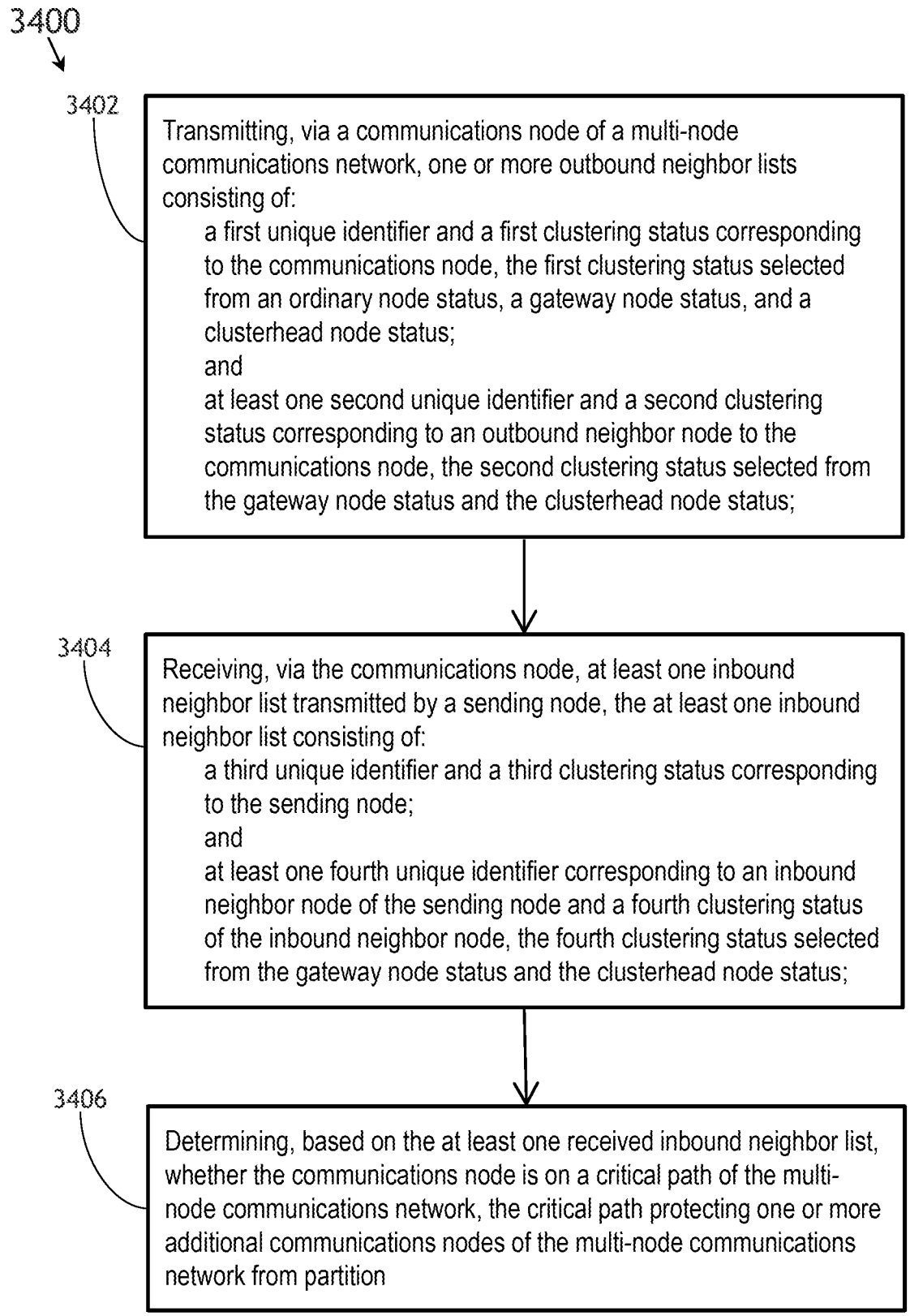
FIGS. 12A, 12B, 12C, and 12D are flow diagrams illustrating a method for beacon-based passive clustering according to example embodiments of this disclosure.

Referring now to FIG. 12A, the method 3400 may be implemented by embodiments of the communications node 3102 of the multi-node communications network 3100 and may include the following steps.

At a step 3402, the communications node transmits one or more outbound partial neighbor lists. Each partial neighbor list uniquely identifies the transmitting communications node and indicates its clustering status (e.g., gateway or clusterhead) and likewise provides a unique identifier and clustering status for every one-hop neighbor to the transmitting communications node having either a gateway or a clusterhead node status. In some embodiments, the partial neighbor lists are transmitted via high energy beacon signals. In some embodiments, the partial neighbor lists are transmitted via hello messages.

At a step 3404, the communications node receives inbound partial neighbor lists from its one-hop neighbors. Each inbound partial neighbor list uniquely identifies the transmitting neighbor node and its clustering status, and likewise provides a unique identifier and clustering status (clusterhead or gateway) for each one-hop neighbor to the transmitting node having a clusterhead or gateway status.

At a step 3406, the communications node determines, based on the received inbound partial neighbor lists, whether or not the communications node is on a critical path (e.g., loss of the node would partition the network into two or more disconnected portions).

Figure 12B:
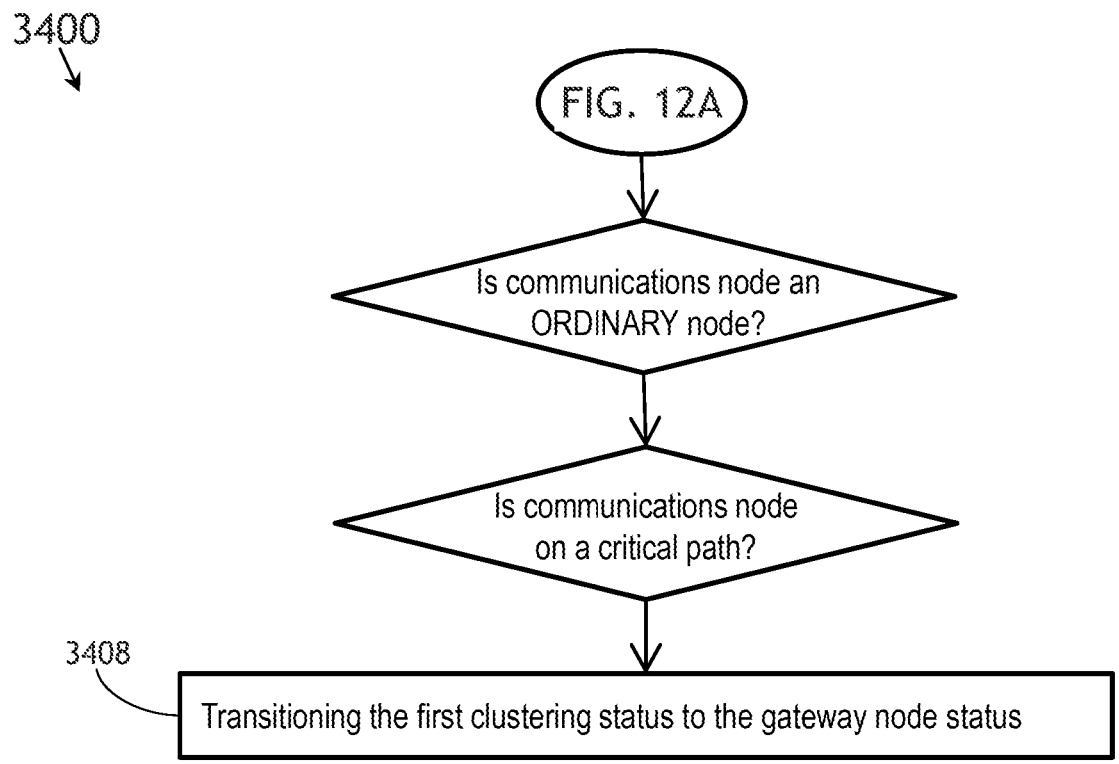

Referring to FIG. 12B, the method 3400 may include an additional step 3408. At the step 3408, if the communications node is an ordinary node, and the communications node is a critical path, the communications node transitions from ordinary node status to gateway node status.

Figure 12C:
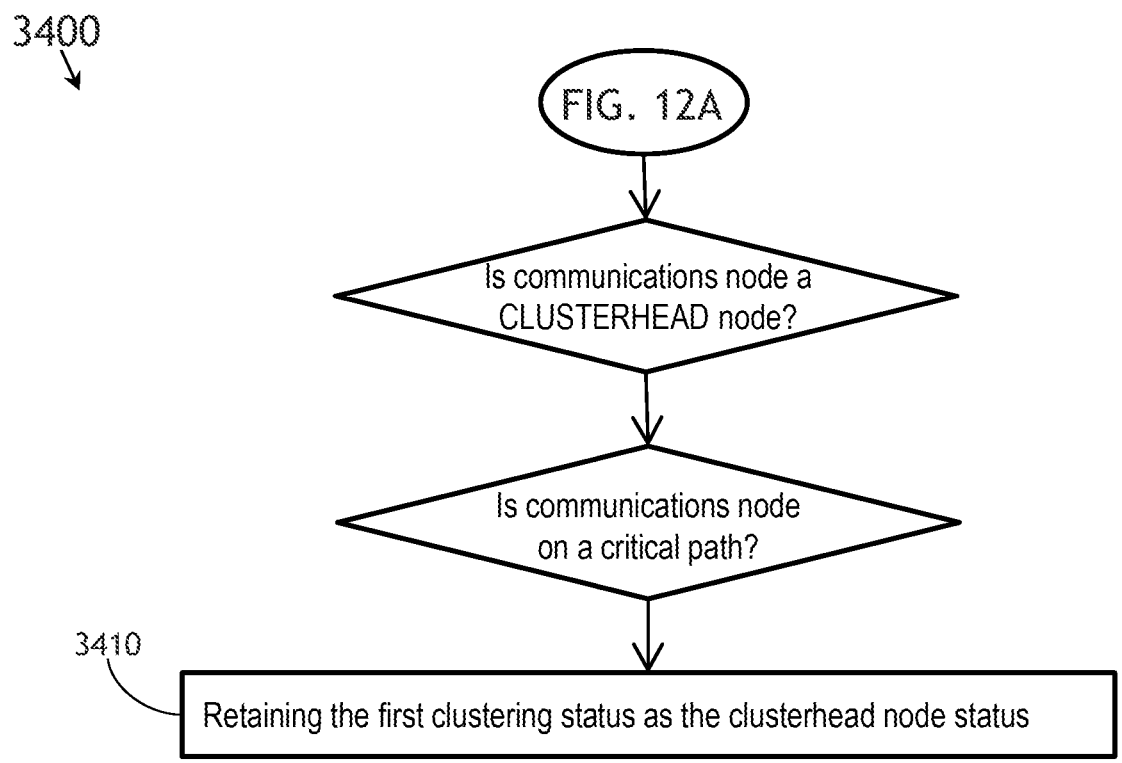

Referring to FIG. 12C, the method 3400 may include an additional step 3410. At the step 3410, if the communications node is a clusterhead node, and the communications node is a critical path, the communications node may retain its clusterhead node status. For example, the clusterhead node may retain its clusterhead node status even if another clusterhead node exists within its cluster or transmission range.

Figure 12D:
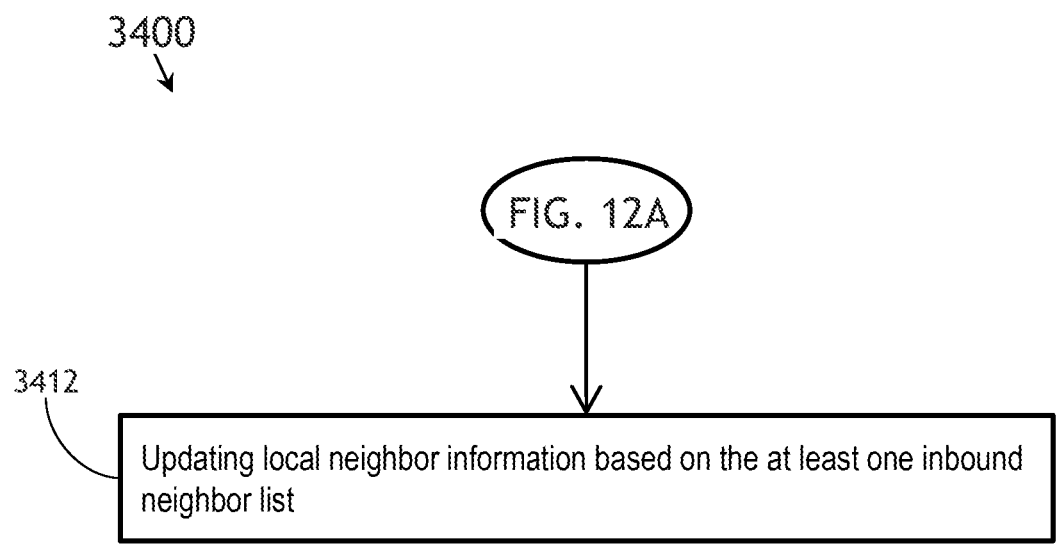

Referring to FIG. 12D the method 3400 may include an additional step 3412. At the step 3412, the communications node updates its local neighbor lists and/or link status information based on the received inbound partial neighbor lists.

Some embodiments may utilize efficient flooding, such as efficient flooding with passive clustering (EFPC) or zero overhead efficient flooding (ZOEF). U.S. patent application Ser. No. 16/369,398, filed April Mar. 29, 2019, issued as U.S. Pat. No. 10,979,348 on Apr. 13, 2021, discusses zero overhead efficient flooding (ZOEF) in detail. U.S. patent application Ser. No. 16/369,398, filed April Mar. 29, 2019, issued as U.S. Pat. No. 10,979,348 on Apr. 13, 2021 is incorporated by reference in its entirety. Some embodiments may utilize flooding to routing (F2R). U.S. patent application Ser. No. 16/537,824, filed Aug. 12, 2019, issued as U.S. Pat. No. 10,931,570 on Feb. 23, 2021, discusses F2R in detail. U.S. patent application Ser. No. 16/537,824, filed Aug. 12, 2019, issued as U.S. Pat. No. 10,931,570 on Feb. 23, 2021 is incorporated by reference in its entirety.

Efficient flooding with passive clustering (EFPC) is often used due to the fact that EFPC techniques do not require any prior knowledge of network topology, or even neighboring lists. EFPC and other efficient flooding techniques may be used for on-the-fly deployment of a two-hop clustering structure, and may be advantageous in that the very first flooding may be as efficient as subsequent flooding. However, with EFPC, two bits of each MAC packet are dedicated to clustering state information of each communication node. Due to the fact that EFPC utilizes dedicated two bits for efficient flooding, EFPC reduces available address space, breaks interoperability, and may not implementable without breaking communication protocol. t minimizes interoperability and may reduce the available address space.

Some embodiments of the present disclosure are directed to a system and method for zero-overhead efficient flooding (ZOEF). More specifically, embodiments of the present disclosure are directed to a system and method for data packet flooding and passive clustering without the use of dedicated two-bits for clustering state data. Additional embodiments of the present disclosure are directed to the use of multiple designated broadcast addresses for various types of communication nodes within a multi-node communication network. Additional embodiments of the present disclosure are directed to system and method for data packet flooding and passive clustering which utilizes a broadcast address comprising a single address of a total address space of a data packet. Further embodiments of the present disclosure are directed to a system and method of efficient packet flooding which provides all the benefits of EFPC while preserving interoperability.

For example, with respect to ZOEF, some embodiments may include a communication node of a multi-node communication network. In one or more embodiments, the communication node includes a communication interface and a controller communicatively coupled to the communication interface. The controller is configured to receive a data packet, via the communication interface, from a first additional communication node of the multi-node communication network, the data packet including a broadcast address indicative of a clustering status of the first additional communication node. The controller is further configured to determine a clustering status of the communication node, the clustering status based on a relationship between a number of gateway nodes and a number of clusterhead nodes communicatively coupled to the communication node. The controller is further configured to transmit the data packet, via the communication interface, to at least a second additional communication node of the multi-node communication network if the determined clustering status is a gateway clustering status or a clusterhead clustering status, the data packet including a broadcast address indicative of the clustering status of the communication node. In some embodiments, the controller is further configured to refrain from transmitting the data packet if the determined clustering status includes an ordinary node clustering status. In some embodiments of the communication node, the controller is further configured to determine the number of gateway nodes and the number of clusterhead nodes communicatively coupled to the communication node. In some embodiments of the communication node, at least one of the broadcast address indicatives of the clustering status of the first additional communication node or the broadcast address indicative of the clustering status of the communication node comprises a single address of a total address space of the data packet. In some embodiments of the communication node, at least one of the broadcast address indicative of the clustering status of the first additional communication node or the broadcast address indicative of the clustering status of the communication node comprises at least one of: a first broadcast address indicative of a gateway node clustering status; a second broadcast address indicative of a clusterhead node clustering status; or a third broadcast address indicative of an ordinary node clustering status. In some embodiments of the communication node, the controller further includes a memory configured to store a local list of one or more communication nodes communicatively coupled to the communication node. In some embodiments of the communication node, determining a number of gateway nodes and a number of clusterhead nodes communicatively coupled to the communication node comprises counting a number of gateway nodes within the local list, and counting a number of clusterhead nodes within the local list. In some embodiments of the communication node, the controller is further configured to: identify the first additional communication node based on a unique identifier of the first additional communication node received with the data packet from the first additional communication node; determine whether the first additional communication node is present within the local list stored in the memory; add the first additional communication node to the local list if the first additional communication node is not present within the local list; and update a clustering status and a communication time-stamp of the first additional communication node within the local list if the first additional communication node is present within the local list, wherein updating the communication time-stamp includes updating the communication time-stamp to a current time. In some embodiments of the communication node, the unique identifier includes at least one of a media access control (MAC) address or an internet protocol (IP) address. In some embodiments of the communication node, the controller is further configured to identify one or more timed-out communication nodes within the local list, and remove the one or more identified timed-out communication nodes from the local list. In some embodiments of the communication node, determining the clustering status of the communication node comprises: determining an ordinary node clustering status if $GW \geq \alpha*CH+\beta$, and determining a gateway node clustering status if $GW<\alpha*CH+\beta$, wherein GW defines the determined number of gateway nodes, CH defines the determined number of clusterhead nodes, and $\alpha$ and $\beta$ define gateway redundancy factors.

With respect to F2R, in some embodiments, the communication node includes a communication interface and a controller communicatively coupled to the communication interface. In embodiments, the controller is configured to receive a first data packet transmitted from a source communication node to a destination communication node; transmit the first data packet to one or more relay communication nodes via a packet flooding procedure; receive a first route response transmitted from the destination communication node to the source communication node along a discovered route; relay a first additional data packet transmitted from the source communication node to the destination communication node along the discovered route; determine a route failure of the first additional data packet; re-transmit the first additional data packet to the destination communication node via a packet flooding procedure; receive an additional route response transmitted from the destination communication node to the source communication node along a recovered route; and relay a second additional data packet transmitted from the source communication node to the destination communication node along the recovered route.

Referring generally to FIGS. 13-19, some embodiments may include a multi-node communication network 4100 configured for MHSA. In some embodiments, beacon-based clusterhead nodes 4102-1 may compile spatial awareness information and distribute the compiled spatial awareness information via efficient flooding. For example, PLI information of all nodes 4102 of the MANET (e.g., 4100) may be distributed across an entire MANET via a quantity of efficient floodings 4104 that is equal to a quantity of BB-CH nodes 4102-1. For example, the MANET may utilize passive spatial awareness (as discussed above), aspects of beacon-based passive clustering (BBPC) (as discussed above), and efficient flooding (as discussed above, e.g., zero overhead efficient flooding (ZOEF)) to distribute at least some (e.g., some or all) of the compiled spatial awareness information to every connected node 4102 of the plurality of nodes 4102 of the MANET. It should be noted that BBPC typically constructs a beacon-based passive clustering structure with BB-CH, beacon-based gateway nodes (BB-GW nodes), and beacon-based ordinary nodes (BB-ON); in some embodiments, however, only BB-CH nodes 4102-1 are utilized in MHSA, and the BB-GW nodes and the BB-ONs may be omitted. It should also be noted that efficient flooding (e.g., ZOEF or EFPC) constructs a communication (Comm) clustering structure with clusterhead (CH) nodes 4102-4 for Comm clustering, GW nodes 4102-3, and ONs 4102-2; in some embodiments, this Comm clustering structure may be also utilized for efficient flooding and/or EICD. Because of the structural advantage of beacon based passive clustering, the number of floodings may be reduced. As a result, learning the positional information of every participating node may be achieved with minimal overhead.

Currently, passive spatial awareness (PSA) is limited to a beacon range of a BB-CH node 4102-1. PSA may replace hello messages, and typically, may be useful for local routing decisions.

Currently, PLI may be a mission requirement. Convention PLI exchanges may consume significant bandwidth, and as a result, the refresh rate may be low.

Currently, routing protocols may generate significant line overhead to learn a network topology. Routing overhead including hello, link status, and/or distance vector advertisement messages consume bandwidth.

PSA may be spatial awareness without data communication. For example, low observable beaconing may be utilized to estimate position, velocity, direction, and acceleration of nodes whose beacons can be received.

Active spatial awareness may be spatial awareness through data communications. PLI or precision participant location information (PPLI) may utilize explicit data packets and communication to inform friend nodes of a position, velocity, direction, and acceleration of the sender. Multi-hop spatial awareness (MHSA) may also be a form of active spatial awareness. In conventional PLI, every node sends its PLI via flooding. In PLI with EICD, a clusterhead node collects its dedicated members' PLI and sends combined PLI info; the quantity of flooding may be significantly reduced as compared to conventional PLI; ZOEF may further reduce the flooding overheads. In some embodiments utilizing MHSA, beacon-based clusterhead (BB-CH) nodes may flood its passive spatial awareness along with its PLI; there may be no active PLI exchanges within the beacon-based cluster; and the quantity of floodings may be further reduced as compared to PLI with EICD, because the size of the beacon-based cluster 4112 is larger than the cluster of a Comm clustering 4110.

In some embodiments that utilize MHSA: the network may use PSA, beacon-based passive clustering (BB-PC), and efficient flooding (e.g., ZOEF). For example, every node of the network may have PSA without any data communication, the BB-PC may select a BB-CH node, and the BB-CH node may compile spatial awareness messages utilizing PSA. For example, the BB-CH node may broadcast spatial awareness messages via ZOEF, when allowed; this may allow the BB-CH to cope with mission parameters, such as by adjusting broadcasting frequencies. For example, the spatial awareness messages may include the following information: sender identification (ID) (e.g., BB-CH) and the sender's PLI; member IDs and additional information, such as PLI, link capacity, and/or a hop count to a member; a timestamp; and/or a time-to-live.

MHSA may be different from PLI with EICD in several ways. For example, for MHSA, there is no local PLI information exchanges; PSA at the BB-CH node is the information source of MHSA messages, and there is no data communication for local PSA. Moreover, for MHSA, there are no membership declarations in MHSA, whereas every non-CH node declares membership in EICD. In addition to those, the number of floodings is significantly lower in MSHA as compared to PLI with EICD, assuming the beacon range is greater than communication range for the BB-CH node. The size of the flooding packet may be larger in MHSA, and there may be possible duplicated information, because there is a lack of a dedicated clusterhead selection protocol.

Some embodiments may include network topology learning. There are many MANET routing protocols, but flooding based routing and/or delivery typically requires topology learning by exchanging hello-like messages for one-hop neighbors. These hello-like messages typically include a neighbor list to verify bi-directionality. In addition to one-hop neighbor discoveries, global topology may be learned via status and/or distance vector advertisement. Link status advertisement is usually done via flooding. Distance vector may use hop-by-hop aggregation in general. In some embodiments, the local topology within beacon range can be learned via PSA, which can provide significant bandwidth savings over conventional routing protocols.

Below is a table comparing features of PLI, PLI with EICD, and MHSA:

|  | PLI | PLI w EICD | MHSA |
| --- | --- | --- | --- |
| Accuracy of PLI | Measured | Measured | Estimated |
| Comm Overhead | Very high | Moderate | Low |
| Radio footprint | Very high | Moderate | Low |
| Freshness | Stale | Moderate | Fresh |
| Scalability | Low | Moderate | High |

Using MHSA may have many advantages. For example, MHSA may be a highly efficient spatial awareness. MHSA may be a good alternative for expensive PLI protocols, such as where estimated spatial awareness may be suitable. MHSA may provide strong foundations for highly efficient MANET routing, because there may be no additional line overhead other than MHSA, a local decision may be possible for a next hop to any destination, and there may be higher accuracy of a route decision when closer to the destination.

Figure 13:
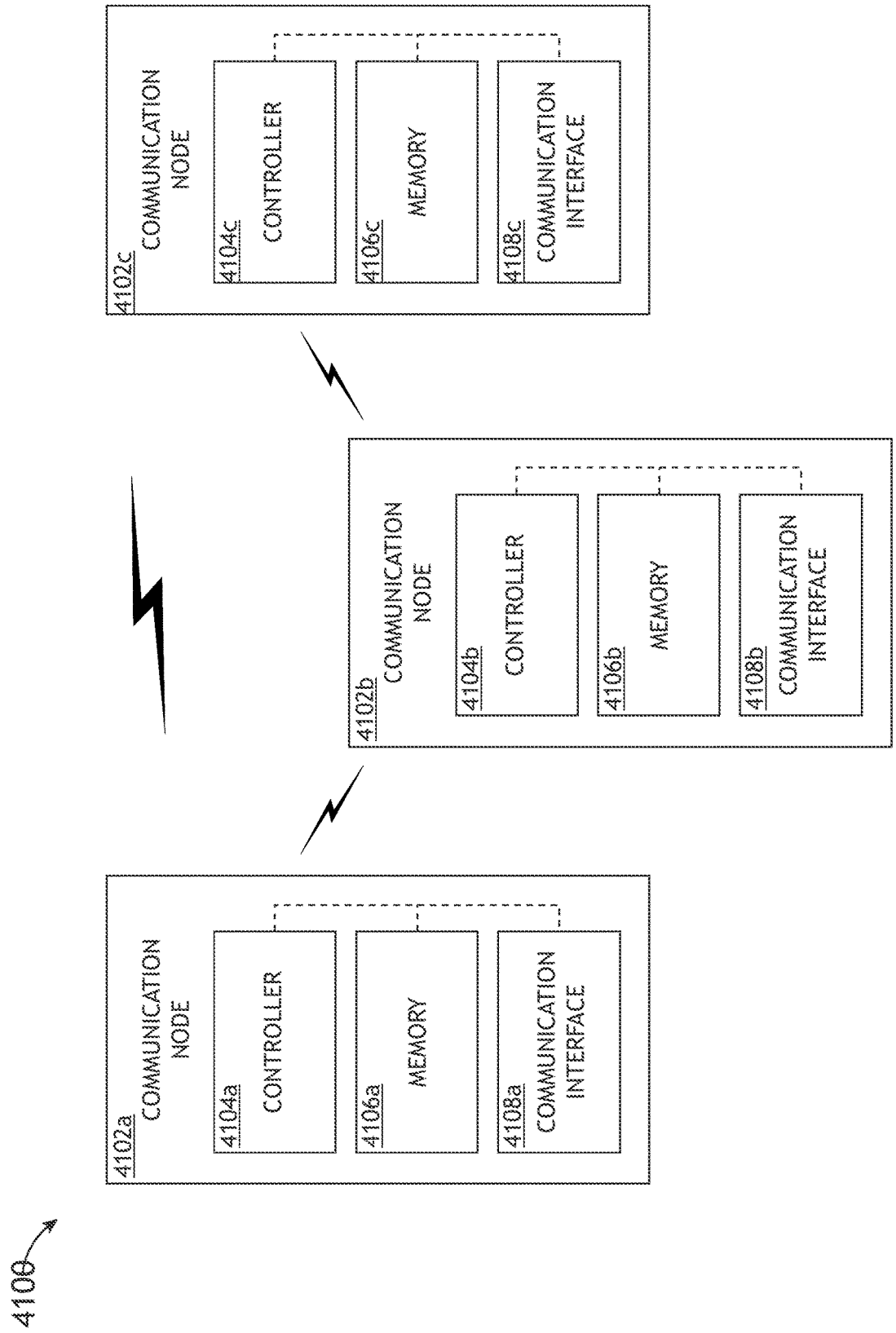
FIG. 13 illustrates a multi-node communication network, in accordance with one or more embodiments of the present disclosure.

FIG. 13 illustrates a multi-node communication network 4100, in accordance with one or more embodiments of the present disclosure. In embodiments, the multi-node communication network 4100 may include a plurality of communication nodes 4102. For example, the multi-node communication network 4100 may include a first communication node 4102*a*, a second communication node 4102*b*, and a third communication node 4102*c*.

The multi-node communication network 4100 may include any multi-node communication network known in the art. For example, the multi-node communication network 4100 may be or include a mobile ad-hoc network (MANET) in which each communication node 4102 within the multi-node communication network is able to move freely and independently. In additional and/or alternative embodiments, one or more communication nodes 4102 within the multi-node communication network 4100 may be stationary. In embodiments, the one or more communication nodes 4102 may include any communication node known in the art which may be communicatively coupled. In this regard, the one or more communication nodes 4102 may include any communication node known in the art for transmitting/transceiving data packets. For example, the one or more communication nodes 4102 may include, but are not limited to, radios, mobile phones, smart phones, tablets, smart watches, laptops, and the like.

Each communication node 4102 of the one or more communication nodes 4102*a*, 4102*b*, 4102*c* may include, but is not limited to, a respective controller 4104 (e.g., controller 4104*a*, 4104*b*, 4104*c*, etc.), memory 4106 (e.g., memory 4106*a*, 4106*b*, 4106*c*, etc.), and communication interface 4108 (e.g., communication interface 4108*a*, 4108*b*, 4108*c*, etc.).

The controller 4104 provides processing functionality for at least the communication node 4102 and can include any number of processors, micro-controllers, circuitry, field programmable gate array (FPGA) or other processing systems, and resident or external memory for storing data, executable code, and other information accessed or generated by the communication node 4102. The controller 4104 can execute one or more software programs embodied in a non-transitory computer readable medium (e.g., memory 4106) that implement techniques described herein. The controller 4104 is not limited by the materials from which it is formed or the processing mechanisms employed therein and, as such, can be implemented via semiconductor(s) and/or transistors (e.g., using electronic integrated circuit (IC) components), and so forth.

The memory 4106 can be an example of tangible, computer-readable storage medium that provides storage functionality to store various data and/or program code associated with operation of the communication node 4102/controller 4104, such as software programs and/or code segments, or other data to instruct the controller 4104, and possibly other components of the communication node 4102, to perform the functionality described herein. Thus, the memory 4106 can store data, such as a program of instructions for operating the communication node 4102, including its components (e.g., controller 4104, communication interface 4108, etc.), and so forth. It should be noted that while a single memory 4106 is described, a wide variety of types and combinations of memory (e.g., tangible, non-transitory memory) can be employed. The memory 4106 can be integral with the controller 4104, can comprise stand-alone memory, or can be a combination of both. Some examples of the memory 4106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 4108 can be operatively configured to communicate with components of the communication node 4102. For example, the communication interface 4108 can be configured to retrieve data from the controller 4104 or other devices (e.g., other nodes 4102), transmit data for storage in the memory 4106, retrieve data from storage in the memory 4106, and so forth. The communication interface 4108 can also be communicatively coupled with the controller 4104 to facilitate data transfer between components of the communication node 4102 and the controller 4104. It should be noted that while the communication interface 4108 is described as a component of the communication node 4102, one or more components of the communication interface 4108 can be implemented as external components communicatively coupled to the communication node 4102 via a wired and/or wireless connection. The communication node 4102 can also include and/or connect to one or more input/output (I/O) devices. In embodiments, the communication interface 4108 includes or is coupled to a transmitter, receiver, transceiver, physical connection interface, or any combination thereof.

It is contemplated herein that the communication interface 4108 of a communication node 4102 may be configured to communicatively couple to additional communication interfaces 4108 of additional communication nodes 4102 of the multi-node communication network 4100 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

In embodiments, the controller 4104 of a communication node 4102 is configured to carry out any or all steps and/or functions of the present disclosure.

Figure 14:
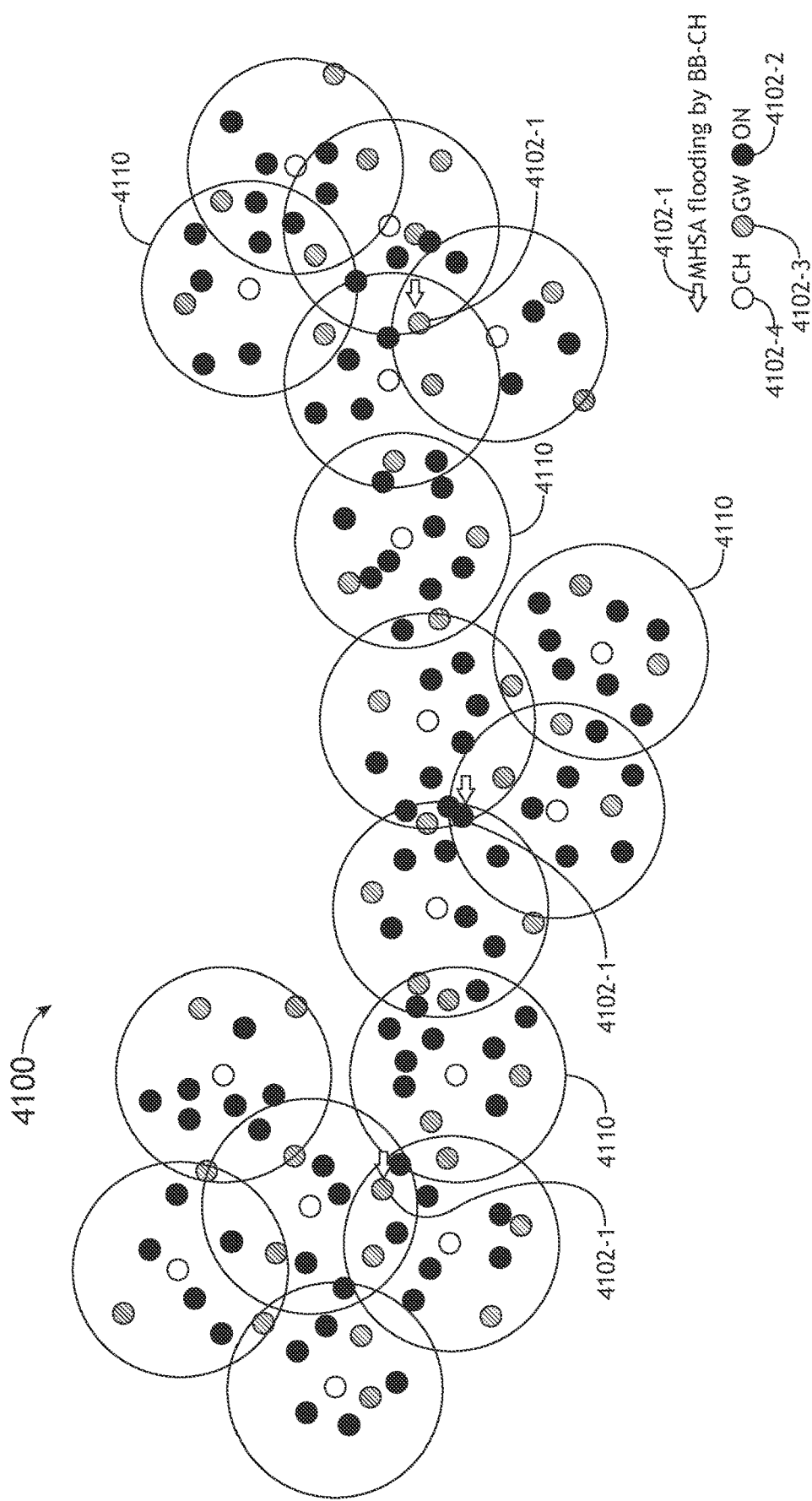
FIG. 14 is a diagrammatic illustration of a network and individual nodes thereof according to example embodiments of this disclosure.

FIG. 14 illustrates an exemplary multi-node communication network 4100 (e.g., a MANET) configured for MHSA, in accordance with one or more embodiments of the present disclosure. In some embodiments, the multi-node communication network 4100 may include a plurality of nodes (e.g., communication nodes 4102). For example, the multi-node communication network 100 may include at least one beacon-based clusterhead (BB-CH) node 4102-1, clusterhead (CH) nodes 4102-4, ordinary nodes (ON) 4102-2, and/or at least one gateway node (GW) 4102-3.

A node 4102 may be an endpoint within a communication network 4100. For example, a node can be a radio device carried by a soldier or installed in a location or vehicle.

A BB-CH node 4102-1 may be a node within the communication network 4100 utilized to aggregate and distribute information of several nearby nodes 4102.

PLI may be data detailing the physical location, speed and direction of a node 4102 within the communication network 4100.

A gateway node 4102-3 may be a node connected to multiple clusters within the network 4100 allowing for the flow of communication between those connections. A gateway node 4102-3 may be a member of at least two CH nodes 4102-4. Two or more gateway nodes may work together to connect disjoint clusters.

For example, network topology may change as nodes 4102 physically move around a battlefield. As described, these nodes 4102 (e.g., 4102-2, 4102-3, and/or 4102-4) may self-register as a member of a local BB-CH node 4102-1, which may be responsible for aggregating and distributing the PLI of the BB-CH node's 4102-1 members.

In some embodiments, the mobile ad-hoc network (MANET) (e.g., 4100) may including a plurality of nodes 4102, wherein each of the plurality of nodes 4102 comprises a communication interface 4108 and a controller 4104, wherein the plurality of nodes 4102 comprises beacon-based clusterhead (BB-CH) nodes 4102-1 and members (e.g., 4102-2, 4102-3, and/or 4102-4). Each of the plurality of nodes 4102 may be one of BB-CH nodes 4102-1 or a member of at least one BB-CH node 4102-1. Each of the plurality of nodes 4102 may be configured to send communication data packets and to transmit beacons. A range of each beacon may be greater than a range of each communication data packet. Each of the plurality of nodes 4102 may have passive spatial awareness. For each of the BB-CH nodes 4102-1 having members, a BB-CH node 4102-1 may be configured to compile (e.g., passively compile) spatial awareness information via passive spatial awareness (PSA) based at least on a beacon from each member of the members of the BB-CH node 4102-1. The spatial awareness information from a given member of the members may include information of a member identification of the given member and/or the given member's location. The compiled spatial awareness information may include a BB-CH node identification for the BB-CH node 4102-1, position-location information (PLI) of the BB-CH node 4102-1, a quantity of the members of the BB-CH node 4102-1, a member list including member identifications of the members and PLI of each member, a timestamp, a time-to-live indicating a number of hops the compiled spatial awareness information is to be forwarded for each member, link capacity, and/or a hop count from the BB-CH node 4102-1 to each member of the BB-CH node 4102-1. For each of the BB-CH nodes 4102-1, the BB-CH node 4102-1 may be configured to broadcast, via efficient flooding (e.g., ZOEF or EFPC), at least some (e.g., some or all) of the compiled spatial awareness information to every connected node 4102 of the plurality of nodes 4102. In some embodiments, for at least one of the BB-CH nodes 4102-1 having members, at least one of the members is a gateway node 4102-3.

In some embodiments, only the BB-CH nodes 4102-1 may be allowed to initiate a broadcast of the compiled spatial awareness information via flooding. For example, PLI information of all nodes 4102 of the MANET (e.g., 4100) may be distributed across the entire MANET (e.g., 4100) via a quantity of efficient floodings that is equal to a quantity of the BB-CH nodes 4102-1, and the quantity of efficient flooding relay may be less than a quantity of nodes 4102 of the MANET (e.g., 4100). For example, for the network 4100 of FIG. 14, PLI information of all nodes 4102 of the network 4100 may be distributed across the entire network via a quantity (e.g., 3, as shown) of efficient floodings that is less than a quantity (e.g., 16, as shown) of the CH nodes 4102-4 for Comm clustering, and the quantity of efficient flooding relay may be less than a quantity of nodes 4102 of the MANET (e.g., 4100).

In some embodiments, the MANET (e.g., 4100) utilizes passive spatial awareness, aspects of beacon-based passive clustering, and efficient flooding (e.g., zero overhead efficient flooding (ZOEF) or EFPC) to distribute at least some (e.g., some or all) of the compiled spatial awareness information to every connected node 4102 of the plurality of nodes 4102 of the MANET.

As exemplarily shown in FIG. 14, the network 4100 has 70 nodes 4102 and 16 Comm clusters 4110 with 16 clusterheads 4102-4 for Comm clustering, and three beacon-based passive clusters 4112 with three BB-CH nodes 4102-1. By using MHSA, complete spatial awareness of all 70 nodes 4102 in the network 4100 may be completed with three floodings as compared to EICD which would require 16 floodings and PLI which would require 170 floodings. For example, the bandwidth savings of MHSA is readily apparent even in a barely connected network, as shown there would be 3 efficient floodings for MHSA as compared to 38 floodings (one for each node 4102) for conventional PLI networks. As the network 4100 increases in size and density, the savings become larger. Because of this extremely efficient PLI learning for MHSA, PLI updates can be more frequent and can handle bigger networks.

Figure 15:
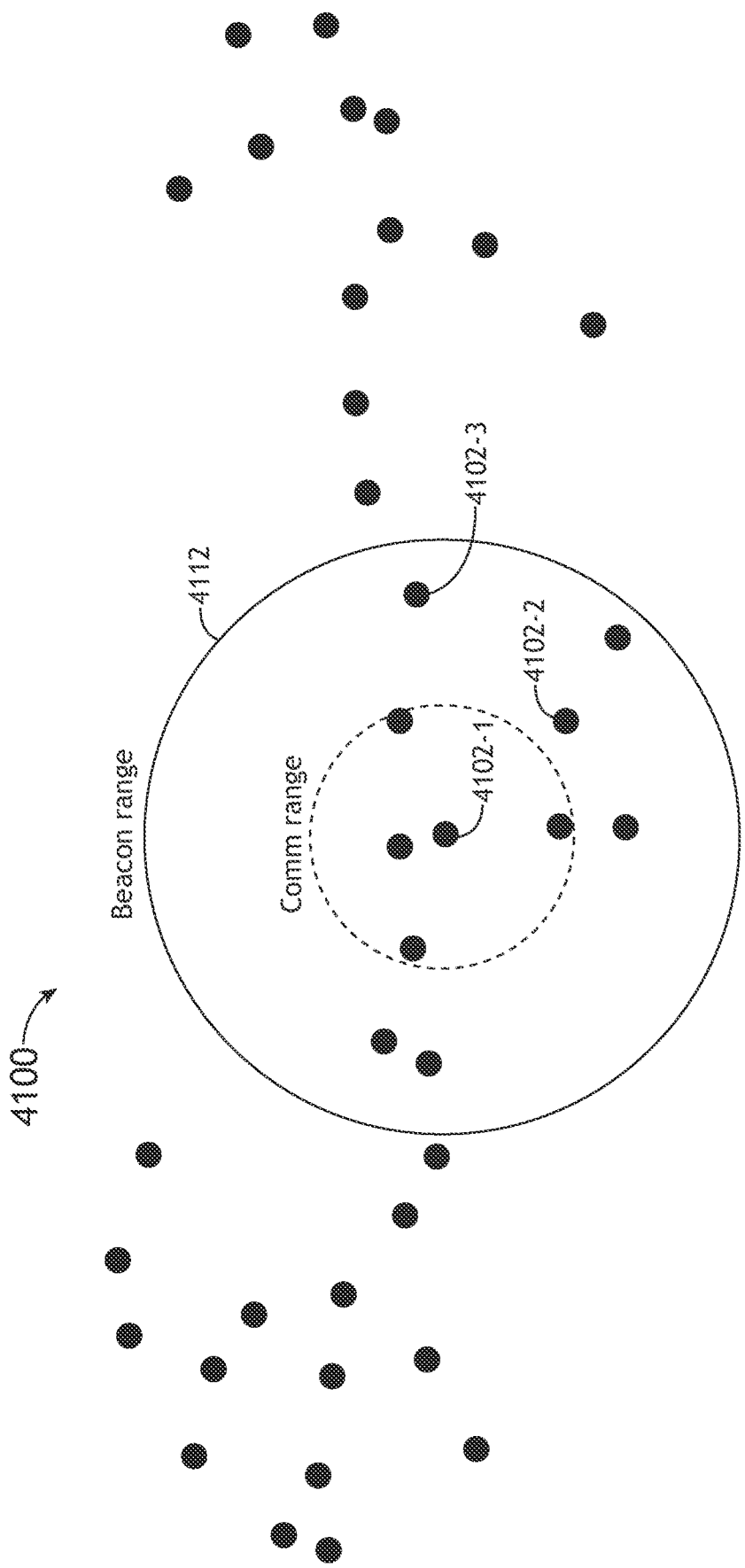
FIG. 15 is a diagrammatic illustration of a network and individual nodes thereof according to example embodiments of this disclosure.

FIG. 15 illustrates an exemplary multi-node communication network 4100 (e.g., a MANET) configured for MHSA, in accordance with one or more embodiments of the present disclosure. As shown in FIG. 15, the network 4100 may be configured to use beacon-based passive clustering (BBPC). The nodes 4102 of the network 4100 may be organized into BBPC clusters 4112 of nodes 4102, each BBPC cluster 4112 including a BB-CH node 4102-1 and members (e.g., ordinary nodes 4102-2, gateway nodes 4102-3, and/or CH nodes 4102-4 for Comm clustering) of the BB-CH node 4102-1. Each of the nodes 4102 may be configured to transmit communication data packets and transmit beacons; in some embodiments, a range of each beacon is greater than a range of each communication data packet. The beacon may be a low observable beacon that can be detected by further away nodes than communication data packets. For example, as shown, the beacon range can be twice as far as a communication data packet, though any suitable transmission ranges may be used.

Figure 16A:
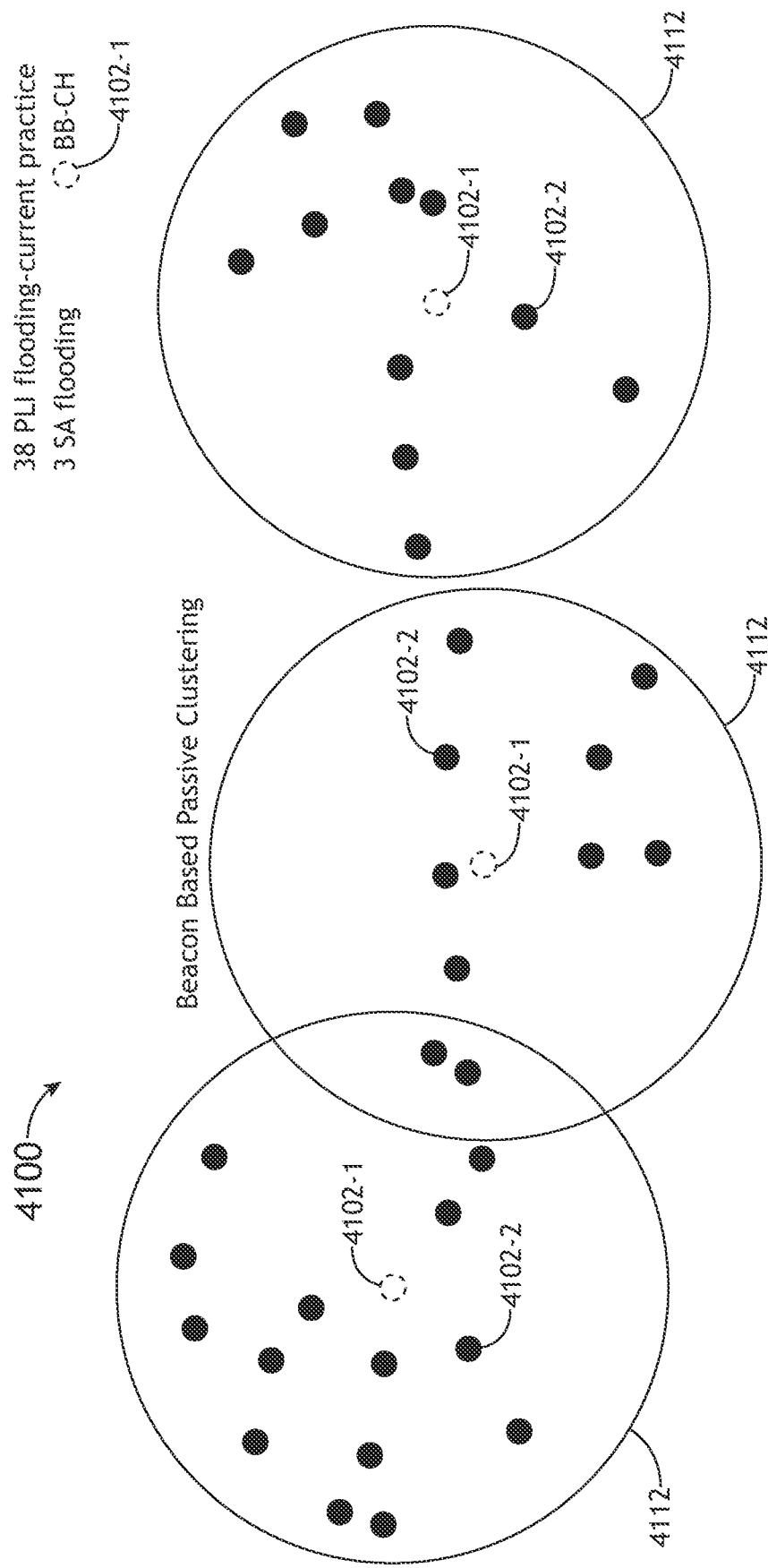
FIG. 16A is a diagrammatic illustration of a network and individual nodes thereof according to example embodiments of this disclosure.
Figure 16B:
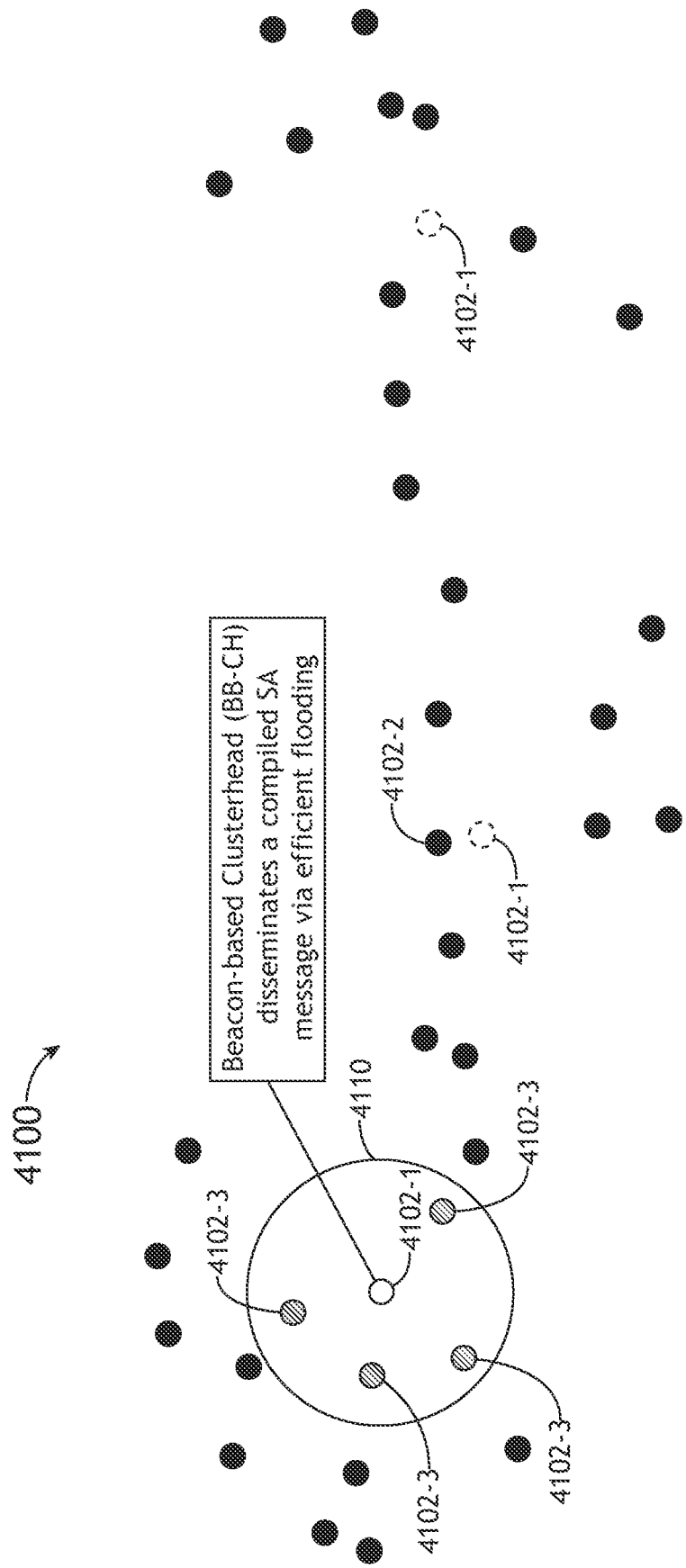
FIG. 16B is a diagrammatic illustration of a network and individual nodes thereof according to example embodiments of this disclosure.

FIGS. 16A and 16B illustrate an exemplary multi-node communication network 4100 (e.g., a MANET) configured for MHSA, in accordance with one or more embodiments of the present disclosure. Similar to as shown in FIG. 15, in FIGS. 16A and 16B, the network 4100 may be configured to use BBPC. Each BB-CH node 4102-1 may compile spatial awareness (SA) messages (e.g., transmitted as beacons) including necessary information of its 4102-1 members (e.g., all the nodes 4102 in the BB-CH node's 4102-1 beacon range). PLI is an example of information which can be harvested via passive spatial awareness (PSA). Compiled spatial awareness information can include an identification (ID) and location (e.g., as measured by a global positioning system (GPS), etc.) of the BB-CH node 4102-1, a number of members, a list of member IDs and the member's PLI, as well as additional information. In this example, only 3 SA message flooding are sufficient to learn the entire PLI of the network 4100. Every node 4102 may have spatial awareness within its beacon range without any data packet communications.

As shown in FIG. 16B, the BB-CH node 4102-1 may disseminate some or all of the compiled spatial awareness information as a compiled SA message via efficient flooding. For example, the efficient flooding may be ZOEF or EFPC to deliver the compiled SA message to every connected node 4102, which may deliver PLI of the BB-CH node 4102-1 and its members. Beacon based passive clustering can guarantee that every node 4102 in the connected network 4100 is either a BB-CH node 4102-1 or a member (e.g., 4102-2, 4102-3, and/or 4102-4) of one or more BB-CH node 4102-1, which is why the compiled SA flooding from the BB-CH node 4102-1 would be sufficient to learn the entire PLI.

Figure 17:
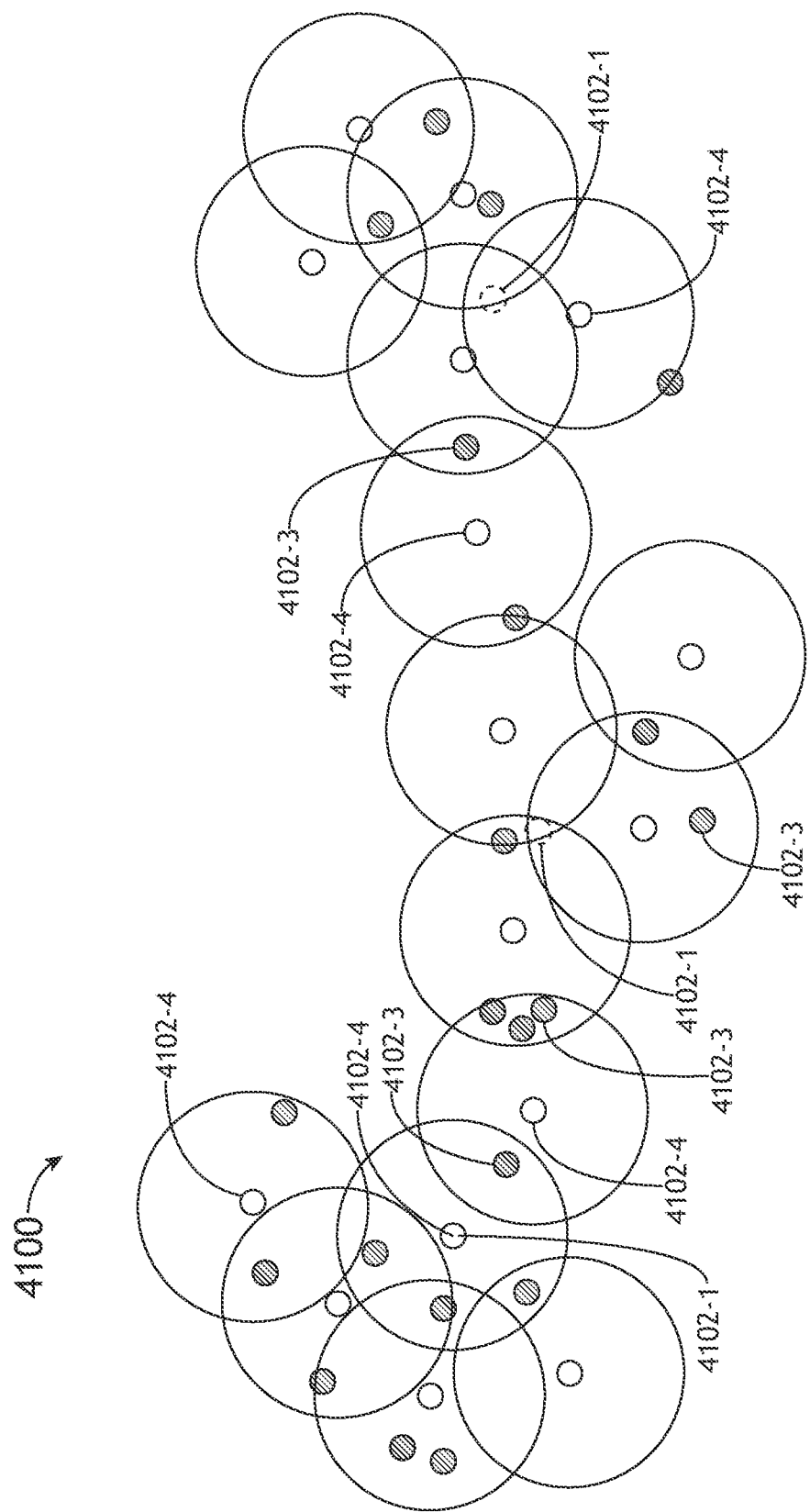
FIG. 17 is a diagrammatic illustration of a network and individual nodes thereof according to example embodiments of this disclosure.

FIG. 17 illustrates an exemplary multi-node communication network 4100 (e.g., a MANET) configured for MHSA, in accordance with one or more embodiments of the present disclosure. Similar to as shown in FIGS. 15-16B, the network 4100 may be configured to use BBPC. In this example, ZOEF or EFPC may be used. As exemplarily shown, every node 4102 may be at least one of BB-CH nodes 4102-1, a gateway node 4102-3, or a CH node 4102-4 for Comm clustering. The SA flooding may utilize the same clustering structure or construct a new clustering structure. As exemplarily shown, ordinary nodes 4102-2 are not shown in FIG. 17 for illustrative purposes, though the network 4100 may also include any suitable number of ordinary nodes 4102-2.

Figure 18:
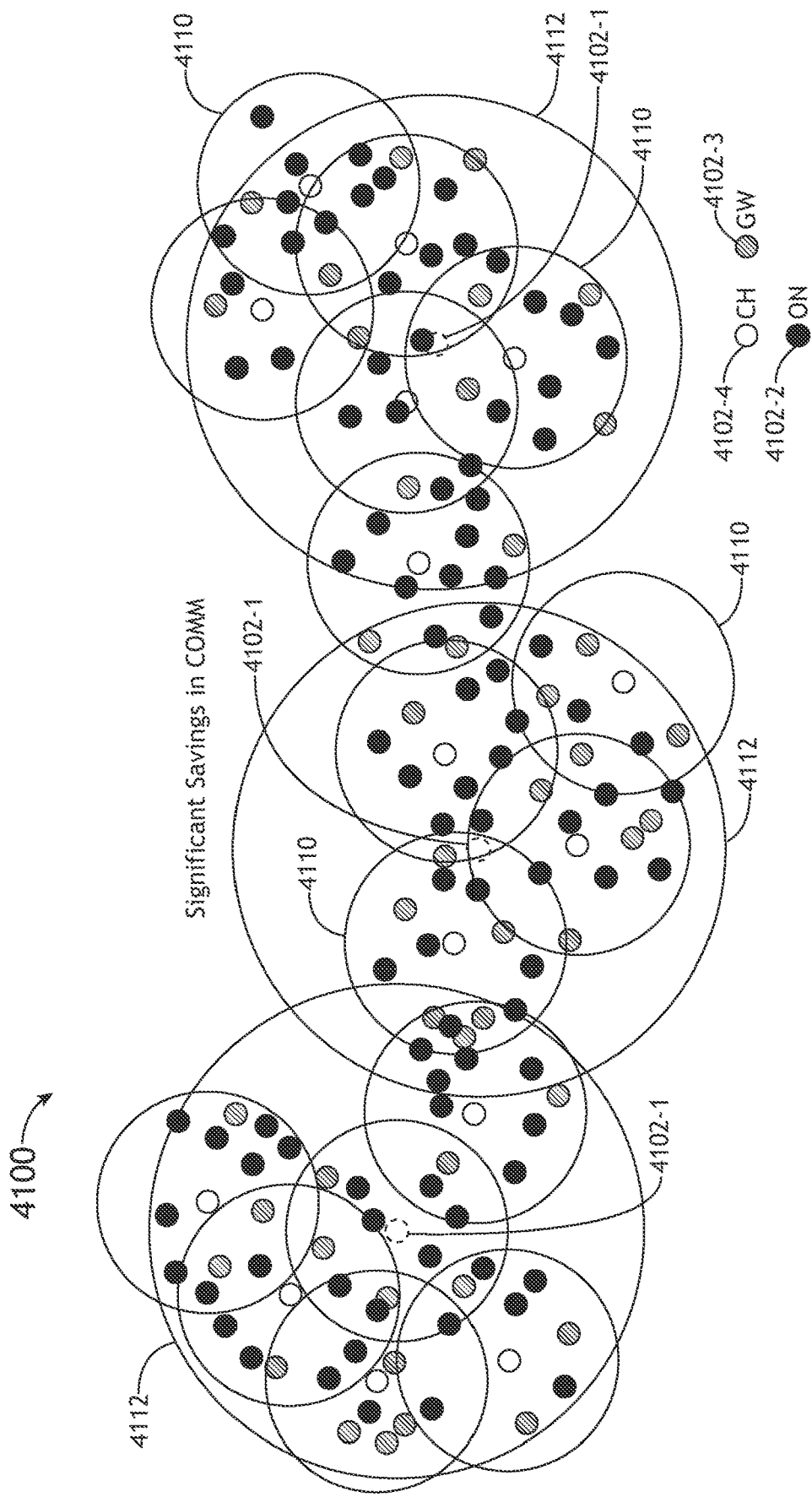
FIG. 18 is a diagrammatic illustration of a network and individual nodes thereof according to example embodiments of this disclosure.

FIG. 18 illustrates an exemplary multi-node communication network 4100 (e.g., a MANET) configured for MHSA, in accordance with one or more embodiments of the present disclosure. Similar to as shown in FIGS. 15-17, the network 4100 may be configured to use BBPC clusters 4112 and Comm clustering clusters 4112. The advantage of using MHSA over PLI flooding is apparent, even in a barely connected network, where MHSA uses 3 floodings as compared to 38 floodings for PLI flooding. As the network gets bigger and denser, the gain gets bigger. Because of this extremely efficient PLI learning, the PLI update can be more frequent and can deal with bigger networks.

Figure 19:
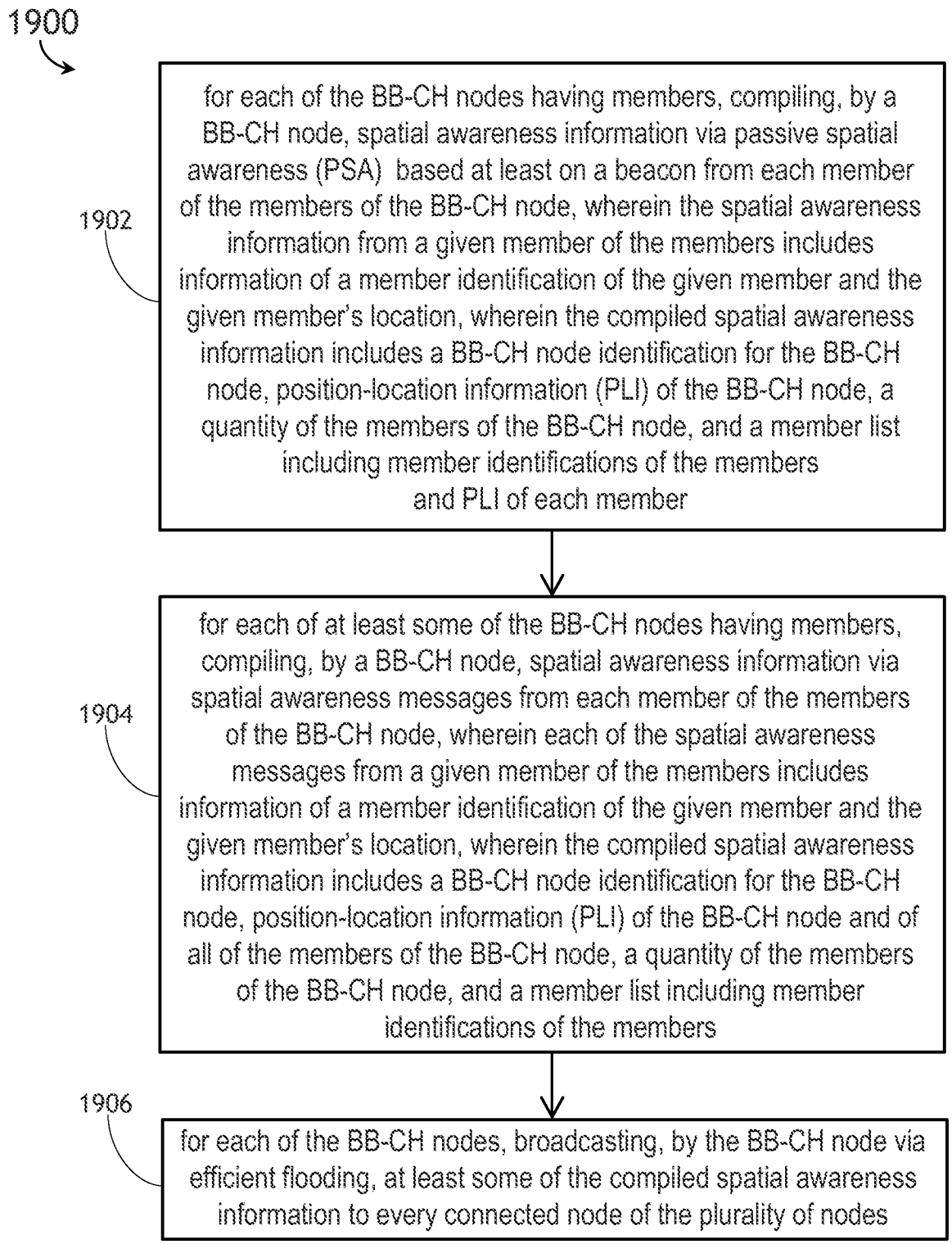
FIG. 19 illustrates a flowchart of a method, in accordance with one or more embodiments of the present disclosure.

Referring now to FIG. 19, an exemplary embodiment of a method 1900 according to the inventive concepts disclosed herein may include one or more of the following steps. Additionally, for example, some embodiments may include performing one or more instances of the method 1900 iteratively, concurrently, and/or sequentially. Additionally, for example, at least some of the steps of the method 1900 may be performed in parallel and/or concurrently. Additionally, in some embodiments, at least some of the steps of the method 1900 may be performed non-sequentially.

A step 1902 may include providing a mobile ad-hoc network (MANET) including a plurality of nodes, wherein each of the plurality of nodes comprises a communication interface and a controller, wherein the plurality of nodes comprises beacon-based clusterhead (BB-CH) nodes and members, wherein each of the plurality of nodes is one of a BB-CH node or a member of at least one BB-CH node, wherein each of the plurality of nodes is configured to transmit communication data packets and transmit beacons, wherein a range of each beacon is greater than a range of each communication data packet, wherein each of the plurality of nodes has passive spatial awareness.

A step 1904 may include, for each of the BB-CH nodes having members, compiling, by a BB-CH node, spatial awareness information via passive spatial awareness (PSA)

based at least on a beacon from each member of the members of the BB-CH node, wherein the spatial awareness information from a given member of the members includes information of a member identification of the given member and the given member's location, wherein the compiled spatial awareness information includes a BB-CH node identification for the BB-CH node, position-location information (PLI) of the BB-CH node, a quantity of the members of the BB-CH node, and a member list including member identifications of the members and PLI of each member.

A step 1906 may include, for each of the BB-CH nodes, broadcasting, by the BB-CH node via efficient flooding, at least some of the compiled spatial awareness information to every connected node of the plurality of nodes.

Further, the method 1900 may include any of the operations disclosed throughout.

Referring generally to FIGS. 20-23, some embodiments may include a multi-node communication network 4100 configured for a light version of MHSA (MHSA-light). The multi-node communication network 4100 of FIGS. 20-23 may include components similar to and have functionality similar to the multi-node communication network 4100 of FIGS. 13-19, at least except that, for MHSA-light, the member list of the compiled spatial awareness information may exclude PLI of each member node (e.g., 4102-2, 4102-3, and/or 4102-4). Additionally, for MHSA or MHSA-light, the multi-node communication network 4100 may utilize spatial-aware network routing (SaNR).

The routing overhead of Mobile Ad hoc Networks (MANETs) is not negligible and exponentially increases as the size of the network grows. Topology learning requires significant overheads for neighbor discoveries and link status and/or distance vector advertisements.

MHSA-light may utilize aspects of MHSA, as discussed with respect to FIGS. 13-19. For example, every node 4102 may have passive spatial awareness (PSA) within a beacon range. For example, an entire network topology can be harvested utilizing aspects of MHSA. With multi-hop spatial awareness (MHSA), each of plurality of nodes has PLI of all the connected nodes without the traditional PLI distribution system. The conventional PLI distribution system uses excessive over-the-air overhead which may not be suitable for routing constructions. On the other hands, MHSA utilizes minimal number of data flooding which can construct network topology in a short period time with significantly less control overhead then the traditional PLI distribution system. Some embodiments may include a routing protocol which utilized the constructed topology information via MHSA.

MHSA-light may have network overhead savings as compared to MHSA. For example, MHSA-light may utilize SA messages having member lists with member IDs but lacking PLI of the members (e.g., 4102-2, 4102-3, and/or 4102-4). Additionally, in some embodiments, instead of having information of the PLI of the members, the MHSA-light SA messages may include additional information of members, such as link capacity and/or a hop-count from a BB-CH node (4102-1). Every node 4102 of the network 4100 may have all destination nodes' 4102 IDs, a corresponding BB-CH node(s) 4102-1 associated each of such destination nodes 4102, and current PLI of the BB-CH nodes 4102-1.

In some embodiments, MHSA-light may result in a significant reduction of the size of spatial awareness (SA) messages (as compared to MHSA), as the SA messages may lack PLI of non-BB-CH nodes (e.g., 4102-2, 4102-3, and/or 4102-4).

In some embodiments, SaNR may have no additional line overhead as compared to MHSA. Routes may be calculated with information distributed by MHSA and/or MHSA-light messaging. For example, if a node 4102 is routing a message to a destination node 4102 that is within a beacon-based cluster 4112 associated with the node 4102, the node 4102 may utilize intra-cluster routing. For example, if a node 4102 is routing a message to a destination node 4102 that is outside of a beacon-based cluster 4112 associated with the node 4102, the node 4102 may utilize inter-cluster routing. Inter-cluster routing may include directional forwarding of data packets beyond a beacon range of the node 4102. For example, inter-cluster routing may include forwarding of data packets generally toward a destination's waypoint. Inter-cluster routing may result in better routing decisions as data forwarding gets closer to the destination node 4102, and inter-cluster routing does not require unnecessary detours through BB-CH nodes 4102-1 in the route.

In some embodiments, with respect to intra-cluster routing, the position information of all nodes in the range of beacon can be learned with passive spatial awareness (PSA). The links between nodes can be estimated via a propagation model based on the distance between nodes. Some embodiments may use a shortest path algorithm(s) (e.g., Bellman-Ford) to construct shortest path routes with weights (e.g., based on concept of operation (CONOP) requirements, weights on links can be modified to construct a best route within the beacon range). The shortest path routes can provide a better routing decision to be made at relay nodes 4102. For intra-cluster routing, every node 4102 participant may participate in the following: PSA, MHSA, ZOEF, and BBPC, all of which are described above.

In some embodiments, inter-cluster routing may be a method of directional packet forwarding. Inter-cluster routing may include calculating a waypoint. Calculating the waypoint may include: identifying all BB-CH nodes 4102-1 whose member list contain the destination node 4102. If there are more than one BB-CH node 4102, the waypoint can be computed as the midpoint of positions of the BB-CH nodes 4102-1 (e.g., an average of the positions of the BB-CH nodes 4102-1). If there is only one BB-CH node 4102-1 for which the destination node 4102 is a member, the waypoint may be the position of the BB-CH node 4102-1. Inter-cluster routing may further include selecting a next hop toward the destination node's 4102 waypoint when the destination node 4102 is out of beacon range. Selecting a next hop may include: checking a connectivity of BB-CH nodes 4102-1 along the route and forwarding the packet toward a connected nearby BB-CH node 4102-1. Each relay node 4102 may forward the packet to a best next hop to the destination node 4102, in a similar fashion. Once the destination node 4102 is within a beacon range, a best route can be found via intra-cluster routing, as disclosed herein.

With respect to checking a connectivity of BB-CH nodes 4102-1 along the route to the destination node 4102, BB-CH nodes 4102-1 are connected, if and only if the BB-CH 4102-1 nodes have common members. Some embodiments may include selecting a next BB-CH node 4102-1 toward the destination node 4102 which has a path to the destination BB-CH 4102-1 with a minimum number of BB-CH 4102-1 hops. This selection may be performed by: examining the connected BB-CH nodes 4102-1 with a destination BB-CH node 4102-1, and identifying a 1-BB-CH-hop-away group; identifying a connected BB-CH node 4102-1 to any of the 1-BB-CH-hop-away group and determining a 2-BB-CH-hop-away group; and/or repeating the preceding steps until a current BB-CH node 4102-1 is connected to the n-BB- CH-hop-away group, and determining a next hop to the destination node 4102 along a shortest path to the connected n-BB-CH-hop-away group.

In some embodiments, SaNR may utilize flooding to routing (F2R), as discussed above, to deliver a communication data packet to a destination node 4102 when there is unstable and/or incomplete MHSA information. F2R may allow for no network downtime due to a route error or route recovery. Additionally, in some embodiments, F2R may be used only for high priority traffic (e.g., having a predetermined priority level higher than a priority level of normal traffic) to avoid broadcast storms.

Below is a table comparing features of PLI, PLI with EICD, MHSA, and MHSA-light:

|  | PLI | PLI w EICD | MHSA | MHSA light |
| --- | --- | --- | --- | --- |
| Accuracy of PLI | Measured | Measured | Estimated | Referenced |
| Comm Overhead | Very high | Moderate | Low | Very low |
| Radio footprint | Very high | Moderate | Low | Very low |
| Freshness | Stale | Moderate | Fresh | Very Fresh |
| Scalability | Low | Moderate | High | Very high |

In some embodiments, SaNR may include extremely light and proactive routing while having a well-defined efficient flooding structure for F2R on demand. SaNR overhead may be extremely low. For example, SaNR may have no more line overhead than MHSA. MHSA-light can reduce the overhead more. For routing purposes, MHSA-light may be sufficient, for example, while using 1 byte of overhead instead of 14+ bytes of overhead per member. SaNR allows for more frequent route updates. Additionally, supplementary F2R may eliminate network downtime. With MHSA-light and SaNR, a large-scale MANET is possible with a proactive paradigm, and SaNR may provide more proactively efficient routing than any known MANET routing methods.

In some embodiments, a complete network topology may be constructed with the compiled spatial awareness information and routes to all connected nodes may be calculated. Flooding to Routing (F2R) is an on-demand component of Spatial-aware Network Routing (SaNR) which may deliver time critical data to destination when the spatial awareness information is incomplete or unstable.

Some embodiments may include a system including a multi-node communication network 4100 (e.g., a MANET). The MANET may include a plurality of nodes 4102. Each of the plurality of nodes 4102 may include a communication interface (e.g., 4108a, 4108b, or 4108c) and a controller (e.g., 4104a, 4104b, or 4104c). The plurality of nodes 4102 may include beacon-based clusterhead (BB-CH) nodes 4102-1 and members (e.g., 4102-2, 4102-3, and/or 4102-4). Each of the plurality of nodes 4102 may be one of BB-CH nodes 4102-1 or a member (e.g., 4102-2, 4102-3, and/or 4102-4) of at least one BB-CH node 4102-1. Each of the plurality of nodes 4102 may be configured to transmit communication data packets and transmit beacons, wherein a range of each beacon is greater than a range of each communication data packet. Each of the plurality of nodes 4102 may have passive spatial awareness (PSA).

In some embodiments, for each of the BB-CH nodes 4102-1 having members (e.g., 4102-2, 4102-3, and/or 4102-4), a BB-CH node 4102-1 may be configured to compile spatial awareness information via passive spatial awareness (PSA) based at least on a beacon from each member (e.g., 4102-2, 4102-3, or 4102-4) of the BB-CH node 4102-1. The spatial awareness information from a given member (e.g., 4102-2, 4102-3, or 4102-4) may include information of a member identification of the given member (e.g., 4102-2, 4102-3, or 4102-4). The compiled spatial awareness information may include a BB-CH node identification for the BB-CH node 4102-1, position-location information (PLI) of the BB-CH node 4102-1, a quantity of the members (e.g., 4102-2, 4102-3, and/or 4102-4) of the BB-CH node 4102-1, and a member list including member identifications of the members (e.g., 4102-2, 4102-3, and/or 4102-4). For each of the BB-CH nodes 4102-1, the BB-CH node 4102-1 may be configured to broadcast, via efficient flooding, at least some of the compiled spatial awareness information to every connected node 4102 of the plurality of nodes 4102.

In some embodiments, the compiled spatial awareness information further includes information of at least one of: link capacity for each member (e.g., 4102-2, 4102-3, and/or 4102-4) of the BB-CH node 4102-1, a hop count from the BB-CH node 4102.-1 to each member (e.g., 4102-2, 4102-3, and/or 4102-4) of the BB-CH node 4102-1, a timestamp, and/or a time-to-live indicating a number of hops the compiled spatial awareness information is to be forwarded for each member (e.g., 4102-2, 4102-3, and/or 4102-4).

In some embodiments, a node 4102 of the plurality of nodes 4102 may be configured to (e.g., via the communication interface (e.g., 4108a, 4108b, or 4108c) and/or the controller (e.g., 4104a, 4104b, or 4104c)): route a communication data packet toward a destination node 4102 of the plurality of nodes 4102; determine whether the destination node 4102 is within a beacon range of the node 4102; and/or one of: (a) upon a determination that the destination node 4102 is within the beacon range of the node 4102, utilize intra-cluster routing to route the communication data packet toward the destination node 4102, wherein intra-cluster routing is routing within a beacon-based cluster 4112; or (b) upon a determination that the destination node 4102 is not within the beacon range of the node 4102, utilize inter-cluster routing to route the communication data packet toward the destination node 4102, wherein inter-cluster routing is routing between beacon-based clusters 4112.

In some embodiments, the node 4102 of the plurality of nodes 4102 being configured to utilize the intra-cluster routing to route the communication data packet toward the destination node 4102 may further comprise the node 4102 being configured to: calculate a local network topology based on positions of beacon neighbors 4102 of the node 4102 via PSA; estimate links to at least one relay node 4102 between the node 4102 and the destination node 4102 via link adaptation; and/or based at least on the estimated links, utilize a shortest path algorithm to construct a route for the communication data packet toward the destination node 4102.

In some embodiments, the node 4102 of the plurality of nodes 4102 being configured to utilize the inter-cluster routing to route the communication data packet toward the destination node may further comprise the node 4102 being configured to: calculate a waypoint having a position associated with at least one position of one or more BB-CH nodes 4102-1 having the destination node 4102 as a member (e.g., 4102-2, 4102-3, or 4102-4), wherein a position of the waypoint is a position of the one or more BB-CH nodes 4102-1 if the one or more BB-CH nodes 4102-1 is a single BB-CH node 4102-1, wherein the position of the waypoint is an average position of the one or more BB-CH nodes 4102-1 if the one or more BB-CH nodes 4102-1 are at least two BB-CH nodes 4102-1; and/or select a next hop toward the waypoint. In some embodiments, the node 4102 of the plurality of nodes 4102 being configured to select the next hop toward the waypoint may further comprise the node 4102 being configured to: check connectivity of BB-CH nodes 4102-1 along a route toward the waypoint; and/or forward the communication data packet toward a first relay node 4102 of at least one relay node 4102 located near a connected BB-CH node 4102-1 along the route, wherein each of the at least one relay node 4102 is configured to forward the communication data packet toward a best hop toward the destination node 4102, wherein one rely node 4102 within a beacon range of the destination node 4102 is configured to route the communication data packet via intra-cluster routing toward the destination node 4102.

In some embodiments, upon the determination that the destination node 4102 is within the beacon range of the node 4102 or upon a determination that the destination node 4102 is not within the beacon range of the node 4102, the node 4102 is further configured to: determine that intra-cluster routing and intra-cluster routing are unavailable for routing the communication data packet toward the destination node 4102; upon a determination that the intra-cluster routing and the intra-cluster routing are unavailable, determine that the communication data packet is high priority; and/or upon a determination that the communication data packet is high priority, utilize flooding to routing (F2R) to deliver the communication data packet to the destination node 4102.

In some embodiments, only the BB-CH nodes 4102-1 are allowed to initiate a broadcast of the compiled spatial awareness information via flooding. In some embodiments, for each of the at least some of the BB-CH nodes 4102-1 having members (e.g., 4102-2, 4102-3, and/or 4102-4), the BB-CH node 4102 may be further configured to passively compile spatial awareness information via spatial awareness messages from each member of the members (e.g., 4102-2, 4102-3, and/or 4102-4) of the BB-CH node 4102-1. In some embodiments, the MANET utilizes passive spatial awareness, aspects of beacon-based passive clustering, and zero overhead efficient flooding (ZOEF) to distribute at least some of the compiled spatial awareness information to every connected node 4102 of the plurality of nodes 4102 of the MANET. In some embodiments, the efficient flooding is zero overhead efficient flooding (ZOEF) or efficient flooding with passive clustering (EFPC).

Figure 20:
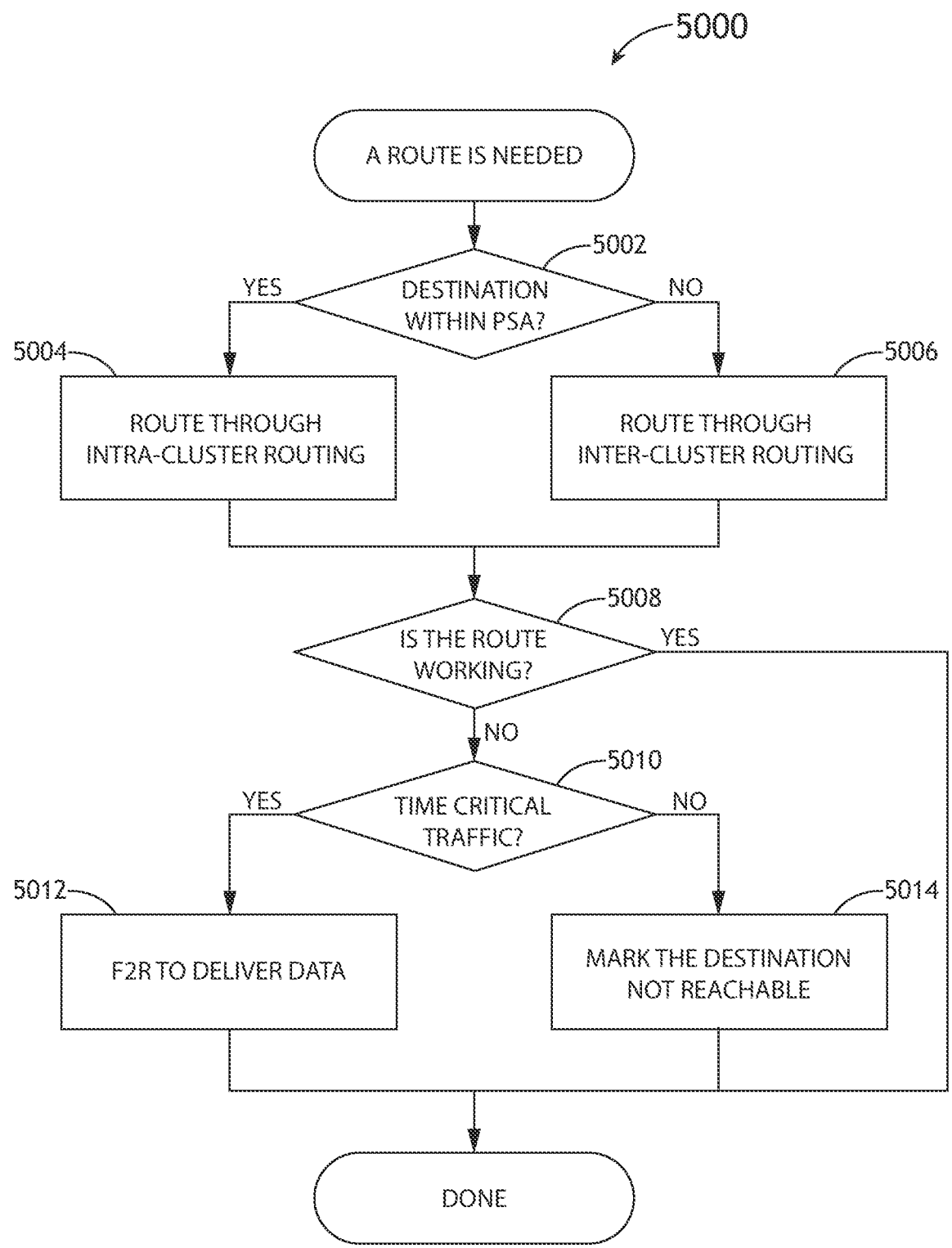
FIGS. 20, 21, and 22 illustrate a flowchart of a method, in accordance with one or more embodiments of the present disclosure.
Figure 21:
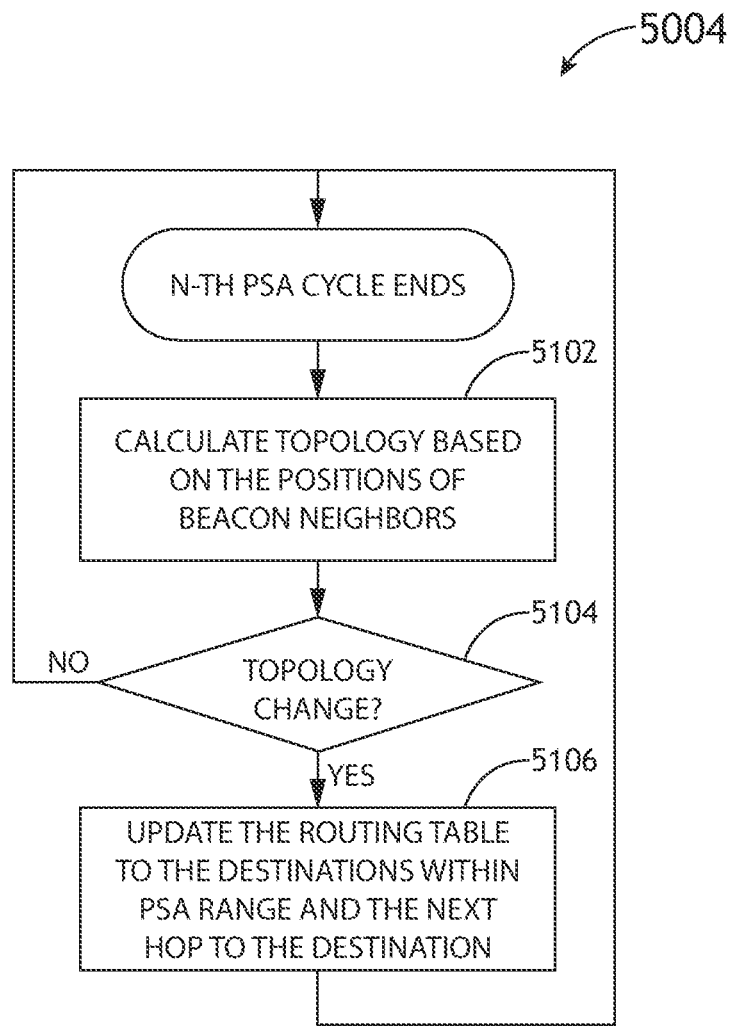
Figure 22:
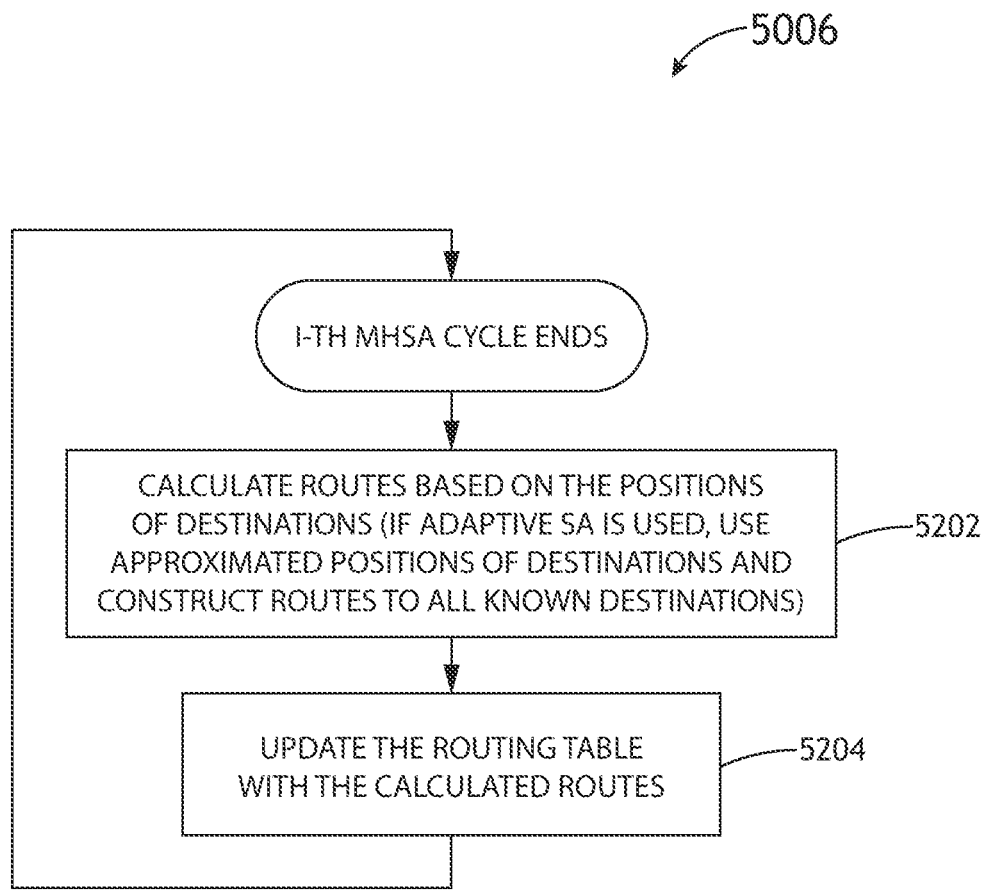

Referring now to FIGS. 20, 21, and 22, an exemplary embodiment of a method 5000 (e.g., a SaNR method) according to the inventive concepts disclosed herein may include one or more of the following steps. Additionally, for example, some embodiments may include performing one or more instances of the method 5000 iteratively, concurrently, and/or sequentially. Additionally, for example, at least some of the steps of the method 5000 may be performed in parallel and/or concurrently. Additionally, in some embodiments, at least some of the steps of the method 5000 may be performed non-sequentially.

A step S002 may include upon a determination that a route is needed, determining whether a destination node is within a beacon range by utilizing PSA.

A step S004 may include, upon a determination that the destination is within a beacon range, routing via intra-cluster routing. For example, as shown in FIG. 21, step S004 may further include: a step S102 of calculating a topology based on the positions of beacon neighbors; a step S104 of determining whether the topology has changed; and/or a step S106 of, upon a determination that the topology has changed, updating the routing table to the destinations within the beacon range and the next hop to the destination node.

A step S006 may include, upon a determination that the destination is not within a beacon range, routing via inter-cluster routing. For example, as shown in FIG. 22, step S006 may further include: a step S202 of calculating routes based on the positions of destinations (e.g., if adaptive spatial awareness is used and the PLI of the destination is not up-to-date, use approximated positions of destinations and construct routes to all known destinations); and/or a step S204 of updating the routing table with the calculated routes.

A step S008 may include upon the completion of the step S004 or S006, determining whether the route is working. If the route is working, the method 5000 may be complete.

A step S010 may include, upon a determination that the route is not working, determining whether a communication data packet is time critical traffic.

A step S012 may include, upon a determination that the communication data packet is time critical traffic, use F2R to deliver the communication data packet.

A step S012 may include, upon a determination that the communication data packet is not time critical traffic, mark the destination as unreachable.

Further, the method 5000 may include any of the operations disclosed throughout.

Referring now to FIG. 23, an exemplary embodiment of a method 5100 according to the inventive concepts disclosed herein may include one or more of the following steps. Additionally, for example, some embodiments may include performing one or more instances of the method 5100 iteratively, concurrently, and/or sequentially. Additionally, for example, at least some of the steps of the method 5100 may be performed in parallel and/or concurrently. Additionally, in some embodiments, at least some of the steps of the method 5100 may be performed non-sequentially.

A step S102 may include providing a mobile ad-hoc network (MANET) including a plurality of nodes, wherein each of the plurality of nodes comprises a communication interface and a controller, wherein the plurality of nodes comprises beacon-based clusterhead (BB-CH) nodes and members, wherein each of the plurality of nodes is one of a BB-CH node or a member of at least one BB-CH node, wherein each of the plurality of nodes is configured to transmit communication data packets and transmit beacons, wherein a range of each beacon is greater than a range of each communication data packet, wherein each of the plurality of nodes has passive spatial awareness.

A step S104 may include, for each of the BB-CH nodes having members, compiling, by a BB-CH node, spatial awareness information via passive spatial awareness (PSA) based at least on a beacon from each member of the members of the BB-CH node, wherein the spatial awareness information from a given member of the members includes information of a member identification of the given member, wherein the compiled spatial awareness information includes a BB-CH node identification for the BB-CH node, position-location information (PLI) of the BB-CH node, a quantity of the members of the BB-CH node, and a member list including member identifications of the members.

A step S106 may include, for each of the BB-CH nodes, broadcasting via efficient flooding, by the BB-CH node, at least some of the compiled spatial awareness information to every connected node of the plurality of nodes.

Further, the method 5100 may include any of the operations disclosed throughout.

As will be appreciated from the above, embodiments of the inventive concepts disclosed herein may be directed to a method and a system including a network having beacon-based clusterhead (BB-CH) nodes configured to compile spatial awareness information and distribute the compiled spatial awareness information via efficient flooding across the network.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, comprising:
a mobile ad-hoc network (MANET) including a plurality of nodes, wherein each of the plurality of nodes comprises a communication interface and a controller, wherein the plurality of nodes comprises beacon-based clusterhead (BB-CH) nodes and members, wherein each of the plurality of nodes is one of a BB-CH node or a member of at least one BB-CH node, wherein each of the plurality of nodes is configured to transmit communication data packets and transmit beacons, wherein a range of each beacon is greater than a range of each communication data packet, wherein each of the plurality of nodes has passive spatial awareness,
wherein, for each of the BB-CH nodes having members, a BB-CH node is configured to compile spatial awareness information via passive spatial awareness (PSA) based at least on a beacon from each member of the members of the BB-CH node, wherein the spatial awareness information from a given member of the members includes information of a member identification of the given member, wherein the compiled spatial awareness information includes a BB-CH node identification for the BB-CH node, position-location information (PLI) of the BB-CH node, a quantity of the members of the BB-CH node, and a member list including member identifications of the members,
wherein, for each of the BB-CH nodes, the BB-CH node is configured to broadcast, via efficient flooding, at least some of the compiled spatial awareness information to every connected node of the plurality of nodes.

2. The system of claim 1, wherein the compiled spatial awareness information further includes information of at least one of link capacity for each member of the BB-CH node or a hop count from the BB-CH node to each member of the BB-CH node.

3. The system of claim 2, wherein the compiled spatial awareness information further includes information of at least one of: a timestamp, or a time-to-live indicating a number of hops the compiled spatial awareness information is to be forwarded for each member.

4. The system of claim 1, wherein a node of the plurality of nodes is configured to:
route a communication data packet toward a destination node of the plurality of nodes;
determine whether the destination node is within a beacon range of the node; and
one of:
upon a determination that the destination node is within the beacon range of the node, utilize intra-cluster routing to route the communication data packet toward the destination node, wherein intra-cluster routing is routing within a beacon-based cluster; or
upon a determination that the destination node is not within the beacon range of the node, utilize inter-cluster routing to route the communication data packet toward the destination node, wherein inter-cluster routing is routing between beacon-based clusters.

5. The system of claim 4, wherein the node of the plurality of nodes being configured to utilize the intra-cluster routing to route the communication data packet toward the destination node further comprises the node being configured to:
calculate a local network topology based on positions of beacon neighbors of the node via PSA.

6. The system of claim 5, wherein the node of the plurality of nodes being configured to utilize the intra-cluster routing to route the communication data packet toward the destination node further comprises the node being configured to:
estimate links to at least one relay node between the node and the destination node via link adaptation.

7. The system of claim 6, wherein the node of the plurality of nodes being configured to utilize the intra-cluster routing to route the communication data packet toward the destination node further comprises the node being configured to:
based at least on the estimated links, utilize a shortest path algorithm to construct a route for the communication data packet toward the destination node.

8. The system of claim 4, wherein the node of the plurality of nodes being configured to utilize the inter-cluster routing to route the communication data packet toward the destination node further comprises the node being configured to:
calculate a waypoint having a position associated with at least one position of one or more BB-CH nodes having the destination node as a member, wherein a position of the waypoint is a position of the one or more BB-CH nodes if the one or more BB-CH nodes is a single BB-CH node, wherein the position of the waypoint is an average position of the one or more BB-CH nodes if the one or more BB-CH nodes are at least two BB-CH nodes; and
select a next hop toward the waypoint.

9. The system of claim 8, wherein the node of the plurality of nodes being configured to select the next hop toward the waypoint further comprises the node being configured to:
check connectivity of BB-CH nodes along a route toward the waypoint; and
forward the communication data packet toward a first relay node of at least one relay node located near a connected BB-CH node along the route, wherein each of the at least one relay node is configured to forward the communication data packet toward a best hop toward the destination node, wherein one relay node within a beacon range of the destination node is configured to route the communication data packet via intra-cluster routing toward the destination node.

10. The system of claim 4, wherein upon the determination that the destination node is within the beacon range of the node or upon a determination that the destination node is not within the beacon range of the node, the node is further configured to:
- determine that intra-cluster routing and intra-cluster routing are unavailable for routing the communication data packet toward the destination node;
- upon a determination that the intra-cluster routing and the intra-cluster routing are unavailable, determine that the communication data packet is high priority; and
- upon a determination that the communication data packet is high priority, utilize flooding to routing (F2R) to deliver the communication data packet to the destination node.

11. The system of claim 1, wherein only the BB-CH nodes are allowed to initiate a broadcast of the compiled spatial awareness information via flooding.

12. The system of claim 1, for each of the at least some of the BB-CH nodes having members, the BB-CH node is further configured to passively compile spatial awareness information via spatial awareness messages from each member of the members of the BB-CH node.

13. The system of claim 1, wherein the MANET utilizes passive spatial awareness, aspects of beacon-based passive clustering, and zero overhead efficient flooding (ZOEF) to distribute at least some of the compiled spatial awareness information to every connected node of the plurality of nodes of the MANET.

14. The system of claim 1, wherein the efficient flooding is zero overhead efficient flooding (ZOEF) or efficient flooding with passive clustering (EFPC).

15. A method, comprising:
providing a mobile ad-hoc network (MANET) including a plurality of nodes, wherein each of the plurality of nodes comprises a communication interface and a controller, wherein the plurality of nodes comprises beacon-based clusterhead (BB-CH) nodes and members, wherein each of the plurality of nodes is one of a BB-CH node or a member of at least one BB-CH node, wherein each of the plurality of nodes is configured to transmit communication data packets and transmit beacons, wherein a range of each beacon is greater than a range of each communication data packet, wherein each of the plurality of nodes has passive spatial awareness;

for each of the BB-CH nodes having members, compiling, by a BB-CH node, spatial awareness information via passive spatial awareness (PSA) based at least on a beacon from each member of the members of the BB-CH node, wherein the spatial awareness information from a given member of the members includes information of a member identification of the given member, wherein the compiled spatial awareness information includes a BB-CH node identification for the BB-CH node, position-location information (PLI) of the BB-CH node, a quantity of the members of the BB-CH node, and a member list including member identifications of the members; and for each of the BB-CH nodes, broadcasting via efficient flooding, by the BB-CH node, at least some of the compiled spatial awareness information to every connected node of the plurality of nodes.

* * * * *